United States Patent
Pruitt

(10) Patent No.: US 7,668,773 B1
(45) Date of Patent: Feb. 23, 2010

(54) PORTFOLIO MANAGEMENT SYSTEM

(75) Inventor: Ronald Earl Pruitt, Dallas, TX (US)

(73) Assignee: Placemark Investments, Inc., Dallas, TX (US)

( * ) Notice: Subject to any disclaimer, the term of this patent is extended or adjusted under 35 U.S.C. 154(b) by 1302 days.

(21) Appl. No.: 10/037,563

(22) Filed: Dec. 21, 2001

(51) Int. Cl.
*G06Q 40/00* (2006.01)

(52) U.S. Cl. .................................................. 705/36 T
(58) Field of Classification Search ............... 705/36 R, 705/36 T
See application file for complete search history.

(56) References Cited

U.S. PATENT DOCUMENTS

| | | | |
|---|---|---|---|
| 5,819,238 A | 10/1998 | Fernholz | |
| 5,819,263 A | 10/1998 | Bromley et al. | |
| 5,918,217 A | 6/1999 | Maggioncalda et al. | |
| 5,930,774 A | 7/1999 | Chennault | |
| 5,978,778 A | 11/1999 | O'Shaughnessy | |
| 5,987,433 A | 11/1999 | Crapo | |
| 6,012,043 A | 1/2000 | Albright et al. | |
| 6,012,044 A | 1/2000 | Maggioncalda et al. | |
| 6,018,722 A | 1/2000 | Ray et al. | |
| 6,021,397 A | 2/2000 | Jones et al. | |
| 6,052,673 A | 4/2000 | Leon et al. | |
| 6,064,985 A | 5/2000 | Anderson | |
| 6,078,904 A | 6/2000 | Rebane | |
| 6,115,697 A | 9/2000 | Gottstein et al. | |
| 6,154,732 A | 11/2000 | Tarbox | |
| 6,161,098 A | 12/2000 | Wallman | |
| 6,240,399 B1 | 5/2001 | Frank et al. | |
| 6,393,409 B2 * | 5/2002 | Young et al. | 705/37 |
| 6,687,681 B1 * | 2/2004 | Schulz et al. | 705/36 T |
| 7,016,873 B1 * | 3/2006 | Peterson et al. | 705/36 R |
| 7,047,217 B1 * | 5/2006 | Gottstein | 705/36 T |
| 7,249,080 B1 | 7/2007 | Hoffman et al. | |
| 2002/0143682 A1 * | 10/2002 | Bergmann et al. | 705/36 |

OTHER PUBLICATIONS

Jean L.P. Brunel, "Tax-Aware Equity Investing", Association for Investment Management and Research.
Jean L.P. Brunel, "Tax-Aware Portfolio Construction," Association for Investment Management and Research.
Jean L.P. Brunel, "The Upside-Down World of Tax-Aware Investing," Trusts & Estates (Feb. 1997).
ITG Financial Engineering Group, "Capital Gains Taxes and Portfolio Optimization," Jul. 18, 2000, Boston, MA.

* cited by examiner

*Primary Examiner*—Susanna M Diaz
(74) *Attorney, Agent, or Firm*—Goodwin Procter LLP

(57) ABSTRACT

Methods, apparatuses and systems allowing for optimization of individual client financial portfolios balancing risk, return, as well as transaction and tax costs, based on the inputs of at least one investment style manager. The present invention enables, in one embodiment, allocation of the management of a financial portfolio among a plurality of managers and the simultaneous optimization of the financial portfolio across all managers for after-tax returns. One embodiment of the present invention allows a professional money manager to deliver investment advice to potentially thousands of individual accounts, but tailors actual buy/sell recommendations to each individual investors tax position and preferences.

27 Claims, 24 Drawing Sheets

Fig._2

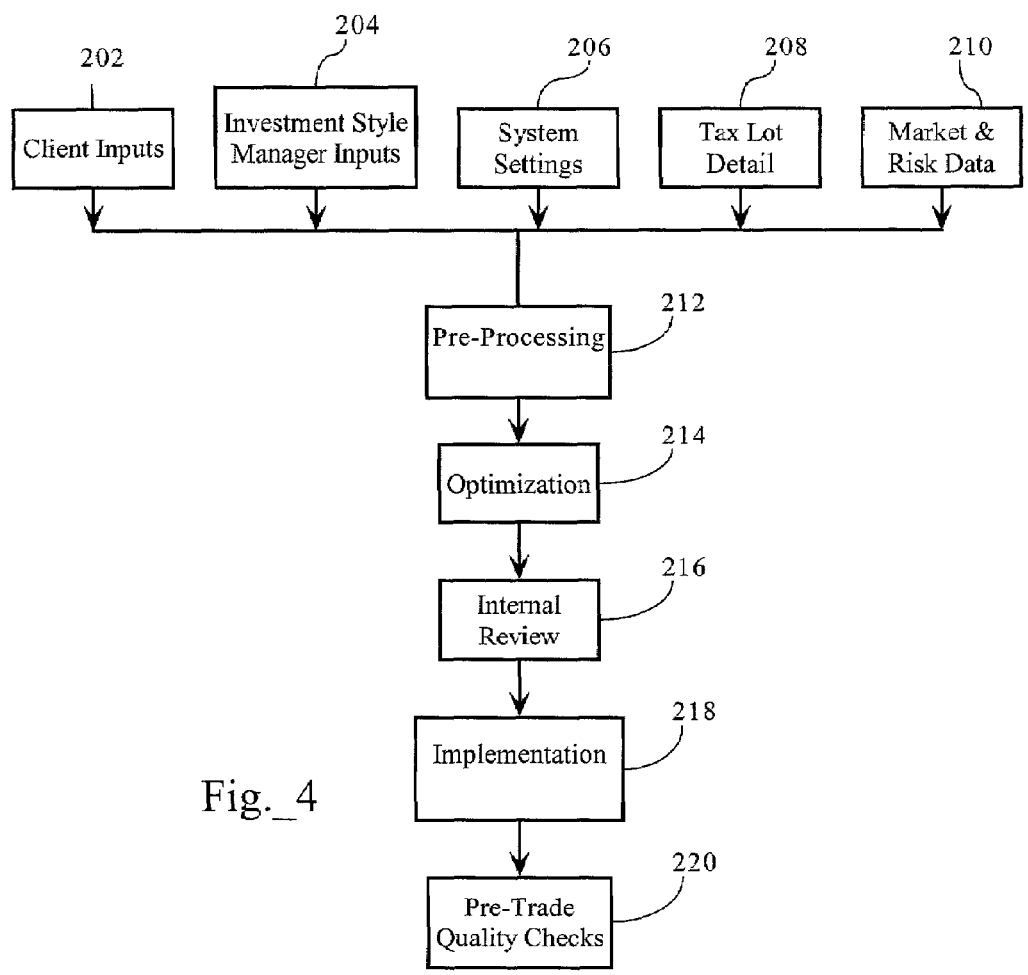
Fig._4

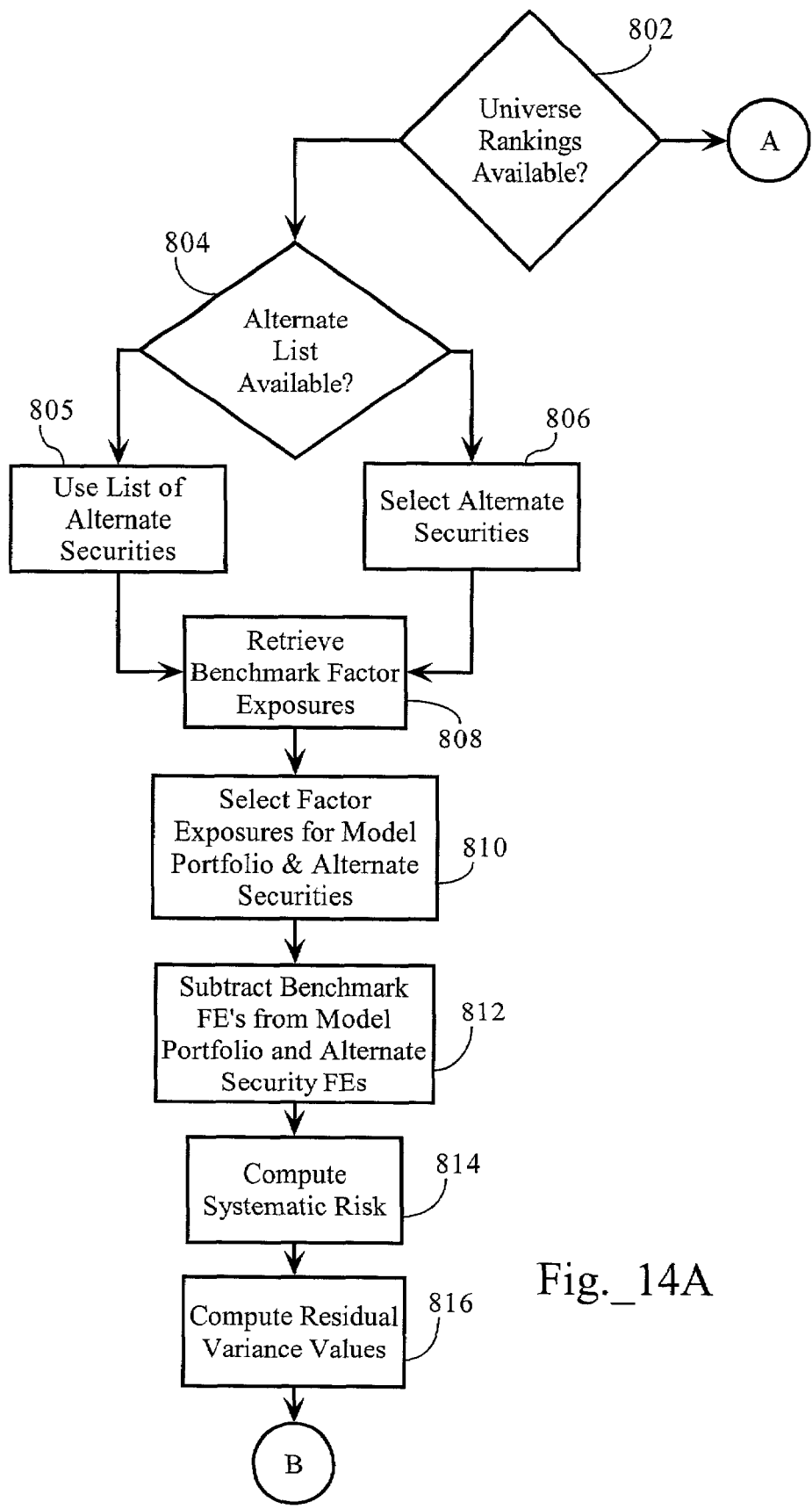
Fig._14A

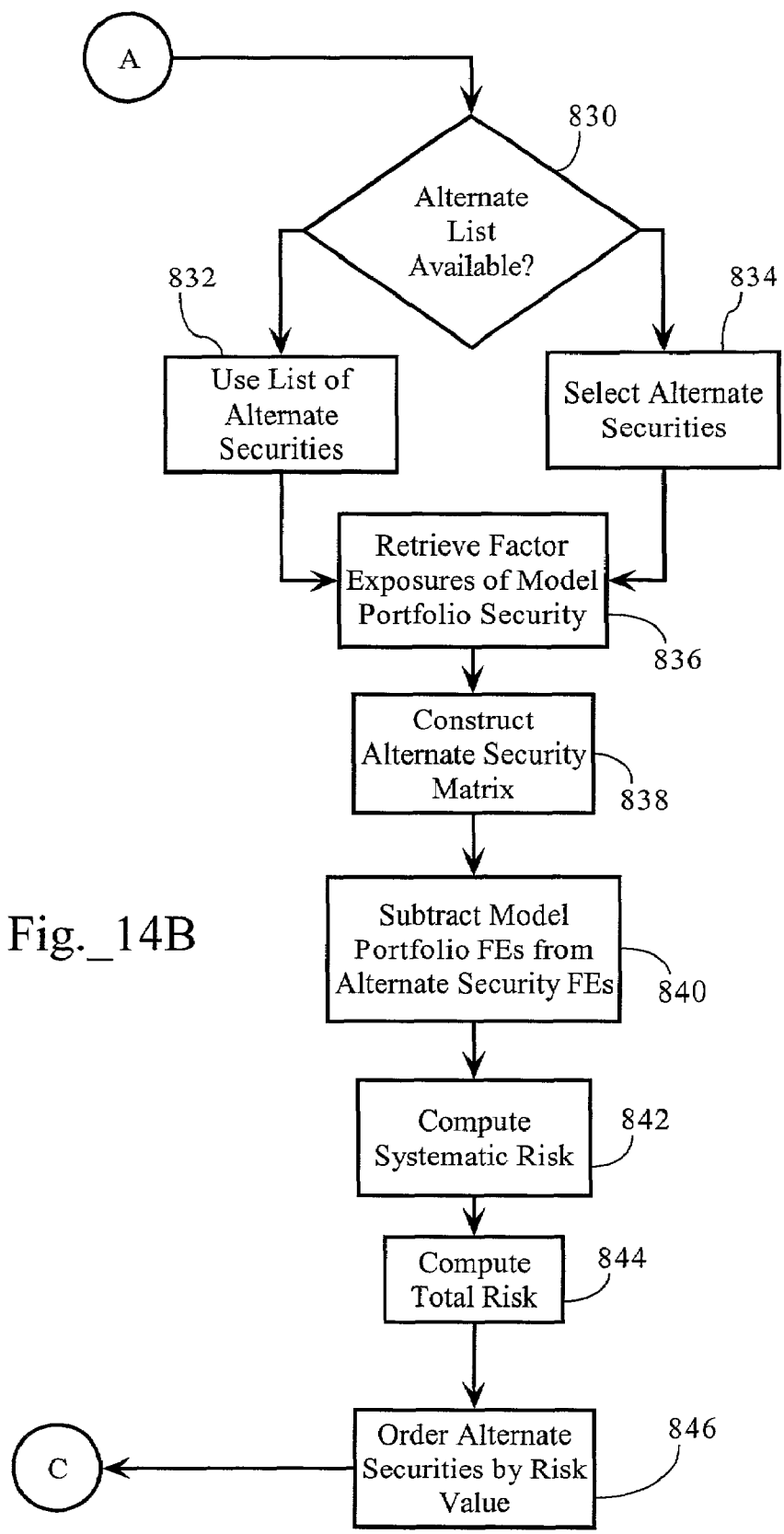
Fig._14B

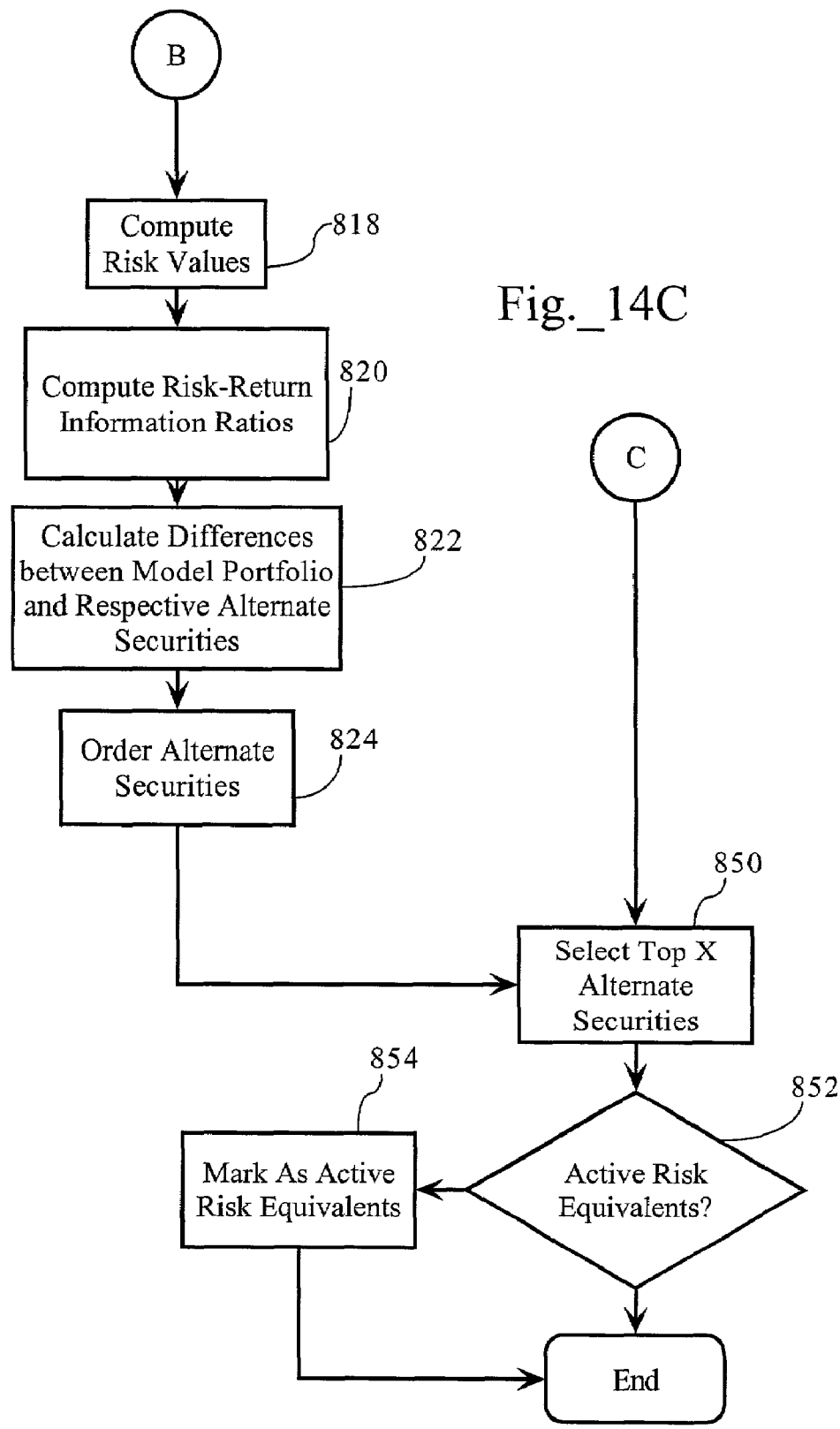
Fig._14C

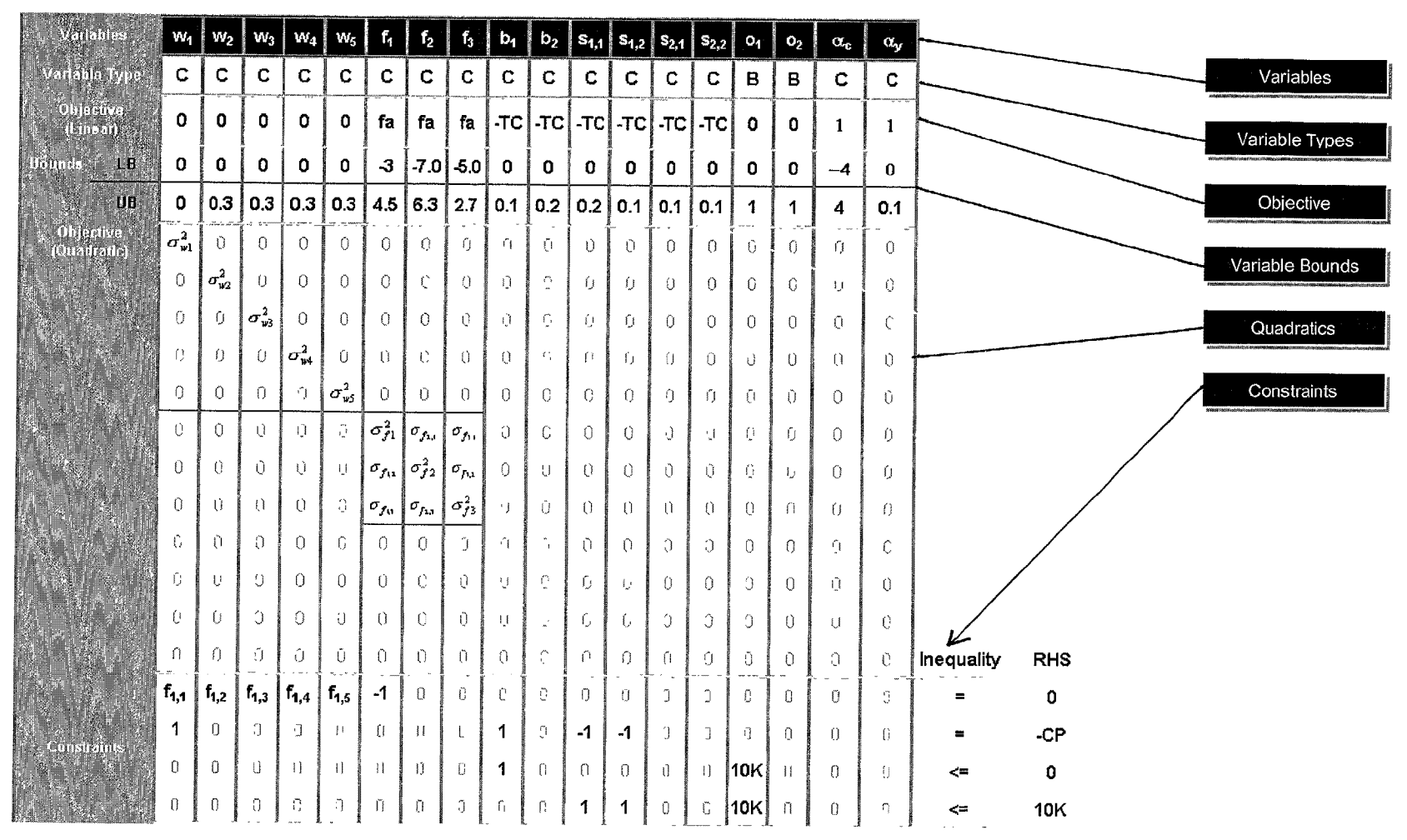

Fig._16

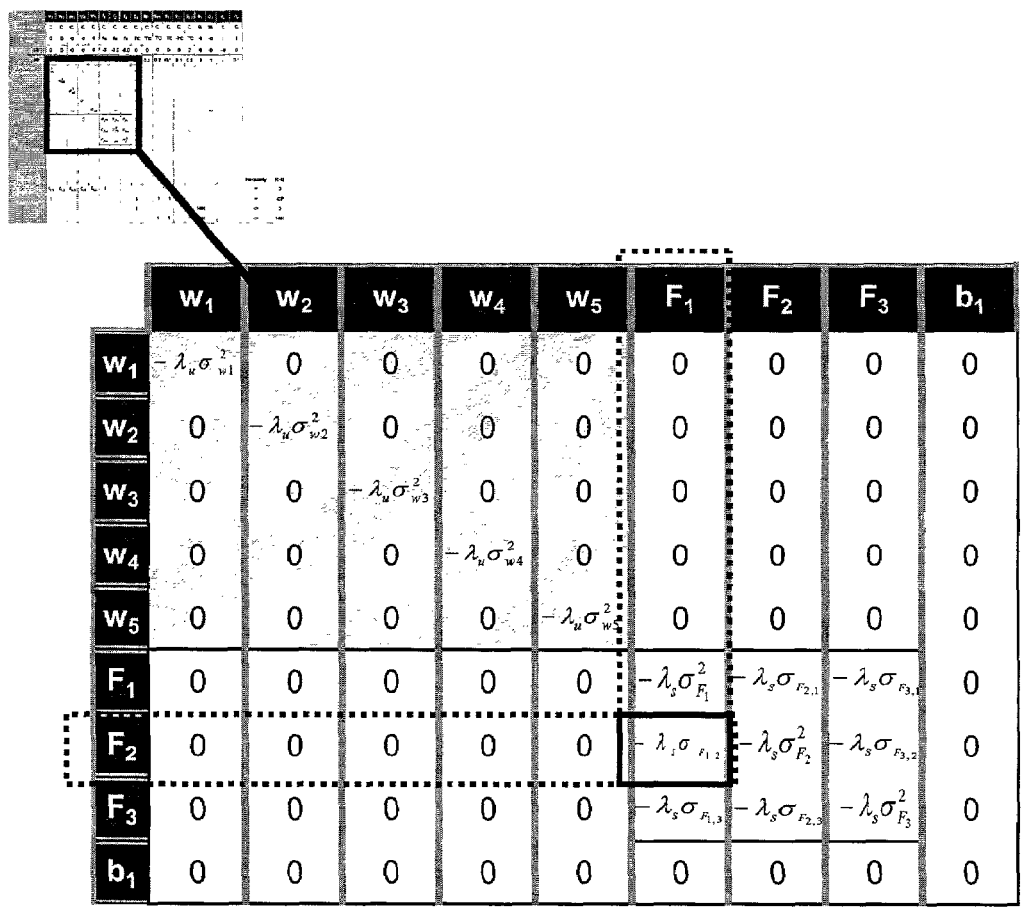
Fig._17

PORTFOLIO MANAGEMENT SYSTEM

FIELD OF THE INVENTION

The present invention relates to asset management systems and, more particularly, to asset management systems enabling distributed management and optimization of financial portfolios for after-tax returns.

BACKGROUND OF THE INVENTION

The financial investment industry has long recognized the need for tax-advantaged, investment products. However, the investment industry has traditionally managed most taxable and tax-exempt financial portfolios in a similar fashion, even though it is clear that trades that are considered good for tax-exempt portfolios may not be appropriate for taxable portfolios.

In the current investment market environment, investors seek to capitalize on economic growth primarily through mutual funds and individual stocks. The growth in both of these products over the last two decades affirms the widely held belief that it is important to have exposure to the equity markets in any diversified asset allocation program. Mutual funds have traditionally catered to the broad retail market, where investors seek investment advice and active management. However, in mutual funds, the opportunity to manage for tax efficiency is virtually eliminated, as tax-exempt and taxable investors are combined into the same pool of assets. Dilemmas for the taxable investor include 1) the inability to restrict short-term capital gains; 2) the hazard of buying into yet unrealized gains; 3) the lack of control over the timing of gain realizations; and 4) the inability to pass losses from a fund to offset taxable events in the rest of the investor's portfolio.

Indeed, a significant downside to investing in mutual funds is the tax treatment of gains and losses. Market volatility and the movement of assets in and out of funds have resulted in many funds generating significant capital gains distributions. When individuals own mutual funds, they receive distributions for all the gains realized through trading. This means that even if the investor does not sell any fund shares, he or she may have to pay taxes on the gains that the fund manager has realized. Indeed, most alarming is the situation that may occur when an individual investor invests after a fund has accumulated significant unrealized gains. If the fund then has a price decline, causing other investors to exit the fund, the fund manager must sell stock to generate the cash needed to pay out selling shareholders. The result is that the new investor can actually lose money, and owe taxes on gains that he or she never received. These tax issues make it advantageous for individual investors to own individual securities, although most will continue to seek the professional management, reduced (or shared) costs, and diversification that is inherent in mutual funds.

By owning individual equities, investors do not inherit other investors' capital gains as they do in mutual funds. For investors seeking a managed account solution, so-called wrap accounts provide a managed financial portfolio to individual investors. However, financial services offering management of individual portfolios have only been available to high net worth investors. Even as to most individually-managed, separate account programs, however, managers typically consider tax implications at a very high level, ignoring each clients cost bases associated with their holdings, changes in tax rates and other relevant tax information specific to each client. Constructing a financial portfolio involves considerable time and effort. For this reason, most managers of wrap programs manage all client portfolios for a given style in the same manner, by constructing a model portfolio that is adhered to for all accounts. While it may be possible to apply certain rules in constructing individual client portfolios (for example, no sin stocks), accounts are generally not customized for each client based on individual tax situations. Tax considerations, where taken into account at all, are typically made across all client accounts at a model portfolio level. Moreover, even the large majority of managers and wrap programs that claim to be tax aware or tax efficient generally just minimize turnover, or match gains and losses as they make trades within the model portfolio.

Such a management process ignores the genuine differences among clients, such as account costs positions, tax rates, and other taxable events in their lives (for example, gains and losses outside the specific account being managed). For taxable accounts, these wrap programs do not provide tax-optimal investment management for individual investors. To optimize after-tax returns for each client, an investment program must consider many circumstances specific to the client—e.g., the investor's tax bracket, gains or losses outside the managed funds to match against investments in the managed portfolio, the respective cost bases for equities in the portfolio, etc. Integration of all necessary information into portfolio management has been a labor-intensive process. Accordingly, due to the complexity involved in maximizing after-tax returns, only multi-million dollar financial portfolios have received the individualized attention required to make the best trades for each individual taxable client.

Market pressure from individual investors, the growth of Internet-delivered solutions, and reduced transaction costs for trading, accounting and other support functions are driving the development of a new category of low-cost, individually diversified portfolios. The emergence of these products is proving to be a viable alternative for individual investors who want to avoid the tax issues of mutual funds and manage their own accounts. The products help individual investors select pre-packaged "folios" or "baskets" of stocks to meet their investment objective. While these products allow individuals to achieve diversification benefits that are normally only available in mutual funds, they are generally either passive products, or must be managed by the individual investor. For those that seek management from established money managers, these new basket products do not provide a solution.

In light of the foregoing, a need exists for asset management systems that enable tax-optimized management of individual financial portfolios in an efficient and cost effective manner. For instance, a need exists for asset management systems that allow for tax-optimized managed account products that are available to lower net worth investors.

SUMMARY OF THE INVENTION

The present invention provides methods, apparatuses and systems allowing for optimization of individual client financial portfolios balancing risk, return, as well as transaction and tax costs, based on the inputs of at least one investment style manager. The present invention enables, in one embodiment, allocation of the management of a financial portfolio among a plurality of managers and the simultaneous optimization of the financial portfolio across all managers for after-tax returns. One embodiment of the present invention allows a professional money manager to deliver investment advice to potentially thousands of individual accounts, but tailors actual buy/sell recommendations to each individual investor's tax position and preferences.

In one embodiment, the present invention integrates inputs from financial advisors, individual investors, money managers, and an accounting system that tracks the cost basis and account holdings in all accounts for each individual investor and determines the optimal decisions for each investor's portfolio. In one embodiment, the present invention allows for the consideration of the investor's tax status and preferences, as well as the tradeoffs between the inputs provided by the money managers and the tax implications of all proposed portfolio adjustments.

In one embodiment, the present invention combines information from professional money managers with client settings gathered by an advisor, and tax-Level portfolio data from an account management system, to derive a customized, managed portfolio of equities optimized for after-tax returns. A particular money manager can make changes to equity selections or other model style settings as appropriate, and, as the portfolios for all clients associated with that money manager are re-optimized, the most recent stock selections and portfolio construction rules are applied. Likewise, an advisor may input changes to a client's tax position as frequently as necessary. Information regarding the client's total tax situation, not only within the managed portfolio, but across the client's assets (for example, gains and losses in other investments), and changes in income tax and capital gains tax rates can all be taken into account when developing the optimal portfolio for each client. The decisions as to which equities to buy or sell in an individual investor's account vary, based on each individual's circumstances. For example, an investor with a higher cost basis might sell a security, based on a moderate "sell" signal from the investment style manager, whereas another investor with a very low cost basis on that same security might hold it because of negative tax consequences that are specific to that investor. The portfolio optimization platform, in one form, optimizes how the money managers' inputs are applied to each individual investor's account, reviewing each account and making individual investment decisions, account by account. By periodically reapplying the advice of respected money managers with current information from the individual investor, the portfolio optimization platform achieves its objective of constructing, and continually reconstructing, the best portfolio of securities for each individual's specific tax position.

DESCRIPTION OF THE DRAWINGS

FIG. 4 is a flow chart diagram that illustrates the types of data and the overall process flow involved in the management of financial portfolios according to an embodiment of the present invention.

FIG. 5A is a flow chart diagram setting forth the data and overall processing involved in the pre-processing phase of a portfolio optimization according to an embodiment of the present invention; and FIGS. 5B and 5C set forth various data fields involved according to one embodiment.

FIGS. 14A-C are flow charts that illustrate a method facilitating the processing of investment style manager inputs for alternate securities.

FIG. 16 is a matrix setting forth an optimization problem for didactic purposes.

FIG. 17 is a section of the matrix of FIG. 16.

DESCRIPTION OF PREFERRED EMBODIMENT(S)

As discussed above, the present invention integrates inputs from investment clients, advisors, investment style managers and accounting systems to manage tax-optimized financial portfolios. The present invention may operate in connection with various types of financial portfolios, including managed accounts, wrap accounts, folios, and traditional brokerage accounts. Each investment style manager defines and maintains at least one investment style, essentially managing a model portfolio (e.g., stock selection, portfolio construction, and ongoing management), and provides investment style data including, for example, portfolio construction parameters such as stock selection and ranking data and, in one embodiment, guidance as to a set of appropriate settings defining how the model portfolio should be constructed. However, investment style managers can provide a wide variety of inputs.

According to one embodiment of the present invention, an advisor works with an investment client to determine an appropriate asset allocation for his or her financial portfolio. Within each asset class, the advisor also assists the investment client in selecting at least one appropriate investment style and an initial allocation of funds to each account associated with the selected investment styles. The accounts corresponding to the selected investment styles make up the client investor's portfolio. The account management system maintains each investment client's financial portfolio (in one embodiment, as a collection of separate accounts) and provides necessary inputs to the portfolio management platform. As to each investment client, the portfolio optimization platform combines data relating to the investment client's individual financial circumstances and account settings with the portfolio construction parameters submitted by selected investment style managers to generate tax-optimized, suggested adjustments to the financial portfolio of the investment client. In one form, the resulting suggested adjustments are ultimately transmitted to a middleware application for execution.

I. Exemplary Operating Environment

Figure 1:
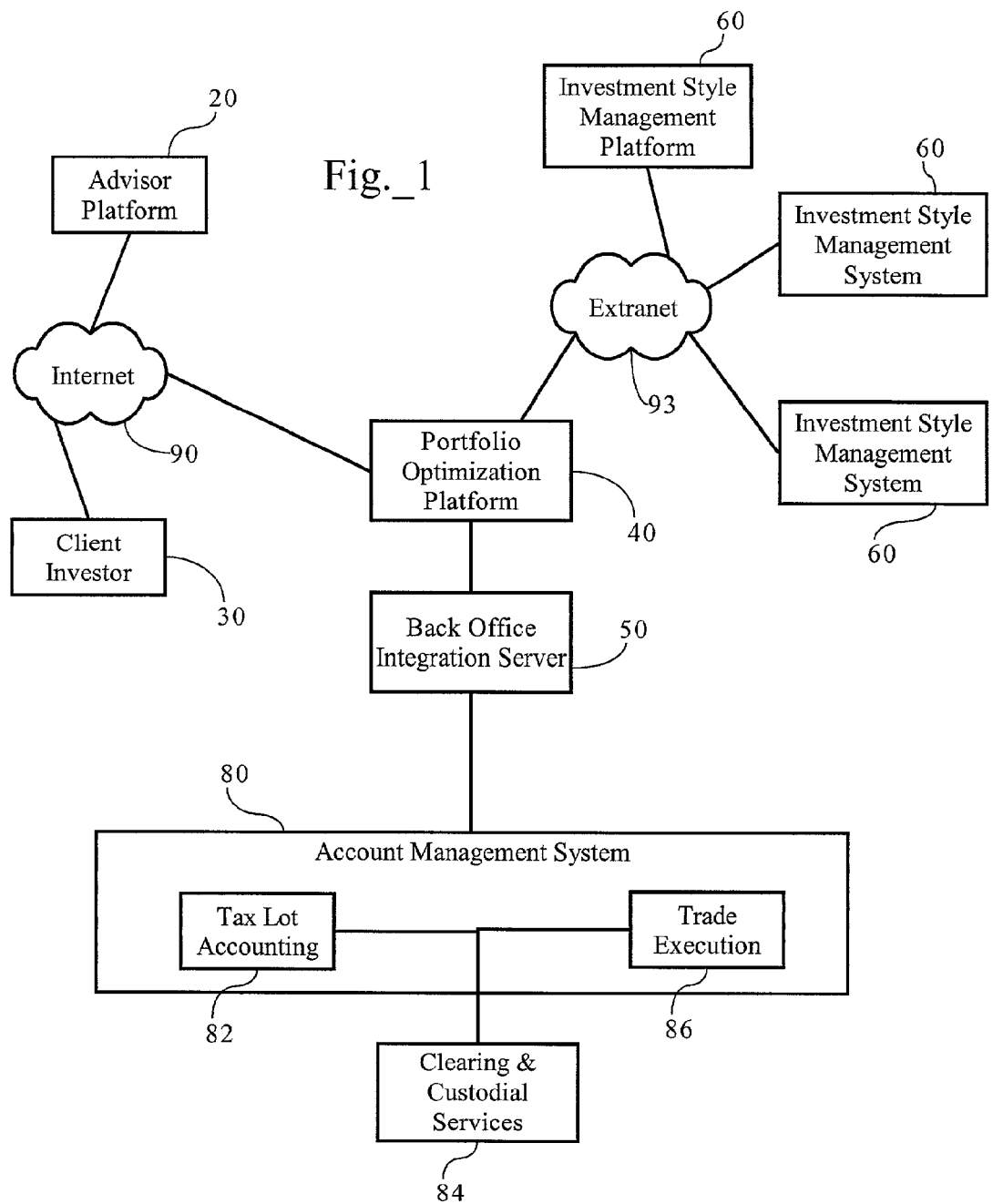
FIG. 1 is a functional block diagram illustrating an embodiment of the present invention.

As FIG. 1 illustrates, an embodiment of the present invention involves at least one advisor platform 20, at least one investment style platform 60, portfolio optimization platform 40, and account management system 80. As more fully described below, portfolio optimization platform 40 receives inputs from advisor platform 20, investment style platform 60, and account management system 80 and generates suggested adjustments to a financial portfolio. Many permutations of the embodiment shown in FIG. 1 are possible. For example, although FIG. 1 shows only one advisor platform 20, the system of the present invention may operate in conjunction with a plurality of advisor platforms. In addition, the functionality provided by portfolio optimization platform 40 may be incorporated into the existing operations of a broker dealer or any other financial institution selling securities or financial products. In another embodiment, an Application Services Provider (ASP) may provide the functionality of portfolio optimization platform 40 to a plurality of financial institutions. Still further, although FIG. 1 shows only one account management system 80, portfolio optimization platform 40 may operate in connection with a plurality of account management systems.

A. Advisors and the Advisor Platform

Advisors assist client investors in determining the appropriate investment policy, selecting appropriate investment vehicles, allocating capital to the vehicles, as well as facilitating the sales process via proposal generation and sales management tools. Advisors also provide ongoing management on behalf of the client and deliver performance reporting. Advisors, in one embodiment, essentially acts as distributors of the financial product(s) enabled by the present invention—e.g., tax-optimized, managed investment portfolios.

In one embodiment, an advisor (for example, a Certified Financial Planner) works with an individual client to allocate the assets a client wishes to have managed among a group of professional money managers (here, investment style managers), based upon the investor's specific circumstances. The advisor asks the client standard "risk profiling" questions regarding investment goals, risk tolerance, existing core stock holdings, and tax status. The advisor then creates an asset allocation and offers the investment client a combination of investment styles, each investment style mapping to a specific investment style manager, to achieve the suggested asset allocation. In another embodiment, part or all of the advisor's role is performed by software modules residing on a server connected to the computer network. The application includes functionality allowing for registration and profiling of client investors over the Internet 90, creation of asset allocations, selection of investment styles or managers within each asset class, and the receipt and storage of other data relating to client investors.

Figure 2:
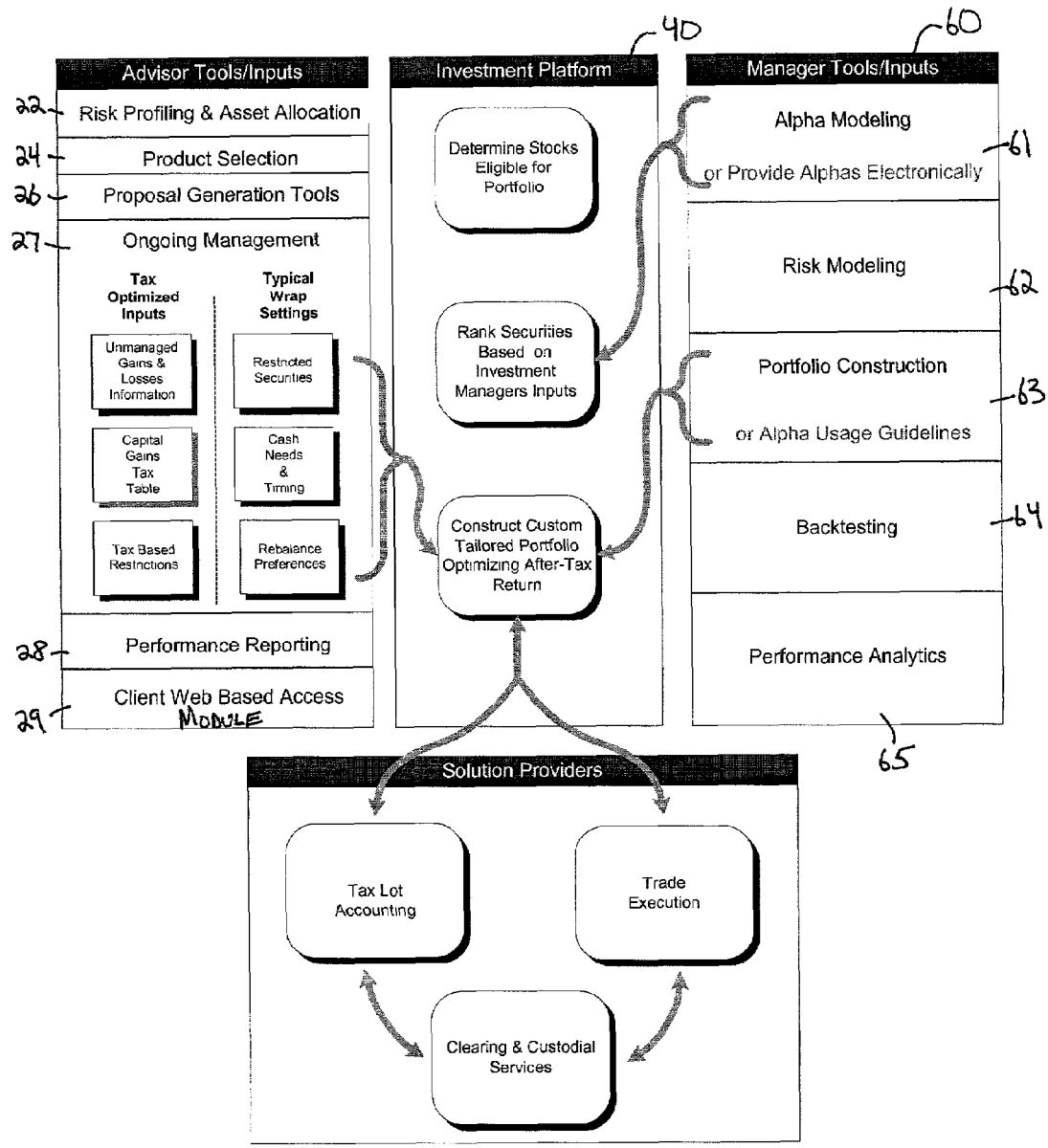
FIG. 2 is a block diagram setting forth a distribution of functionality according to one embodiment of the present invention.

Advisor platform 20, in one embodiment, includes tools to support an advisor's role in the system. As FIG. 2 shows, advisor platform 20 comprises risk profiling and asset allocation module 22, product selection module 24, proposal generation module 26, ongoing management module 27, performance reporting module 28, and client access module 29. Risk profiling and asset allocation module 22 elicits inputs from client investors and generates an asset allocation appropriate to that client investor. In one form, risk profiling and asset allocation module 22 generates a series of questions designed to elicit answers that help to determine an appropriate asset allocation for the client investor's financial portfolio. In one form, the questions relate to the client investor's attitude or comfort level with risk, investment goals, and reasons for investing. Many asset allocation techniques exist in the art; the exact method of asset allocation used is not critical to the present invention. Product selection module 24 facilitates selection of financial products corresponding to various investment styles within each asset class. In one embodiment, product selection is first based on an asset allocation (e.g., bonds, real estate, securities, etc.) and, within each asset class, the selection of one or more investment style managers. Proposal generation module 26 facilitates the generation of reports detailing the proposed investment policy corresponding to the asset allocation and product selection specific to the client investor and facilitating the investor's evaluation of proposed investment policy. Performance reporting module 28 generates reports detailing the performance of the managed portfolio in relation to one or more benchmarks. In one embodiment, the functionality of the modules set forth above is provided by hosted applications associated with portfolio optimization platform 40.

Ongoing management module 27 facilitates the input, storage, retrieval and modification of data relating to each client investor's portfolio and external financial circumstances. In one embodiment, investor database 164 stores account data for each client investor, including an investor identification, address information, password or other authentication data, risk profiling data, asset allocation data, selected investment styles/financial products, capital gains tax rates, tax-based restrictions, restricted securities, current cash needs and timing, portfolio re-balancing preferences, and external financial event data, such as assets held, or gains/losses incurred, outside of the funds managed by the system. As FIG. 2 illustrates, ongoing management module 27, in one embodiment, facilitates entry of the following information from each client investor in client account database 164:

1) external gains and losses: information relating to gains and losses resulting from financial events having tax implementations outside the managed funds;

2) un-managed assets: financial assets outside/external to the managed portfolio;

3) capital gains tax table: tax rates specific to the client investor that would apply to investment income and capital gains (long/short term); in one embodiment, the tax table information is automatically generated based on other financial data gathered from the client investor and generally available tax tables;

4) tax based restrictions: client based/specified preferences as to what types of taxable events they prefer to avoid (e.g., no investment income, no short term gains, etc.);

5) restricted securities: list of off-limits securities (e.g., no "sin" stocks); in one embodiment, restricted securities data also include any security external to the managed portfolio that the client investor sold for a loss (see below);

6) cash needs & timing: information specific to each client investor as to his or her plans for withdrawals from the managed portfolio; and, 7) re-balancing preferences: settings as to how far the portfolio is allowed to deviate from the initial asset allocation or the duration of time since the last rebalancing, before re-balancing of the portfolio is effected.

In one form, the client investor's information is updated by the advisor and/or the client investor as frequently as necessary.

Client access module 29 allows investor clients remote access to portfolio data and allows investor clients to change such data. In one embodiment, client access module 29 includes web server functionality allowing investor clients access to portfolio account and reporting data over Internet 90. Through client access module 29, client investors can view the holdings and status of their respective portfolios, as well as change portfolio data, such as mailing address and the like, and transfer funds into and out of their portfolios.

In one embodiment, a password is required to gain access to investor portfolio accounts. According to one embodiment, each client portfolio account includes a user name, and a password or an encrypted representation thereof. In one embodiment, client access module 29 authenticates users in a conventional manner. In one embodiment, client access module prompts the user for a user name and a password to authenticate the user. Numerous authentication protocols are known in the art. The actual authentication protocol used is not critical to the invention. In one form, communication of account data to the client investor 30 is transmitted using a secure communications protocol. In one embodiment, the browser implemented on the client investor's computer supports the SSL ("Secure Sockets Layer") protocol, the S-HTTP ("Secure HTTP") protocol, or any other similar protocol for transmitting confidential or private information over an open computer network 90.

B. Account Management System

Account management system 80 maintains client investor portfolios and assets corresponding to the client investor portfolios. In one form, a financial institution, such as a brokerage firm, maintains account management system 80, which includes functionality allowing for tax lot accounting, and trade execution. In one form, account management system 80 comprises a middleware system including functionality directed to tax lot accounting, clearing and custodial integration, and trade execution. Account management system 80 can be any accounting system that facilitates trading of accounts, allocation of trades made at a block level to each individual account, ongoing reconciliation of the accounting system with the custodian's records, specific identification of shares sold by tax lot and ongoing tax lot level detail of the cost basis, purchase dates, individual tax lot status, and performance reporting consistent with industry standards. Known systems that meet some or all of the above requirements include Security APL, Portia, dbCAMMS, Centerpiece, Advent (Axys and Moxy) and Eagle Investment Systems (STAR and PACE). As FIG. 1 shows, account management system 80 interacts with clearing and custodial services system 84 to affect trades on the account, reconcile accounting system ledger with custodial ledger and process other functions necessary for the ongoing accounting, management and performance reporting in the accounting system.

As FIG. 1 shows, portfolio optimization platform 40 and accounting system 80, in one embodiment, interact through back office integration server 50. Back office integration server 50 enables processing of data flows between portfolio optimization platform 40 and a variety of different account management systems 80 for such purposes as extracting tax lot detail, implementing changes to the account, and passing trade data to the appropriate trade desk. Essentially, back office integration server 50 provides to portfolio optimization platform 40 a standardized interface allowing access to the functionality of account management system 80. In one form, back office integration server 50 converts data and/or requests transmitted from portfolio optimization platform 40 into a format suitable for the particular middleware system of account management system 80, and vice versa. Although FIG. 1 shows only one account management system 80, portfolio optimization platform 40 may operate in connection with a plurality of account management systems, each operated by a different financial institution. Accordingly, a plurality of back office integration servers 50 allow a single portfolio optimization platform 40 to interact with a plurality of respective account management systems. In one embodiment, portfolio optimization platform 40 is operative to reconcile account data maintained by clearing and custodial system 84 and account management system 80 and store the reconciled account data in user account database 164. In one embodiment, the reconciled account data is used in the optimization of financial accounts as more fully described below.

In one embodiment, as discussed above, a particular client's financial portfolio comprises a plurality of separate accounts relative to account management system 80, where each account maps to a specific investment style manager chosen by the client. Any mutual funds, money market and other cash funds, however, are combined into one account. For certain types of account management systems, this embodiment facilitates auditing of the financial portfolio per investment style manager and the monitoring and reporting of the performance of each investment style manager. However, as discussed below, this configuration requires that allocation parameters be adjusted accordingly (see below). In other embodiments, each client's entire financial portfolio is represented and handled as a single account.

C. Investment Style Managers and Investment Style Management Platform

An investment style manager defines and maintains one or more investment styles, such as large cap growth, small cap value, international, and so on. Each investment style includes all of the portfolio construction and management considerations that a money manager would normally develop to manage a mutual fund or similar investment portfolio. The investment style manager, in one embodiment, initially defines a model portfolio and subsequently adjusts it as necessary. The investment style manager further defines and adjusts such investment style parameters as equity screening requirements (e.g., minimum market cap, price to earnings ranges, sector weightings, turnover constraints, maximum/minimum numbers of equities, etc.), risk modeling parameters, and individual equity recommendations or alpha weightings. The investment style manager submits such investment style data (model portfolio and parameters) to portfolio optimization platform 40 to enable calculation of adjustments to individual portfolios some of whose assets have been allocated to that investment style. In one embodiment, investment style managers submit investment style data on a periodic basis (e.g., daily, weekly, monthly) or in response to changing market or other conditions.

Investment style managers may generate investment style data using their own internal investment processes and provide them via any suitable data transfer technology, such as e-mail, FTP, etc. Moreover, the investment style data may be transferred using any suitable secure transmission technology, such as SSL, HTTP-S, or Virtual Private Networking (VPN) technologies. However, investment style management platform 60, in one embodiment, includes functionality facilitating each investment style manager's role in the system. However, investment style managers may employ any functionality or techniques appropriate to generate the required inputs. As FIG. 2 shows, investment style manager platform 60 may include alpha modeling module 61, risk modeling module 62, portfolio construction module 63, backtesting module 64, and performance analytics module 65. Alpha modeling module 61 facilitates the modeling of expected excess return potential or alpha factors for individual securities. Risk modeling module 62 facilitates generation of risk models providing an estimate of systematic/market risk and stock specific risk. Portfolio construction module 63 facilitates the selection and input of portfolio construction parameters, such as stock screening parameters and alpha-usage guidelines.

C.1. Receiving and Processing Investment Style Manager Inputs

In one embodiment, a critical set of inputs into portfolio optimization platform 40 is the security selections of the investment style managers. In a preferred embodiment, investment style managers are required to provide and regularly update their security selections. In one embodiment, investment style managers provide the security selections in the form of a model portfolio as would be appropriate for a tax-exempt client, taking into consideration, however, that the model portfolio must be implementable in account having the minimum amount of assets allowed by the operators of the system (e.g., $100,000). Therefore, if the minimum account size is $100,000, for example, it would be impracticable for investment style managers to offer model portfolios including 500 securities. Moreover, investment style managers should also consider the yield of securities as being taxable. As more fully described below, portfolio optimization platform 40 then manages the portfolios of client investors to minimize tracking error from the model portfolios associated with each respective portfolio and balances that tracking error with the associated transaction and tax costs of trading.

C.1.a. Types of Input and Levels of Participation

In one embodiment, portfolio optimization platform 40 concurrently supports multiple levels of participation by investment style managers. The levels are differentiated by the degree of detail of investment style data provided by the investment style manager. The types and format of the data submitted by investment style managers can vary according to the level of participation desired by each investment style manager. In addition, the investment style data can be communicated as Microsoft Excel files, .CSV files, delimited text files, or any other suitable data format. The delivery can be via secured e-mail, secured file transfer protocol (ftp), or any other suitable data transfer method and/or format, such as XML and SOAP technologies. In one embodiment, investment style managers transmit investment style data to portfolio optimization platform 40 via extranet 93. In one embodiment, portfolio optimization platform 40 includes web server functionality presenting custom-tailored page-based interfaces that facilitate the uploading of investment style data.

1) Model Portfolio

In one embodiment, the minimum participation requirement is the provision of a model portfolio including an identification of each security (e.g., ticker symbol) and a corresponding position weight (see Table 1).

TABLE 1

| File #1: Model Portfolio | | |
|---|---|---|
| Ticker | CUSIP | Position Weight |
| ABC | 123456789 | 2.4% |
| ... | ... | ... |
| XYZ | 987654321 | 3.7% |
| Total | | 100% |

2) Opinion on Legacy Assets

According to a higher level of participation, the investment style manager provides a model portfolio plus an "opinion" on manager-driven "legacy assets" (see Table 2). The investment style manager's opinion, in one embodiment, takes the form of a ranking. A ranking is any qualified measurement of the preference for holding a security. This ranking can take the form of any ordinal data set (numerical ranking such as 1-10 and/or categorical ranking system such as strong buy to strong sell), a continuous data set such as an alpha ranking or a series of price targets with a general or specific time horizon. These rankings are used to infer the excess return potential.

This level of input allows for enhanced portfolio optimization. Legacy assets include any asset that a client holds either due to funding an account with securities ("client-driven" legacy asset), not trading out of a security when the model portfolio changes or deviating from the model portfolio (see alternate securities) and then not trading the security either due to restrictions and/or tax purposes. Because new client investors continuously enter the program, there are many different cost bases for the same security as well as different purchase dates. Therefore, when an investment style manager chooses to remove a security from his model portfolio, it may make sense for a particular client portfolio from a tax perspective to hold on to that security to reduce or defer taxes. The investment style manager's opinion data on such legacy assets facilitates this level of optimization for the client portfolio. Ideally, investment style managers maintain research coverage on securities that have recently traded out of their respective model portfolios as it may be beneficial for some clients to hold these securities, for example, until they reach long term capital gains status. The investment managers' respective opinions on such legacy assets allows for an explicit calculation of the tradeoffs between holding the legacy asset versus selling the legacy asset and adhering more closely to the model portfolio.

TABLE 2

| File #2: Opinion on Securities in Model plus Legacy Assets | | |
|---|---|---|
| Ticker | CUSIP | Opinion (_ranking, or price target) |
| ABC | 123456789 | 1 |
| XYZ | 987654321 | 2 |

3) Alternate Securities

In another, still higher level of participation, investment style managers also provide a set of alternate securities for those in the model portfolio. Alternate securities are securities that could serve as replacements for securities that reside in the manager's model portfolio that have been screened out based on restrictions and preferences made by the client and/or for purposes of avoiding a wash sale (see below). Investment style managers can link the alternate securities to specific model portfolio securities or can provide a list of alternate securities applicable to the entire model portfolio. Alternate securities can be further classified by the investment style manager as general alternates or "active risk equivalents."

Active risk is the deviation from a specified target portfolio. Most simply explained, if there is a model portfolio (e.g., an index or a manager model portfolio) and the corresponding security weights are exactly replicated in a clients portfolio then there is no active risk that the client's realized performance will deviate from that of the target. In reality, transaction costs and the timing between when the model portfolio changes and when the client portfolio changes will, at a minimum, result in slight deviations. Whenever there is a deviation from the model, there is active risk; tracking error is the sum of the active risk from each security.

In addition, an investment style manager typically manages a model portfolio in relation to an appropriate benchmark (e.g., S&P 500, Russell 2000 Growth, etc.) wherein the model portfolio's deviation from the benchmark results in tracking error. An active risk equivalent is an alternate security that, when used in place of a particular model portfolio stock, the model portfolio provides a substantially equivalent degree of tracking error from the benchmark as compared to the original model portfolio. Furthermore, a general alternate security is a security that the investment style manager feels is a favorable selection for a client portfolio, but does not meet the more stringent requirements of an active risk equivalent.

As described more fully below, the addition of a set of alternate securities allows greater ability to deliver customized, tax-optimized portfolios to client investors that reflect the best ideas of the investment style managers. Some examples of the need for alternate securities are: 1) deviation from the model to facilitate gain/loss matching across investment style managers; 2) deviation from the model portfolio to accommodate security restrictions imposed by the client; 3) deviation from the model portfolio to facilitate the avoidance of wash sale transactions within and across investment style manager model portfolios.

4) Opinions on Securities in Research Universe

In yet another higher level of participation, investment style managers provide opinion data as to securities in their respective research universes (see Table 3). A research universe is a broad set of securities that make up the asset class a particular investment style manager is focused on managing. In most cases, the research universe encompasses a specified benchmark index (such as the Russell 1000 Growth) or based on a screen of securities with certain characteristics (such as all securities with at least 6 quarters of operating history and a market cap in excess of $5 billion). In one embodiment, investment style managers provide rankings for all securities in their respective research universes. This ranking is used to make an explicit tradeoff decision between taxes, return potential, risk and transaction costs associated with trading. Such opinion data allows for higher degrees of customization and tax-optimization for portfolios of taxable investors, because all tradeoffs are explicitly quantified. For example, if a client investor initially funds the portfolio account with stock (a client-driven legacy asset having an associated cost basis) and that stock is not covered by an investment style manager, the portfolio optimization platform must make implicit assumptions about the relative value of that stock over what the investment style manager currently recommends. Additionally, wash sale restrictions may result in choosing an alternate security. An investment style manager that provides rankings on all stocks in the research universe (to support all forms of legacy assets—manager and client driven) and provides alternate securities is able to support explicit analysis of all tradeoffs (e.g., between tracking error from the manager's model portfolio to a benchmark, the differential return potential between all securities and the tax costs to trade back to the model portfolio).

TABLE 3

File #3: Opinion on all securities in universe

| Ticker | CUSIP | Opinion (ranking, or price target) |
|---|---|---|
| ABC | 123456789 | .08% |
| ... | ... | ... |
| XYZ | 987654321 | 1.0% |

C.1.b. Frequency of Model Portfolio Updates

Investment style managers, in one embodiment, submit updates to their respective model portfolios and/or other investment style data on a periodic (e.g., daily, weekly, monthly, etc.) or on an as-needed basis. The frequency of updates depends on the normal investment process of the investment style manager. To assist investment style managers providing at least legacy asset data, portfolio optimization platform 40 provides a list of all current legacy assets and the number of client portfolios holding each legacy asset and, optionally, the total dollar weight of each legacy asset. This enables investment style managers to prioritize legacy asset coverage to those securities that are more broadly held within client accounts.

C.1.c. Processing of Investment Style Manager Inputs

Given the different levels of participation concurrently available, portfolio optimization platform 40 must process the investment style data to provide a uniform set of inputs to optimization system 110. For example and in one embodiment, portfolio optimization platform 40 selects alternate securities for model portfolios of the investment style managers who do not provide them.

FIGS. 14A, 14B and 14C illustrate a method facilitating the processing of investment style data for alternate securities. Investment style data processor 154 retrieves an investment style data set from investment style database 150. In one form, the investment style data, at a minimum, includes a file comprising an investment style managers latest update for the model portfolio (see Section I.C.1.a., supra). As described above, investment style data may further include a file containing a list of alternate securities. Investment style data processor 154 also retrieves risk model and fundamental data from market and risk model database 162. Investment style data processor 154 further retrieves a portfolio construction setting from investment style manager data 151 which determines whether to consider the alternate securities provided by the investment style manager, if any, as either active risk equivalents or general alternates (see above).

In one embodiment, investment style data processor 154, for each model portfolio security, determines the most similar securities for use as alternates, using one of two approaches, depending on whether the investment style manager provides rankings of securities within his or her investment universe (step 802) (see above). Investment style data processor 154 then determines whether the investment style manager provided a list of alternate securities (step 804). If so, investment style data processor 154 uses the list of alternates provided (step 805); otherwise, investment style data processor 154 selects a list of potential alternates as follows (step 806). If the investment style manager provides rankings of stocks within the investment universe then, investment style data processor 154 selects 50 securities (outside the model portfolio) having alpha values less than, and 50 securities (outside the model portfolio) having alpha values greater than, the alpha value associated with the current security, and within the same economic sector as the model portfolio security. Investment style data processor 154 does not include securities that have an alpha value less than zero; however, if the investment style manager's alpha associated with the model portfolio security is less than zero then alternate securities having alphas less than zero are permitted.

For either the generated or provided list of alternate securities, investment style data processor 154 arranges the list of securities into a 101×1 matrix with the model portfolio security at the top, followed by the 100 potential alternates. Note that the matrix may be smaller depending on the number of potential alternates, if any, provided by the investment style manager. Investment style data processor 154 then retrieves the benchmark factor exposures (J×1 matrix, where J represents the number of factors) associated with the benchmark designated by the investment style manager (step 808). Investment style data processor 154 then selects the factor exposures for each model portfolio and potential alternate security, where the model portfolio securities appear before the potential alternates in a J×101 matrix (step 810). For each security and each factor exposure associated with each security, Investment style data processor 154 subtracts the benchmark factor exposure from the corresponding factor exposure for the security to calculate, as to each factor exposure, how much any given security differs from the underlying benchmark (step 812).

For each security, investment style data processor 154 then collapses the inter-relationships of the factor exposures into a single term to allow for assessment of how much each alternate security differs from the model portfolio security in relation to systematic risk (step 814). In one form, this is accomplished by computing $X^T \Omega X$, where X represents each security and the column of associated factor exposures (J×1 matrix), $X^T$ is the transpose of this matrix (1×J), and $\Omega$ is a J×J variance-covariance matrix of factors themselves.

Investment style data processor 154 then computes the how much the Annual Residual Variance for each security should be considered (step 816). In one embodiment, for each security, investment style data processor 154 selects the benchmark weight (i.e., the weight of the security in the benchmark), setting any alternate security weight not in the benchmark to zero. Then, for each security, investment style data processor 154 then computes the value of [(1−benchmark security weight)$^2$×Annual Residual Variance].

To compute a risk value for each security (step 818), investment style data processor 154 calculates the square root of the sum of 1) the value computed in step 816, and 2) the systematic risk (see step 814) associated with each security.

Lastly, to allow for an assessment of the best alternate security, investment style data processor 154 computes a risk-return information ratio comprising the alpha associated with the security over the risk value computed above (step 820). Investment style data processor 154 then subtracts the information ratio associated with the model portfolio security from the respective information ratios of the alternate securities (step 822). Investment style data processor 154 then arranges the securities in an ordered list starting with the alternate securities having the largest value resulting from step 822 (that is, the alternate securities having the highest risk-return information ratio relative to the model portfolio security) and running to the lowest value (step 824).

If the manager does not provide rankings for the investment universe then, investment style data processor 154 selects an alternate security based on the differences from the model portfolio security so as to select the most similar security as described by a single or multi-factor risk model. In one embodiment, selects 100 securities (not in the model portfolio) having a beta value less than, and 100 securities having a beta value greater than, the beta of the model portfolio security, and within the same Compustat sector (see step 832). However, if a manager provides a general alternate list, this is used instead (see steps 830 and 834).

Investment style data processor 154 then retrieves the factor exposures for the model portfolio security (J×1 matrix, where J is the number of factor exposures) (step 836) and constructs a J×200 matrix comprising the factor exposures for each potential alternate security (step 838). Investment style data processor 154 then subtracts the factor exposures associated with the model portfolio security from the corresponding factor exposures associated with each potential alternate security (step 840).

As discussed above, investment style data processor 154, for each potential alternate security, collapses the inter-relationships of the factor exposures into a single term to allow for assessment of how much each alternate security differs from the model portfolio security in relation to systematic risk (step 842). In one form, this is accomplished by computing $X^T \Omega X$, where X represents each security and the column of associated factor exposures (J×1 matrix), $X^T$ is the transpose of this matrix (1×J), and $\Omega$ is a J×J variance-covariance matrix of factor exposures themselves.

Investment style data processor 154 then compute a risk value for each potential alternate security by computing the square root of the sum of 1) the Annual Residual Variance for each security and, 2) the corresponding systematic risk value computed above for each security (step 844). The securities having the smallest risk values computed in step 844 are considered the most similar (step 846).

From the list of most similar securities (generated by either of the two methods provided above), investment style data processor 154, in one embodiment, selects at least the three, but as many as six, of the most similar securities (step 850) and, based on the investment style manager setting for active risk equivalents (see step 852), sets the alternate_security_type for all securities (step 854). In one embodiment, investment style data processor 154 ensures that there are at least two alternate securities from a different industry, and at least two securities from a different economic sub-sector.

D. Portfolio Optimization Platform

Portfolio optimization platform 40 collects requisite inputs from advisors, investment style managers, clients, and associated accounting systems and calculates adjustments to client portfolios optimized for after-tax returns. As discussed in more detail below, portfolio optimization platform 40 determines the optimal decisions for each client portfolio based on the tradeoffs among tax status and preferences of the client, the inputs provided by the investment style manager(s) associated with the portfolio, and the tax implications of all purchases and sales.

Figure 3:
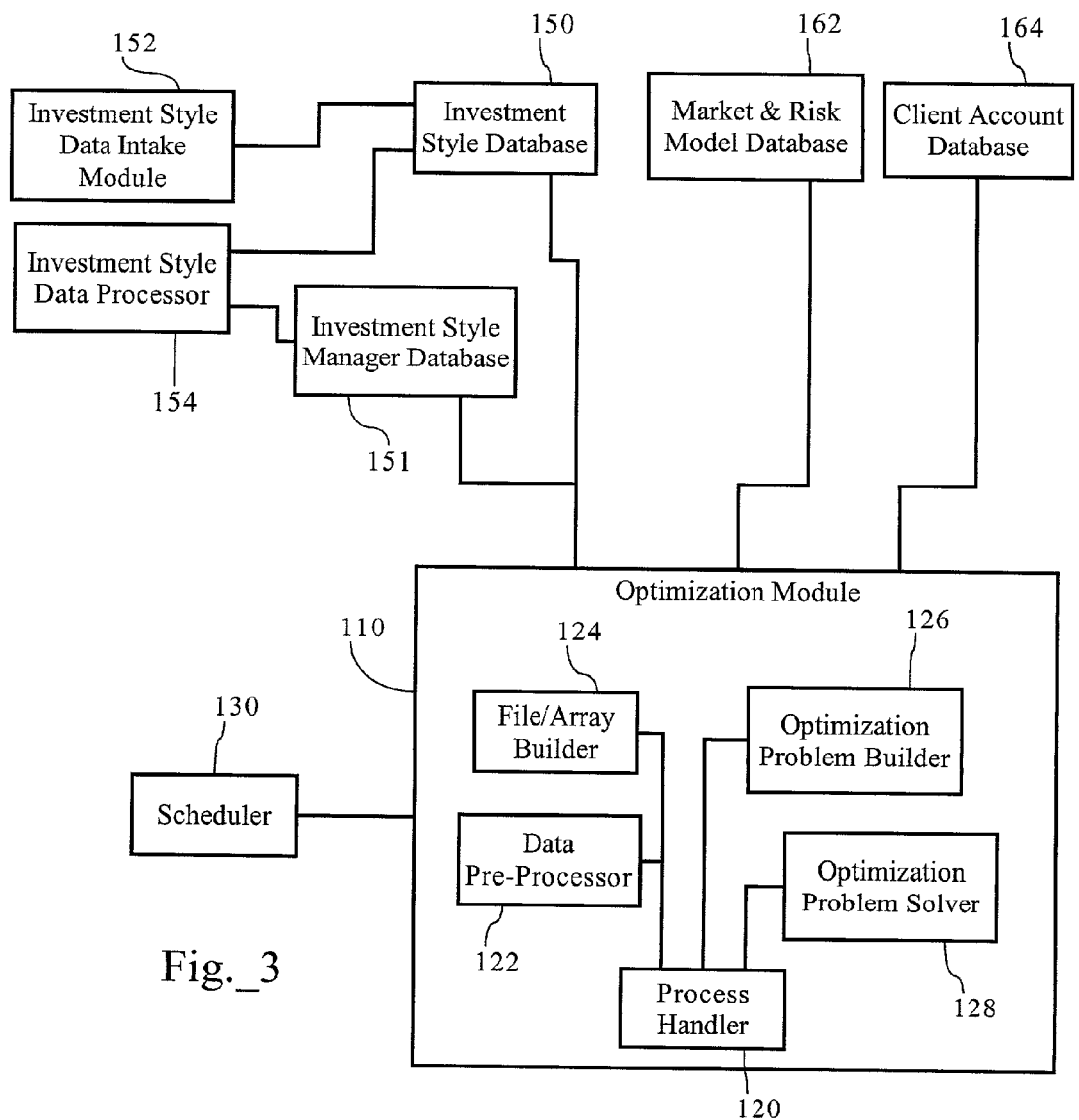
FIG. 3 is a functional block diagram illustrating the modules included in an exemplary embodiment of the portfolio optimization platform according to the present invention.

As FIG. 3 shows, portfolio optimization platform 40 comprises investment style data intake module 152, investment style data processor 154, scheduler 130, and optimization system 110. Portfolio optimization platform 40 further includes investment style database 150, investment style manager database 151, market Et risk model database 162, and client account database 164. Investment style data intake module 152 receives investment style data from managers and stores the data in investment style database 150 in association with corresponding investment style manager identifications. In one embodiment, an investment style manager that manages more than one investment style may have more than one investment style manager identification. Of course, any method for associating investment style data to corresponding investment styles can be used. Investment style data processor 154, as described above, processes investment style data for each manager to provide for a uniform set of inputs to optimization system 110. Investment style manager database 151 stores data and settings associated with each investment style manager. Such data can include administrative data, such as name, address, and other contact information. Such data can further include settings, such as portfolio construction parameters (e.g., alternate securities type, maximum security weights, portfolio benchmark, etc.). In one embodiment, certain portfolio construction parameters for each investment style manager can be configured by that manager, while other manager-specific settings are determined by persons or entities associated with the portfolio optimization platform 40. Market a risk model database 162 stores risk model and market data for use by optimization system 110, including pricing data for all securities, factor exposures for all securities to an associated risk model, factor variances, factor correlations with other factors, residual variances for individual securities, etc. Client account database 164 stores data relating to each client investor's portfolio, including but not limited to a client identification, address and other contact information, the investment style managers associated with the portfolio, tax preference and other optimization settings, etc.

Scheduler 130 schedules the optimization of client financial portfolios. In one embodiment, calculation of adjustments to a client portfolio occur on a periodic basis based on a setting stored in client account database 164 for each client investor, but may also be scheduled on an as-needed basis in response to changing market conditions, an explicit request from a client, and the like.

Optimization system 110 is the core component of portfolio optimization platform 40 as it calculates adjustments to individual financial portfolios. Process handler 120 manages the overall optimization process and hand tasks off to the various software modules and associated servers in a distributed computing environment. In one embodiment, process handler 120 passes each discrete task to the appropriate module as a message. In one embodiment, such messages are passed using the SMTP protocol; of course, any suitable protocol for transferring files and other data in a distributed computing environment can be used, such as XML and SOAP technologies. File/array builder 122 and data pre-processor 124 operate to retrieve required inputs from the databases described above and build the files and arrays used to construct the optimization problem. Both file/array builder 122 and data pre-processor 124 include several modules executing the functionality more fully described below. In one embodiment, the files and arrays constructed by builder 122 and pre-processor 124 can be stored in a shared file space for access by later processes. Problem builder 126 operates to construct the optimization problem from the files and arrays constructed by file/array builder 122 and data pre-processor 124. Problem solver 128 solves the optimization problem and returns a solution. Problem solver 128, in one embodiment, includes standard optimization software designed to maximize a given objective function in light of a pre-defined set of constraints. Suitable optimization software packages include, but are not limited to XPRESS-MP, offered by Dash Optimization of Bilsworth Northants, UK, FORT-MP offered by OptiRisk Systems of Uxbridge, Middlesex, UK, and Premium Solver Plus 3.5 offered by Frontline Systems of Incline Village, Nev.

The databases described above can be any form of database known in the art (for example, a relational database or flat-file database). In one embodiment, each database has associated therewith a collection of computer programs enabling the storage, modification, and extraction of information in the database. The databases may be stored on any suitable device ranging from personal computers (for small systems) to mainframes (for large systems). In addition, the functionality of the various modules described above is executed by a plurality of servers implemented in hardware or software, or a combination of both. In one embodiment, each server is a programmable computer executing computer programs, comprising at least one processor, a data storage system, at least one input device, and at least one output device.

II. Operation of Exemplary Embodiment(s)

FIG. 4 illustrates the types of data and the overall process flow involved in the management of financial portfolios according to an embodiment of the present invention. Portfolio optimization platform 40 operates on inputs such as client data 202, investment style manager data 204, internal system settings 206, tax lot detail data 208, and market and risk data 210, to calculate adjustments to individual financial portfolios designed to optimize after-tax returns taking into account such factors as risk, return and the effect of taxes. The various inputs discussed above come from investment style managers (see section I.C., infra), clients (and/or the advisor associated therewith), account management systems 80, market data feeds and any other suitable source of data. On a pre-determined schedule and/or based on specific commands, the optimization process, initiated by scheduler 130, is conducted for a client financial portfolio.

In pre-processing step 212, file/array builder 122 and data pre-processor 124 retrieve required inputs, such as the model portfolios associated with the current client portfolio, client preferences, current portfolio data, and the like. Data pre-processor 124 screens and processes the inputs in order to facilitate construction of the optimization problem—e.g., what tax rates to use, which transactions should not be conducted for tax code reasons, etc. (see below). As more fully described below, file/array builder 122 constructs the arrays and files used in the optimization. The output of this process is the input for the optimization (step 214) (in one embodiment, a series of arrays or files that get passed via process handler 120 (see FIG. 3) to dedicated servers executing optimization problem builder 126 and optimizer 128 designed to set up and solve the optimization problem). The output of the optimization is a set of recommended trades to improve the forecasted performance of the client financial portfolio balancing risk, return and transaction costs including the affect of taxes on returns. In one embodiment, a portfolio manager reviews the recommended trades prior to execution (see step 216). A portfolio manager can review the recommended trades for any suitable criteria. For example, a review may be conducted to evaluate the tracking error to the model portfolios associated with the client portfolio, the tax consequences of the recommended trades, the number of trades being generated, and compliance with the investor's preferences relating to tax exposure and investment policy.

In one form, the review process involves both automated and non-automated aspects. In one embodiment, an automated tax cost module calculates the tax cost of the recommended trades, while an automated tracking error module estimates the tracking error to the model portfolios associated with the account. In addition, a portfolio manager may assess whether the optimization should be re-run in light of intervening circumstances, if any. For example, the price of some securities may have moved from the point in time the optimization was run. Whether the price movement is substantial enough (i.e., whether, based on the type of inputs and the client account, it makes sense to rerun the optimization) is committed to the discretion of a portfolio manager.

Once the review is conducted and the trades are approved, back office integration server 50 creates trade files that can be loaded into the appropriate account management system 80 for execution (step 218). Where possible, the trades are reviewed inside account management system 80 for restrictions, intra-account wash sales, and any other limitations imposed by the advisor, client or other entity as a quality control check and then the trades are committed to a trade desk 86 (step 220).

In one embodiment, the variables and calculations associated with the optimization of a client's portfolio relate to the client's portfolio as a whole. In embodiments discussed above, where each investment style corresponds to a separate account relative to account management system 80, the recommended adjustments to the client's financial portfolio must be converted to a per-account basis. For example, assume for didactic purposes that the current allocation of the client portfolio for a particular investment style manager is 26% of the total portfolio and that the optimization yields a variable that indicates holding 1.35% in IBM for manager 1 (the percentage based on the total portfolio). This percentage, therefore, must be converted to the appropriate percentage relative to the account corresponding to that investment style manager (5.19% in the example above). In one embodiment, back office integration server 50 converts and aggregates the trades on a per account basis and then formats the trade files as appropriate to the specific accounting package associated with account management system 80, such as Security APL. This enables the accounting/trade management system to achieve the intent of the optimization, such as picking the specific tax lots to sell (known as specific identification), ensuring that the trades match the custodial systems record of tax lots (this process is known as trading-versus-purchase), and ensuring that the appropriate purchases are executed against the cash in the account and the cash that will result from the sale of securities.

In one embodiment, optimization of a client financial portfolio involves a pre-processing phase (step 212) and an optimization phase (step 214). As discussed more fully below, in the pre-processing phase file array builder 122 and data pre-processor 124 pull required data and assemble the data arrays and files used to construct the optimization problem. The data files and arrays essentially define the optimization problem for the particular client portfolio and, in some instances, constrain the optimization process (e.g., locking a variable associated with selling a security to zero to prevent the sale of a tax lot) to ensure compliance with client objectives, portfolio construction rules, as well as tax and other regulatory issues (e.g., preventing wash sales). The optimization phase involves simultaneously optimizing the individual holdings of a client financial portfolio on an after tax basis across all investment style managers associated with and having an allocation of the portfolio.

A. Pre-Processing of Data

Figure 5A:
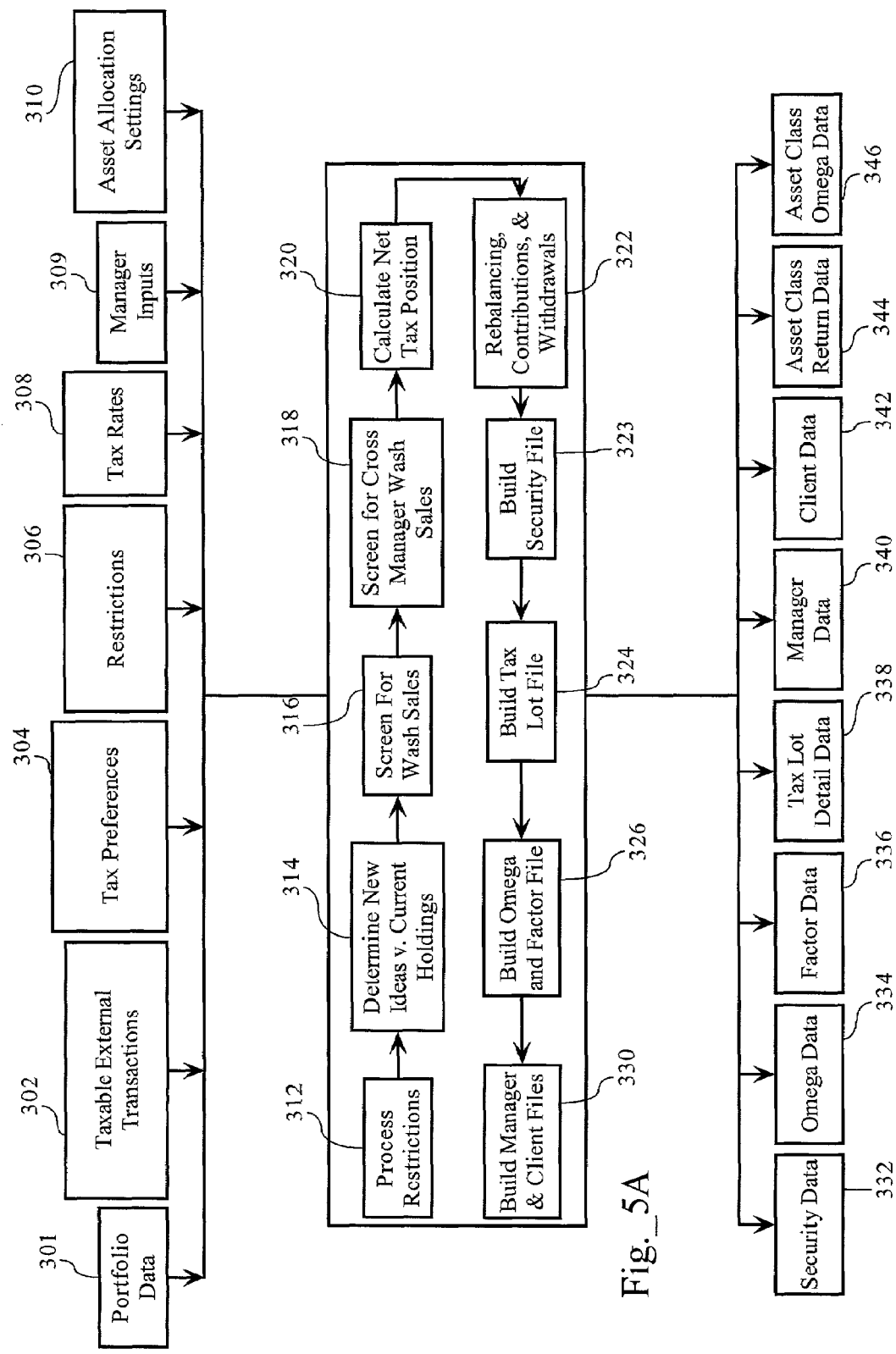
FIGS. 5A, 5B and 5C.
Figure 5B:
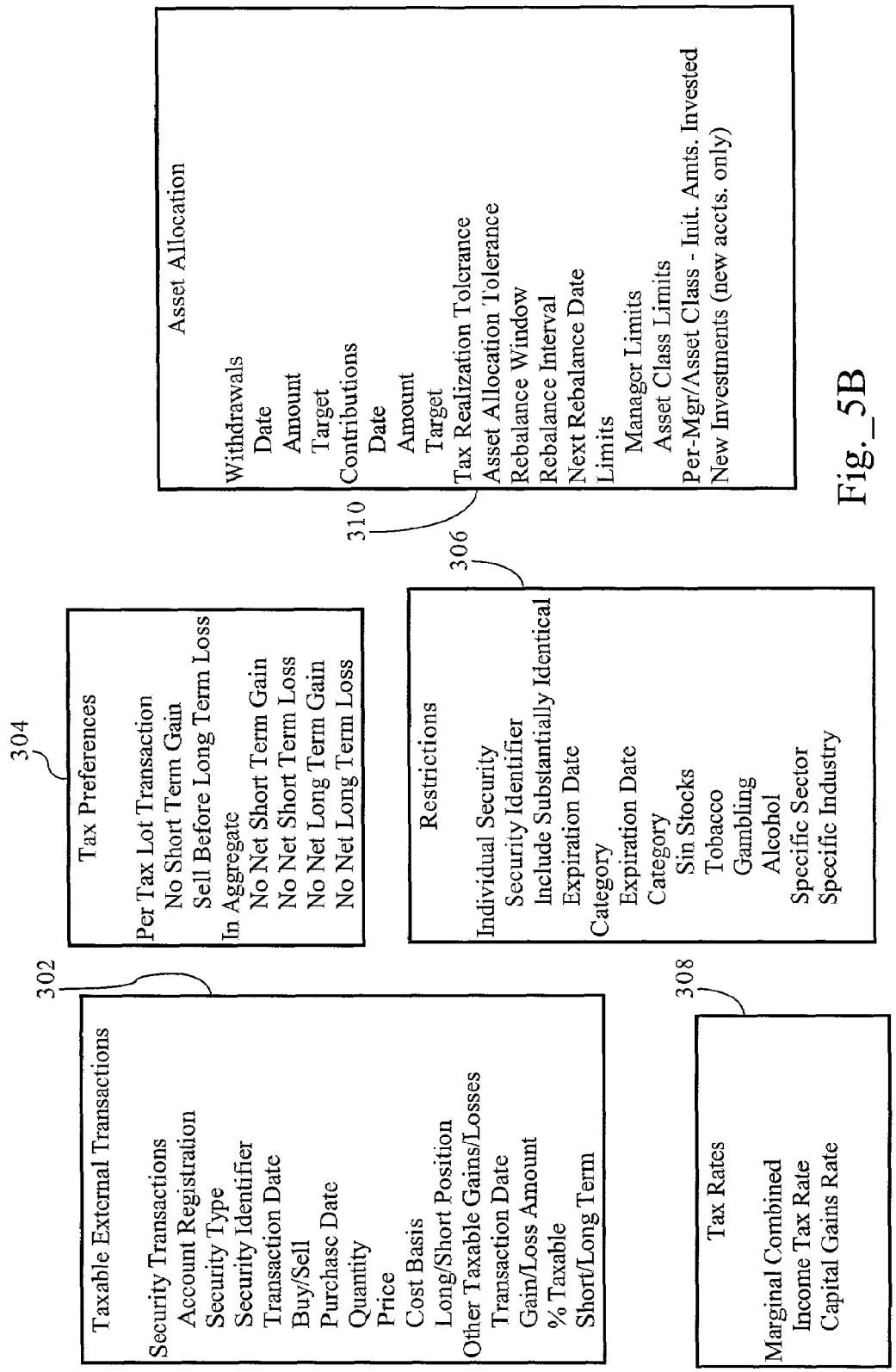
Figure 5C:
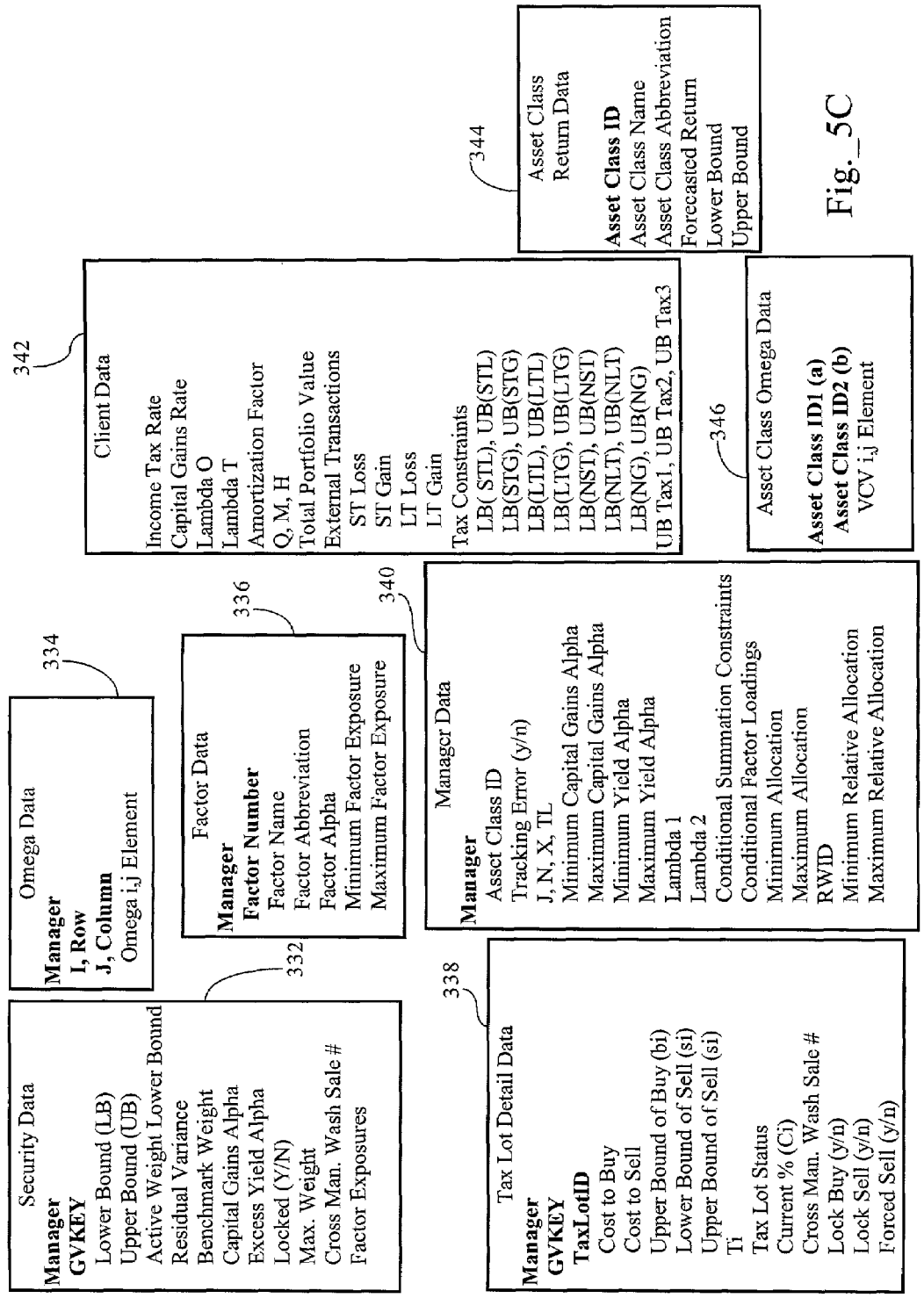

FIG. 5A illustrates the data and overall processing involved in one embodiment of the pre-processing phase of a portfolio optimization. As FIG. 5A illustrates, file/array builder 122 and data pre-processor 124 retrieve data from various sources including, but not limited to, portfolio data 301, taxable external transactions data 302, tax preferences 304, restrictions 306, tax rates 308, manager data 309, and asset allocation settings 310. FIG. 5B sets forth some of the data fields involved in one embodiment of the invention. In one embodiment, account management system 80 maintains portfolio data 301, including data relating to the current holdings of the portfolio, past transactions, and tax lot detail data. Manager data 309 includes the investment style data of the investment style managers associated with the account. Boxes 312 through 330 provide an illustrative set of pre-processing stages performed on the data inputs to yield the files and arrays to be used in the optimization problem. As more fully described below, these files and arrays include security data 332, omega data 334, factor data 336, tax lot detail data 338, manager data 340, client data 342, asset class return data 344, and asset class omega data 346. The operations involved in the various pre-processing steps set forth in FIG. 5A are set forth below. FIG. 5C sets forth the types of data resulting from the pre-processing steps in one embodiment of the present invention.

A.1. Process Restrictions

A restricted security is any security that a client investor has explicitly elected not to own in his portfolio. One embodiment also supports restricting categories of securities. Groups of securities that a user may restrict include sin stocks (e.g., tobacco, alcohol and gambling, etc.). Other restriction category requests may include companies "involved" in pornography, firearms, and the like.

To enforce any securities restrictions the client investor has placed on financial portfolio, data pre-processor 124, in step 312, compares any restrictions the client has placed on the account and compares them to current holdings and potential holdings (based on a review of the managers' respective model portfolios). In some cases, a client investor may have a restriction that was not violated when a security was initially purchased, but corporate actions (such as mergers and divestitures) and/or changes in the company's revenue sources may result in a violation of a security restriction (for example, a client owns a company's stock that acquires another company whose main source of revenue is from selling tobacco—the client has a restriction against holding "tobacco stocks"). When this situation exists, based on rules specified by the client (e.g., notify and request action from client, sell stock irrespective of tax consequences, etc.) data pre-processor 124 determines the appropriate action to take. In addition to current holdings, investment style managers make decisions for their respective model portfolios, irrespective of client specific restrictions. These decisions may result in the selection of a client-restricted security. In this case, data pre-processor 124 finds the most similar alternate security that meets client restrictions. By searching for alternate securities (ideally identified by the manager, but in some cases identified by other sources) and integrating these into the investment process, the client maintains a similar degree of concentration and risk/return profile for his or her portfolio. In the event that no alternate security exists and/or all alternate securities are all restricted, a hole is left in the portfolio. In other words, a model portfolio with 30 securities will now only have 29 securities during the optimization of the current portfolio. Data pre-processor 124 calculates the model portfolio weights (benchmark weights) based on the 29 securities. As discussed above, in the event that a suitable alternate security exists, data pre-processor 124 substitutes the alternate for the original model portfolio security. If the alternate type is flagged as an active risk equivalent (see Section I.C.1.a.3., supra), the alternate security gets the model portfolio weight of the original, otherwise, the model weights are calculated based on the 30 original model portfolio securities, the restricted security is included in the optimization with a zero allowed weight (UB=0) and the alternate security is included in the model but with a model portfolio weight of zero. As discussed more fully below, data pre-processor 124 enforces securities restrictions by performing such actions as modifying the security data file (e.g., flagging a security for a forced sate) or by omitting/replacing the restricted security from the array of securities in the resulting optimization problem.

Figure 6:
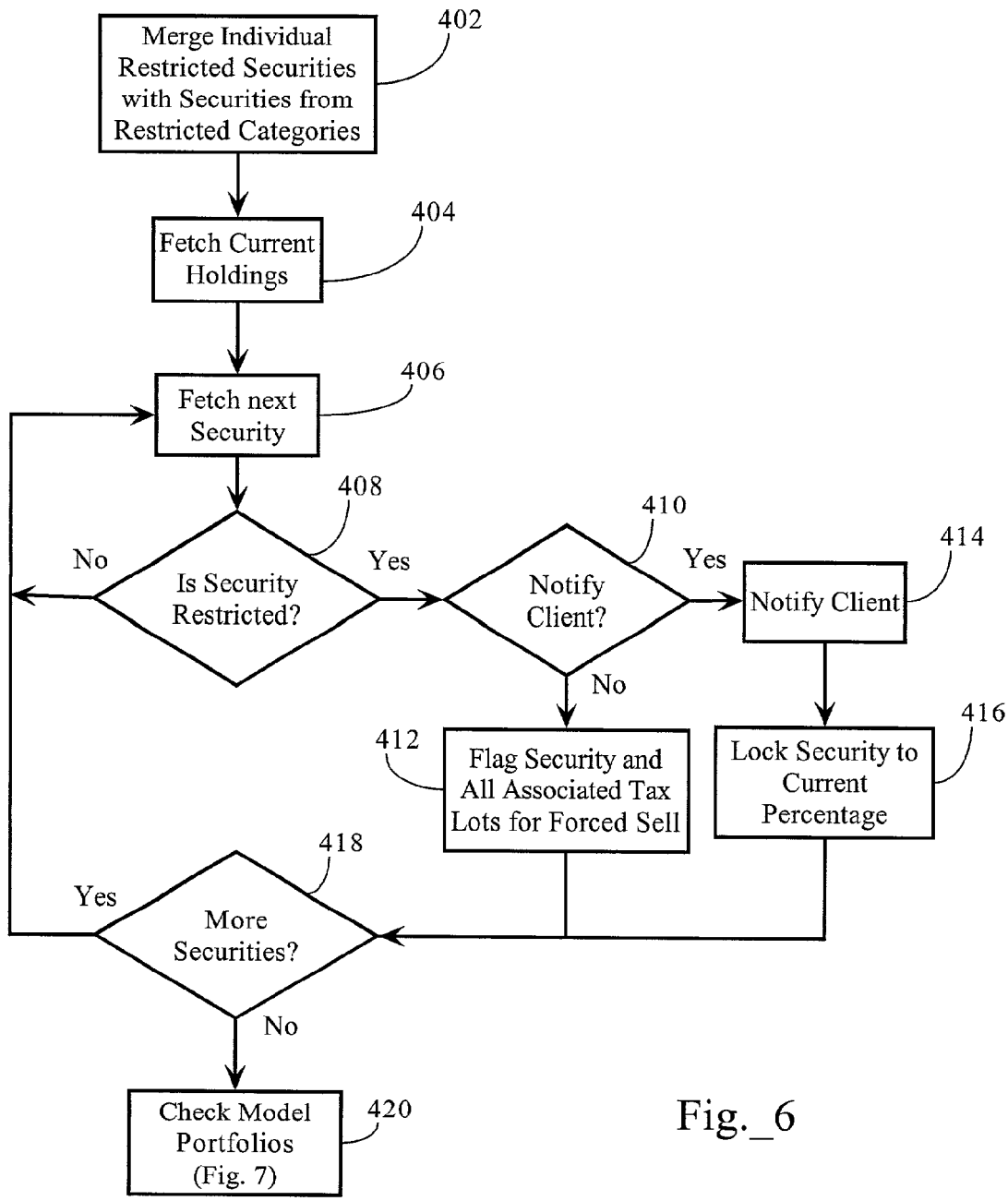
FIG. 6 is a flow chart diagram that provides a process involved in identifying and processing restricted securities.
Figure 7:
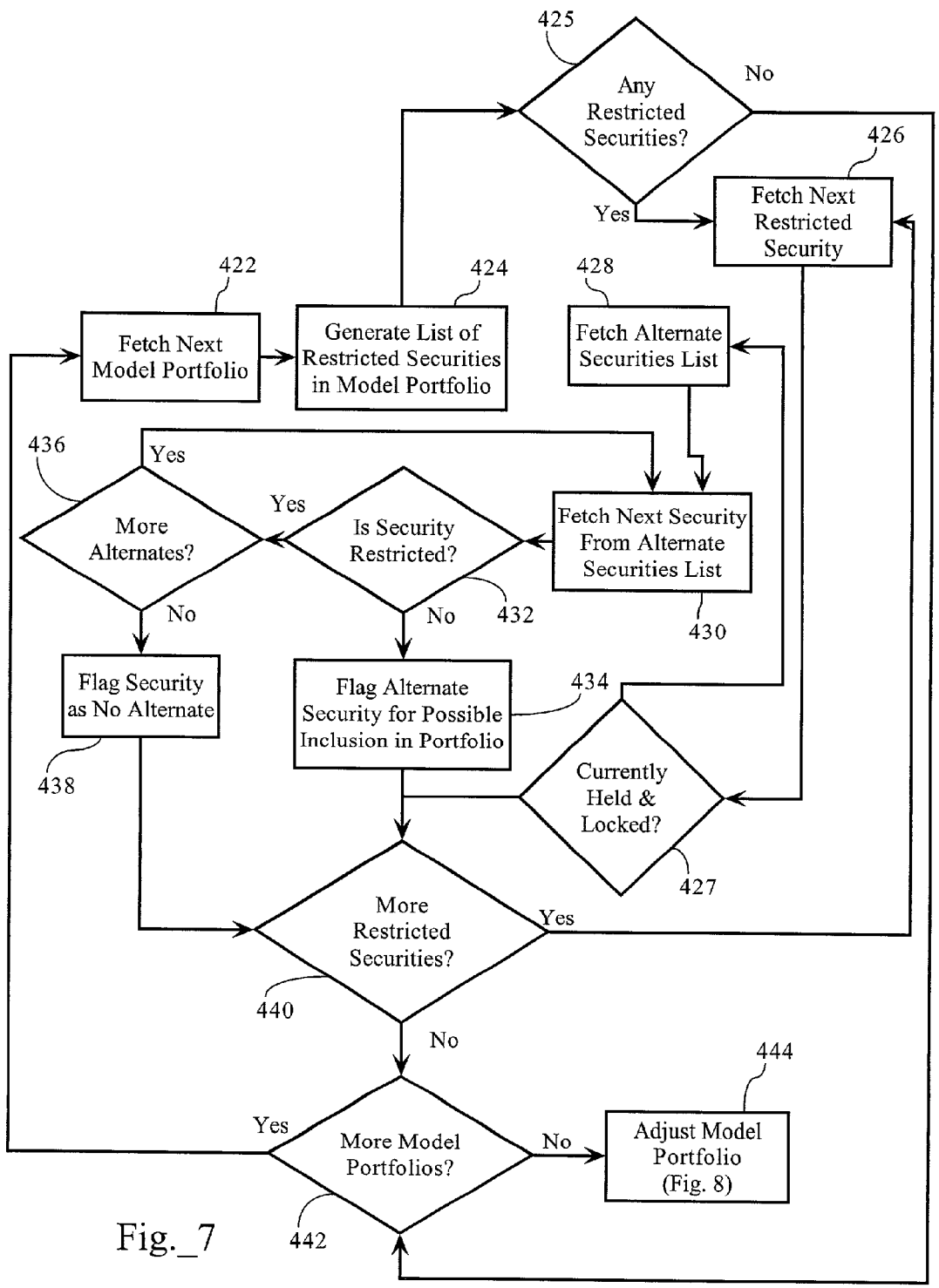
FIG. 7 is a flow chart diagram illustrating a process involved in identifying and processing restricted securities.
Figure 8:
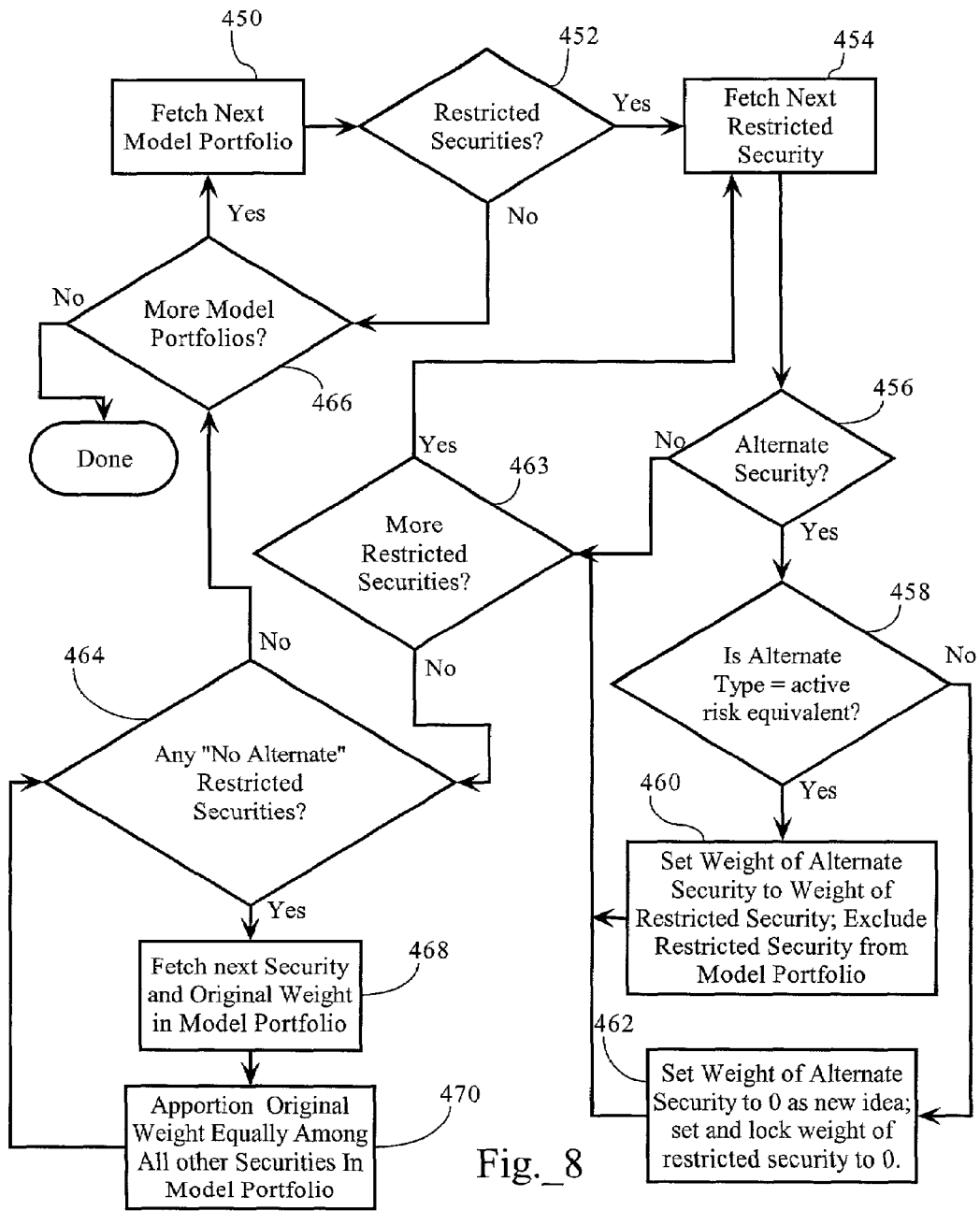
FIG. 8 is a flow chart diagram that sets forth a process involved in identifying and processing restricted securities.

FIGS. 6, 7 and 8 illustrate how restricted securities and/or categories thereof specified by the client investor are processed according to one embodiment of the present invention. Data pre-processor 124 first merges all individually restricted securities with the securities corresponding to any restricted categories into a list (FIG. 6, step 402). Data pre-processor 124 then fetches the current holdings of the client's financial portfolio (step 404). Starting with the first currently held security (see step 406), data pre-processor 124 compares it to the restricted securities list to determine whether it is restricted (step 408). If the security is restricted, data pre-processor 124 flags the security and all associated tax lots for a forced sale (step 412). If the client has opted to be notified of a security restriction (see step 410), data pre-processor 124 transmits a notification to the client, via e-mail or any other suitable means, and locks the security to its current percentage in the portfolio (step 412). This process is repeated for all currently held securities (see step 418). As discussed in more detail, a security is locked to its current percentage during an optimization by setting the upper (UB) and lower (LB) bounds on the weight variable for that security to its current percentage (see Section II.B.3.A.1, & Table 5 infra).

If any currently held, but restricted security is locked, data pre-processor 124 keeps the restricted security in the model portfolio, otherwise, data pre-processor 124 attempts to find an alternate security. In one embodiment, data pre-processor 124 checks the model portfolios of the investment style managers associated with the client investor's portfolio for restricted securities (see step 420 and FIG. 7). Data pre-processor 124 fetches the list of securities in the first model portfolio (see FIG. 7, step 422) and generates a list of restricted securities, if any, in the model portfolio (step 424). If there are any restricted securities in the model portfolio (step 425), data pre-processor 124 fetches the first restricted security (step 426) and, if the security is not currently held in the portfolio and locked (step 427), retrieves the list of alternate securities associated with it, if any (step 428). Starting with the first security in the list of alternates (see step 430), data pre-processor 124 determines whether it is also a restricted security (step 432). If not, data pre-processor 124 flags the alternate security for possible inclusion in the model portfolio (step 434).

Otherwise, data pre-processor 124 continues to the next security and repeats this sub-routine until the list of alternates is exhausted (see steps 430 and 436). If no alternate security is found, data pre-processor 124 flags the restricted security as having no alternate (step 438). Data pre-processor 124 repeats this process for all restricted securities in the current model portfolio (see step 440) and for all model portfolios of the investment style managers associated with the client's portfolio (see step 442). Data pre-processor 124 then adjusts the model portfolio as described in more detail below (see step 444 and FIG. 8).

Beginning with the first model portfolio (see FIG. 8, step 450), data pre-processor 124 checks to see if any restricted securities exist (step 452). If not, data pre-processor 124 proceeds to the next model portfolio (see steps 466 and 450). If the model portfolio includes any restricted securities, data pre-processor 124 fetches the first restricted security (see step 454) and determines whether an alternate security has been flagged for it (step 456). If the alternate type for the alternate security is an active risk equivalent (see step 458), data pre-processor 124 replaces the restricted security with the alternate and sets the weight of the alternate security to that of the restricted security from the model portfolio (step 460). Otherwise, data pre-processor 124 sets the weight of the alternate security to 0 as a new idea and sets and locks the weight of the restricted security to 0 (step 462). This process is repeated for all restricted securities in the current model portfolio (see step 463). Then, for all restricted securities flagged (by either the system or directly by the investment style manager) as having no alternates (see step 464), data pre-processor 124 retrieves the restricted securities and their respective original weights in the model portfolio (step 468) and apportions the weights among all other securities remaining in the model portfolio (step 470) on a pro rata basis with respect to the weight of each other security. As above, this process is repeated for all model portfolios associated with the client's financial portfolio (see steps 466 and 450).

A.2. Determine New Ideas v. Current Holdings

In pre-processing step 314, data pre-processor 124 identifies all current holdings of the client investor's portfolio and compares them to the model portfolios of the respective investment style managers associated with the current portfolio to identify any "new ideas"—i.e., any security that the client does not currently hold, but may be included in the optimization process. This process is performed separately as data pre-processor 124 performs several other pre-processing operations dependent on whether a particular security is a current holding or new idea.

A.3. Screen for Wash Sales

Per the current IRS Tax Code, a wash sale is a sale at a loss of a tax lot within 30 days before of after a purchase of the same security. The intent of the wash sale rule is to prevent a taxpayer from taking a loss on their income tax return without changing their investment position. If this rule did not exist, a taxpayer could sell a stock and buy it back immediately, thus maintaining their position but taking a tax loss on their income tax return.

In terms of a holistic investment process, wash sales are analyzed in two ways. First, based on historical client transactions outside the portfolio as they relate to past transactions within the managed portfolio. Generally the system will avoid this from happening but in the case the client provides backdated transaction data, this may occur. If this occurs, the system determines appropriate adjustments to the cost basis of all securities internal and external to the portfolios under management as more fully described in section II.A.5, infra. Second, the system screens for outside client transactions as they relate to potential transactions resulting from the current optimization of the portfolio. (See Sections II.A.3., 4. & 5.) Historical client transactions deal with any transaction executed on behalf of or made directly by the client that, when combined with all other historical transactions for that client, resulted in a wash sale. An example of a historical transaction would be when the client, in a self-directed account, buys a particular stock and, within 30 days, a manager of a wrap account owned by the client sells the same stock at a loss. The loss the manager realized would thus be passed on to the client's cost basis in the stock he purchased. The opposite may also be true where a client sells at a toss and a manager purchases the same security; in this case, the cost basis of the stock the manager purchased should be adjusted. If this is not done correctly then decisions based on the cost basis of the securities in the client's portfolio will err to the extent of the accounting transaction error.

In addition to adjustments of cost basis based on historical transactions, it is also possible to generate a wash sale based on the results of an optimization. For example, if a client sells at a loss and the manager adds the stock to his model portfolio. If this stock were purchased for the client within 30 days of the aforementioned client sale this would be a wash sale.

Therefore, the optimization must be controlled to avoid this purchase and either delay the purchase, purchase a suitable alternate or conduct the purchase and account for the wash sale correctly. In the case of a sale, the optimization need only restrict the tax lots that are at a loss as wash sales do not apply to sales for a profit.

Figure 9:
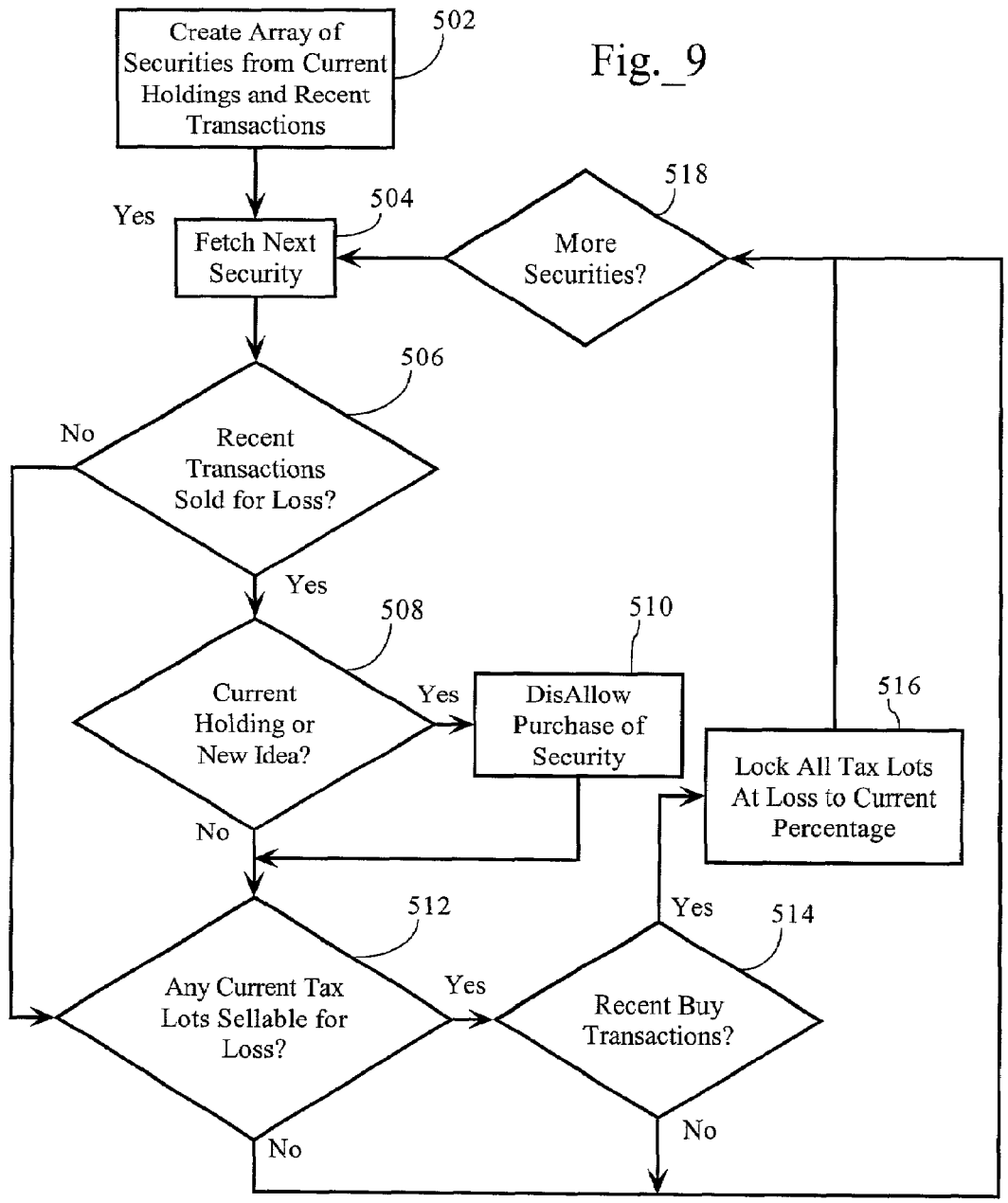
FIG. 9 is a flow chart diagram illustrating a method facilitating the identification and prevention of a potential wash sale.

FIG. 9 illustrates a method facilitating the identification and prevention of a potential wash sale. In one embodiment, data pre-processor 124 creates an array of securities from the current holdings in the client's portfolio and all securities bought or sold within the last 30 days for the portfolio and outside the managed portfolio (step 502). As discussed above, clients and/or advisors provide outside transaction data to the system, ideally, as soon as possible after they occur. Starting with the first security in the array (see step 504), data pre-processor 124 determines whether the security was sold for a loss within the foregoing 30 days (step 506). If the security is a current holding or a new idea (see above) (step 508), data pre-processor 124 operates to disallow the purchase of the security (step 510). For a new idea security, data pre-processor 124 can either lock its weight value to 0 or omit it from its corresponding model portfolio data file entirely. If the security is a current holding, data pre-processor 124 operates to constrain or prevent the purchase of a security by locking a variable associated with the modeled purchase of the security in the optimization to zero (see discussion of optimization, infra). Data pre-processor 124 then determines whether any currently-held tax lots for the security are at a loss (step 512). If there are any recent buy transactions associated the security (step 514), data pre-processor 124 locks all tax lots currently at a loss to their current weight (step 516). Data pre-processor 124 repeats this process for all securities in the array assembled in step 502 (see steps 518 and 504).

A.4. Cross-Manager Wash Sales

Due to the fact that management of a client portfolio can be allocated to at least two investment style managers, the possibility exists that an unconstrained optimization will generate a wash sale. For example, if a portion of a client's portfolio corresponding to one investment style manager holds a security at a loss and any other investment style manager adds the stock to its model portfolio, an unconstrained optimization process could possibly result in the sale of the stock at a loss and the purchase of the stock, thereby generating a wash sale. To avoid such "cross-manager" wash sales, data pre-processor 124 identifies potential wash sales and constrains the optimization to allow for either the purchase of the security or the sale of the security, but not both. In one embodiment, the optimization utilizes binary constraints to prevent such wash sales (see below). It is also important to note that, while this example describes a portion of the portfolio corresponding to one manager owning the security at a loss and another portion of the portfolio buying the security, it may in fact be possible that several portions (accounts) of the portfolio own the security and several managers desire to purchase the security, as reflected in their model portfolios.

Figure 10:
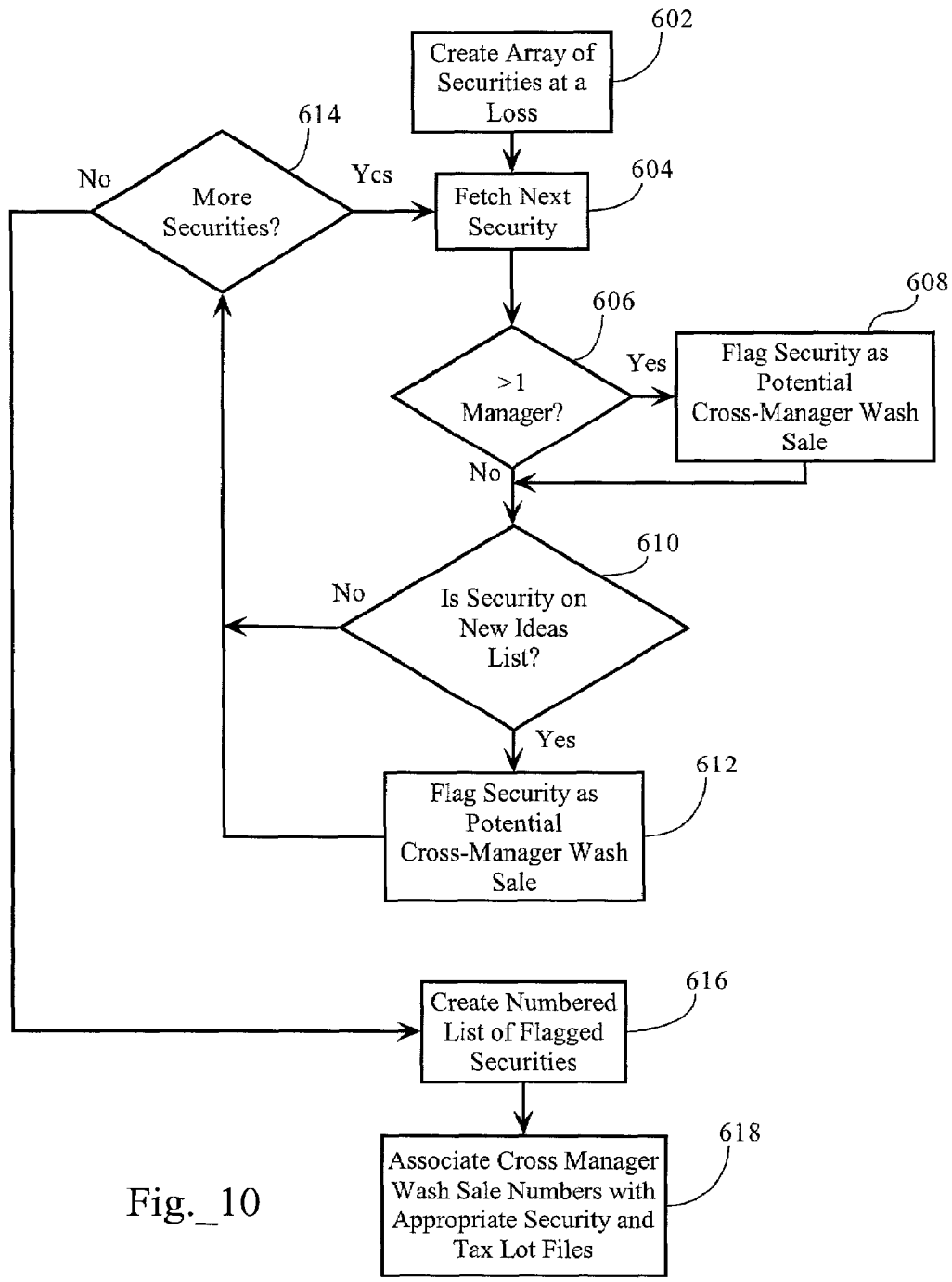
FIG. 10 is a flow chart diagram detailing a method for identifying potential cross-manager wash sales.

FIG. 10 sets forth a method for identifying potential cross-manager wash sales. As FIG. 10 shows, data pre-processor 124 creates an array of securities that are in the current tax lot file at a loss (step 602). Starting with the first security in the array (see step 604), data pre-processor 124 counts all investment style managers associated with the security as reflected in the tax lot file 338. If there is more than one investment style manager associated with the security (step 606), data pre-processor 124 flags the security as a potential cross-manager wash sale (step 608). Data pre-processor 124 then determines whether the security appears in the new ideas list (step 610). If so, data pre-processor 124 flags the security as a potential cross-manager wash sate (step 610). Data pre-processor 124 repeats this process for all securities in the array created in step 602 (step 614). Data pre-processor 124 associates a unique wash sale number to each security flagged as a potential cross-manager wash sale (step 616) and modifies the security and tax lot files 332 and 338 to include the appropriate wash sale numbers (step 618). During construction of the optimization problem, the tax lots flagged as potential cross manager wash sales will have binary constraints associated therewith that prevent a wash sale (see below).

A.5. Net Tax Position

As FIG. 5A shows, data pre-processor 124 also calculates the client investor's net tax position—i.e., the aggregation of all taxable transactions for the current tax year (step 320). In one embodiment, the system includes the ability to incorporate external taxable events for the client and incorporate these transactions and the internal transactions in the management of tax policies for the client. Any historical wash sales (see Section II.A.3., supra) as well as all taxable transactions are considered in the process. Once the specific tax position is known, then the optimization process can manage tax exposure around this status. For example, a particular client may elect to avoid any taxable gains if at all possible. By calculating any events for which the client has provided data and all internal transactions for the tax year from within the managed portfolio, the system can constrain the optimization to minimize the net taxes paid. In one embodiment, in the event that there are enough losses to harvest within the client's portfolio, the optimization will generate losses to net out taxable gains while avoiding wash sales, related entity sales, etc.

Figure 11:
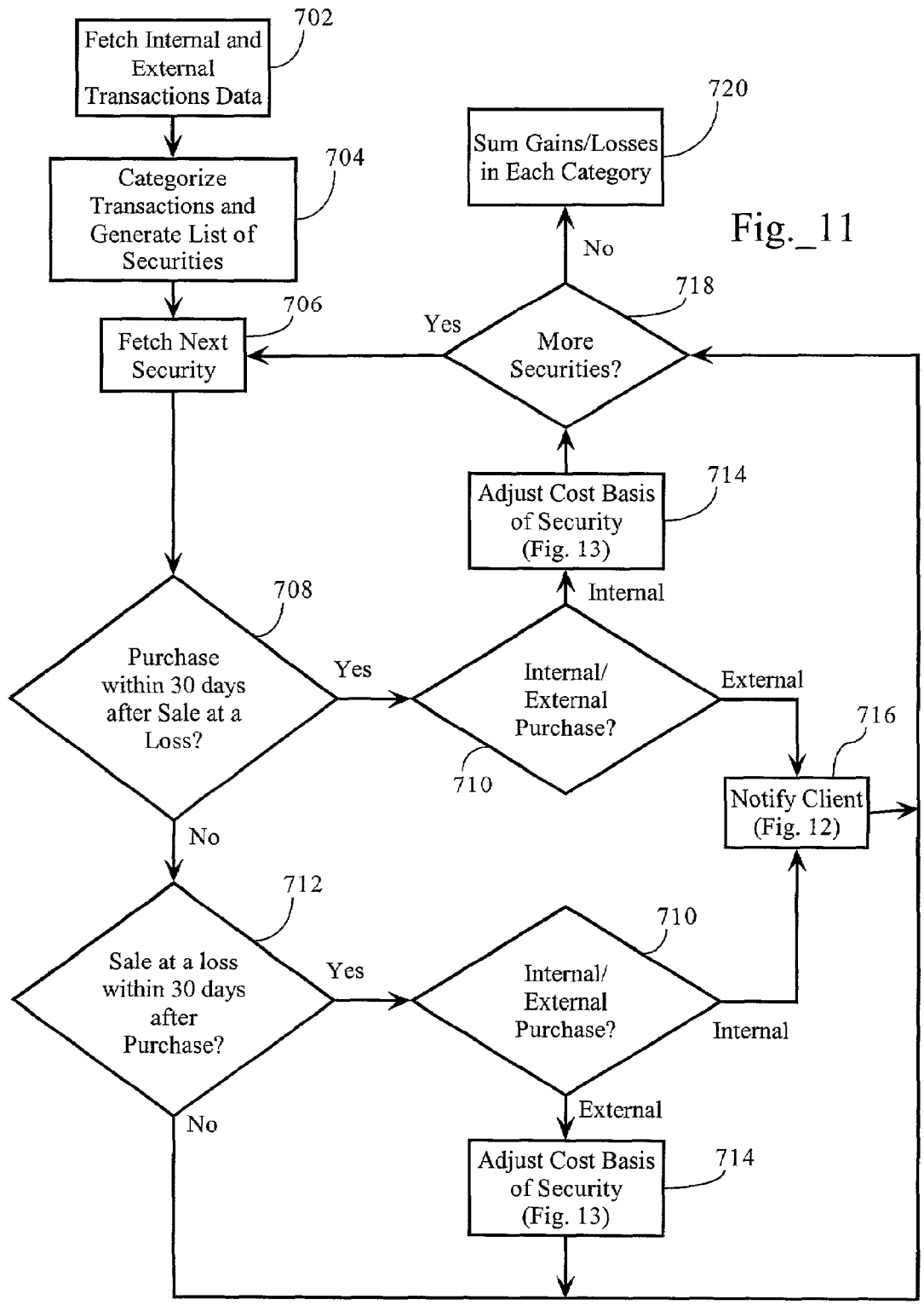
FIG. 11 is a flow chart illustrating a first method for use in calculation of the net tax position for a client investor.
Figure 12:
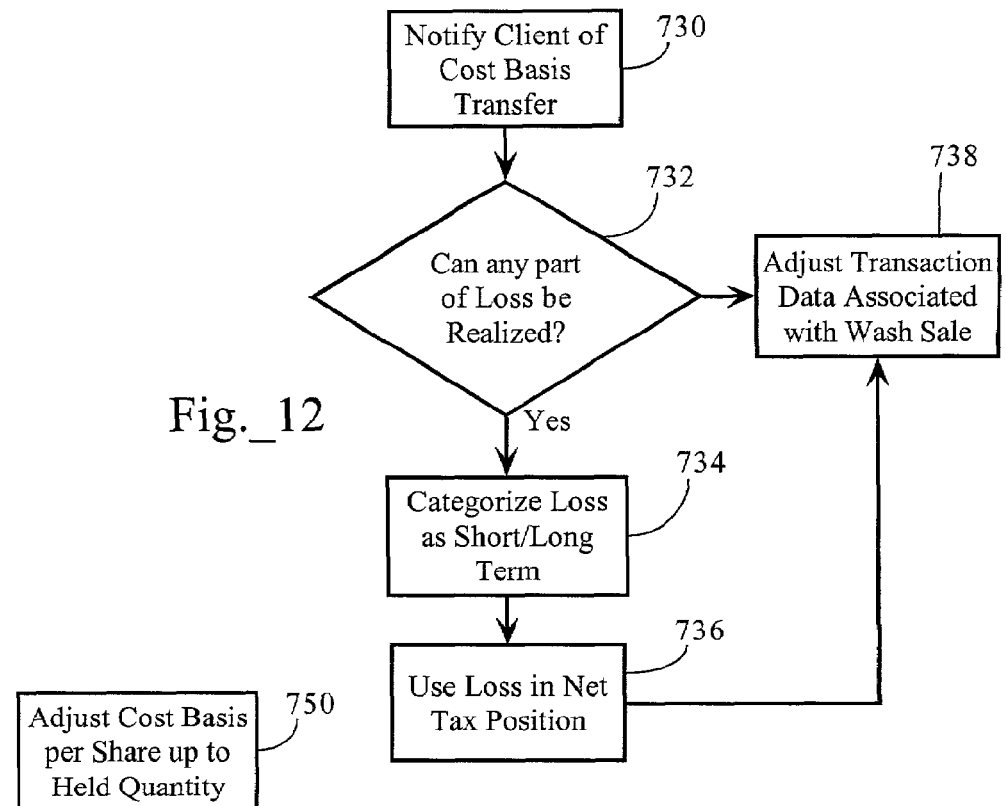
FIG. 12 is a flow chart providing a second method for use in calculation of the net tax position for a client investor.
Figure 13:
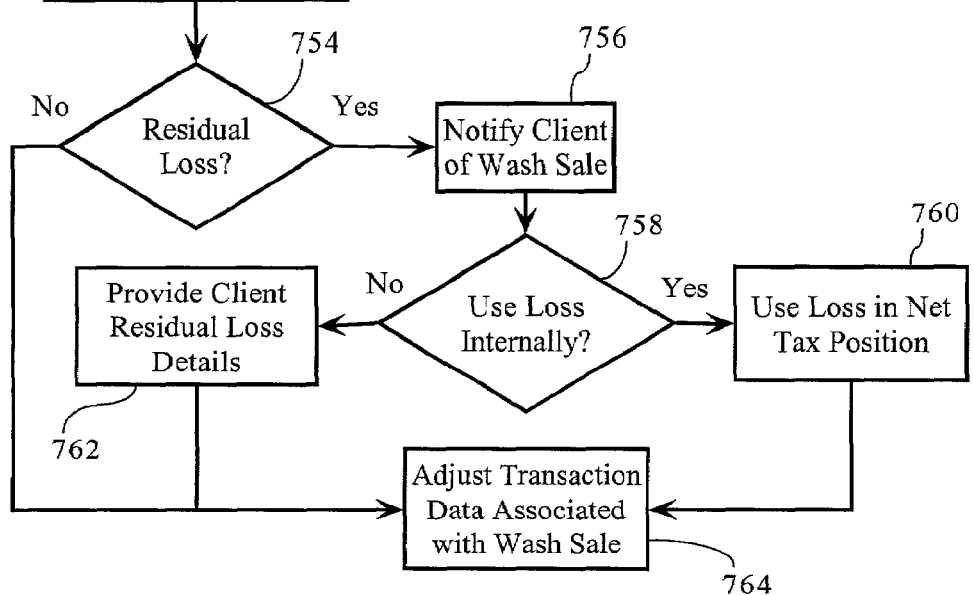
FIG. 13 is a flow chart setting forth a third method for use in calculation of the net tax position for a client investor.

FIGS. 11, 12 and 13 illustrate a method allowing for calculation of the net tax position for a client investor taking into account external transactions and adjustments based on wash sales, if any. In one embodiment, data pre-processor 124 retrieves all external taxable events (such as the sale of a real estate, stocks, bonds, etc.) collected from the client via the advisor platform, all internal transactions associated with the client's portfolio during the current tax year and for thirty days prior to the start of the current tax year (, and all external securities transactions within the current tax year and for thirty days prior to the start of the current tax year (FIG. 11, step 702). Note that future embodiments will take account of ultra-long term holdings (i.e., assets purchased after Jan. 1, 2001 and held for at least 5 years) resulting from the Tax Payer Relief Act of 1997. Data pre-processor 124 categorizes all transactions in one of four categories based on net effect (i.e., gain or loss) and the term (i.e., long or short) (step 704) and generates a list of securities involved in the transactions. Data pre-processor 124 defaults to short term if no term data is available and/or applicable for a particular transaction. Data pre-processor 124 then scans the transactions for wash sales. Starting with the first security in the list (see step 706), data pre-processor 124 scans the internal and external transactions data for any purchase of the security within 30 days after a sale of that security for a loss (step 708). If such a wash sale condition exists, if the sale at a loss was internal to the managed portfolio (see step 710), data pre-processor 124 adjusts the cost basis of the security (step 714), as more fully described below (see also FIG. 13). If such a condition exists and the sale was external to the managed portfolio, data pre-processor 124 notifies the client as more fully described below (see step 716 and FIG. 12). Data pre-processor 124 also determines whether the security was sold at a loss within 30 days after the purchase of the security (step 712). If such a condition is found and the purchase was external to the managed portfolio (step 710), data pre-processor 124 adjusts the cost basis of the security (step 714). If the purchase was internal to the managed portfolio, data pre-processor 124 notifies the client (step 716). Data pre-processor 124 repeats this process for alt securities in the list (see step 718) and then, in each category, aggregates the gain/loss amounts for all transactions (step 720).

FIG. 12 illustrates a method invoked when the client is to be notified of a wash sale affecting the cost basis of a security held externally to the managed portfolio. Data pre-processor 124, in one embodiment, notifies the client of the wash sate and the transfer of cost basis to the client's currently held shares in the security (step 730). The shares held by the client external to the portfolio inherit the cost basis of the shares previously held in the managed portfolio. The client should also increase the holding period by the holding period of the wash sale transaction. Data pre-processor 124 then determines whether there is any residual loss from the wash sale that may be considered in the net tax position (step 732) and categorizes the loss based on holding period (step 734). The residual loss, if any, is ultimately included in calculating the client's net tax position (step 736 and FIG. 11, step 720). Data pre-processor 124 then adjusts the transaction data (e.g., dates and other inputs) associated with the wash sale such that these transactions do not appear in future screens for wash sales (step 738).

FIG. 13 illustrates a process invoked (see FIG. 11, step 714) when data pre-processor 124 detects a wash sale affecting the cost basis of a security held by the managed portfolio. On a per share basis, data pre-processor 124 adjusts the cost basis of the tax lots of the security currently held by the managed portfolio as appropriate (step 750) and adjusts the transaction date for the internally held tax lot(s) by the holding period of the wash transaction (step 752). If there is any residual loss (see step 754), data pre-processor 124 notifies the client of the wash sale and validates whether such residual loss should be used internally to the managed portfolio (steps 756 and 758). If the client wishes to use the loss internally, data pre-processor 124 uses the residual loss in calculating the client's net tax position (see step 760 and FIG. 11, step 720). Otherwise, data pre-processor 124 provides the client with the details surrounding the residual loss for his or her own use (step 762). In either event, data pre-processor 124 modifies the transaction data associated with the wash sale such that the associated transactions do not appear in future wash sale screens (step 764).

A.6. Rebalancing, Contributions & Withdrawals

As discussed above, when client investors request withdrawals from their respective portfolios, portfolio optimization platform 40 calculates an optimal solution for achieving the withdrawal. Contributions to the client portfolio are handled in a similar manner. As the following indicates, any contribution, withdrawal and/or rebalancing decision is processed to essentially calculate the upper and lower bounds on manager and asset allocations during optimization of the current portfolio.

Contributions to a client portfolio, withdrawals from a client portfolio, and rebalancing of the client portfolio to achieve a target asset allocation are all interrelated in that they affect the allocation of the portfolio among the investment style managers and hence the overall asset allocation. Contributions and withdrawals can be targeted (the client and/or advisor selects the investment style manager to withdraw from or contribute to) or general where portfolio optimization platform 40 determines where best to route the transaction for purposes of risk, return and taxes. Similarly, rebalancing can be forced (highly discouraged) to specified targets that ignore the current tax status and estimates of risk and return for asset classes or can be optimized in which case portfolio optimization platform 40 determines the best asset allocation by considering the risk and after-tax return potential of each asset class as well as the net tax position of the client investor.

In one embodiment, file/array builder 122 retrieves and/or computes the following data for the processing of contributions, withdrawals and rebalancing (step 322): 1) contribution/withdrawal amount, 2) contribution/withdrawal target preference (assumed to be general if not specified), 3) next rebalancing date, 4) rebalance interval (e.g., in days), 5) rebalance window (e.g., in days), 6) manager allocation rebalance preferences, including deviation percentage (if any) and absolute limits (if any), 7) asset allocation rebalance preferences, including deviation percentage (if any) and absolute limits (if any), 8) all current holdings by investment style manager, 9) current market value of holdings by manager, and 10) an asset class identifier (e.g., Large Cap Growth, Mid-Cap Value, etc.) (Manager Asset Class ID) for each manager.

According to one approach, in the event that a client investor makes a contribution or withdrawal and has selected or is scheduled for rebalancing, the only option for contributions and withdrawals is non-targeted. In other words, a client cannot contribute assets targeted specifically for a manager and then have a rebalancing that ultimately moves the cash to another manager. Therefore, according to one embodiment, there are four potential cases to be implemented for any given optimization: a) targeted contribution/withdrawal without rebalancing; b) non-targeted contribution/withdrawal with or without rebalancing; c) rebalancing only (no contribution/withdrawal); and d) no rebalancing and no contribution/withdrawals.

Targeted contributions and withdrawals without rebalancing are achieved by locking all manager allocations and adding the contribution or withdrawal to the selected manager/managers. Non-targeted contributions/withdrawals are handled by adjusting the total portfolio value by the amount of the contribution (+) or withdrawal (−) and then allowing the fully invested constraint inside the optimization (optimization result as a % of the total portfolio value must equal to 100%) to force allocation of the adjustment—in this case manager allocations are slightly unlocked. Rebalancing is handled by unlocking the manager allocations and can coincide with the total portfolio value change described above. If there are no contributions and/or withdrawals and rebalancing is not scheduled or selected then manager allocations are locked to their current percentage.

Figure 15A:
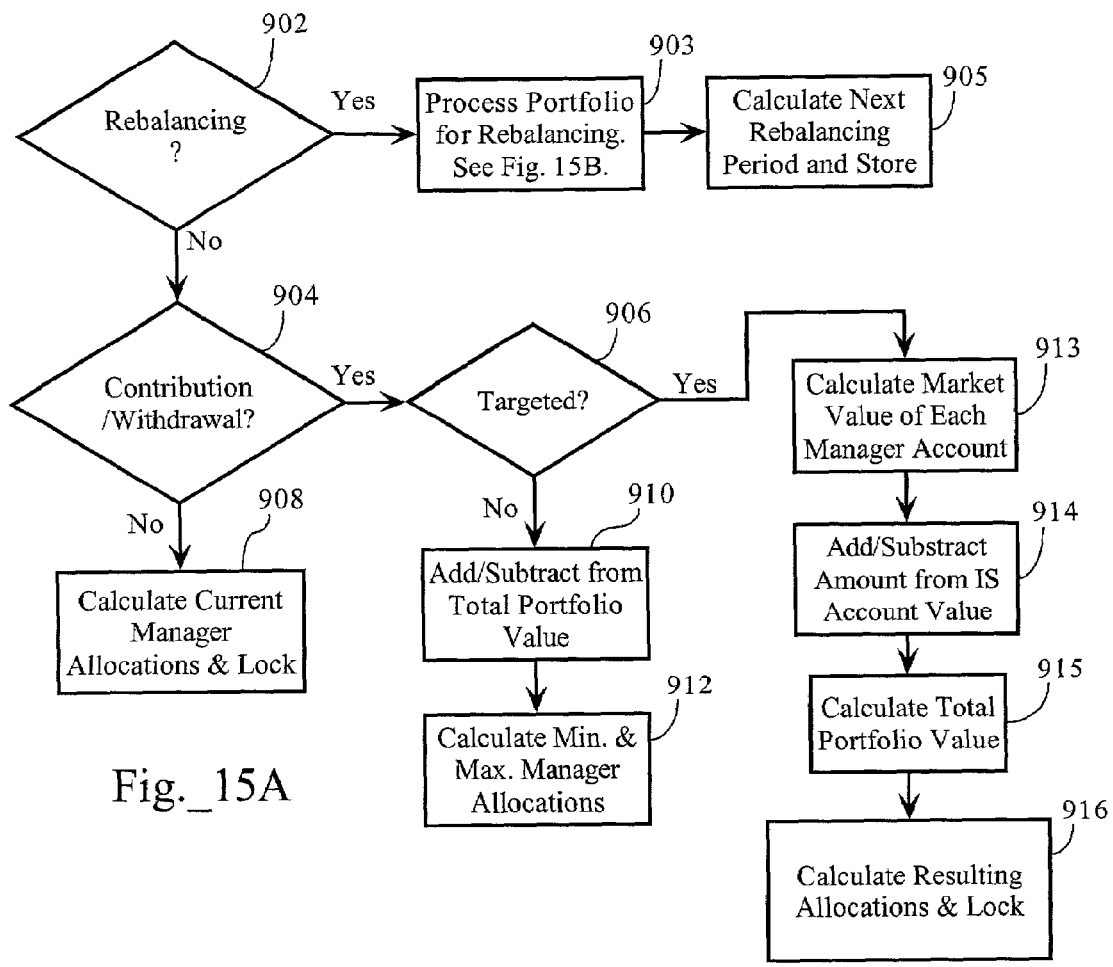
FIGS. 15A-E are flow chart diagrams providing methods involved in the pre-processing of inputs relating to contributions to, withdrawals from and rebalancing of a client portfolio.

FIGS. 15A-15E are process flow diagrams illustrating how data pre-processor 124 processes requests for contributions to, withdrawals from, and the decision to rebalance a client portfolio according to one embodiment of the invention. FIG. 15A sets forth the general process flow. Data pre-processor 124 first determines whether the current client portfolio is set for rebalancing (FIG. 15A, step 902). In one form, a client portfolio has associated therewith a rebalancing date, which could be set to rebalance the portfolio monthly, quarterly, annually, etc. In one embodiment, if the current date and the next rebalancing date are within a rebalancing window (i.e., a system setting of, for example, ±30 days), data pre-processor 124 processes the client portfolio for rebalancing (step 903) (see below). In addition, as discussed above, a particular client portfolio may be explicitly set for rebalancing on an as-needed basis by the client, advisor, and/or a portfolio manager.

A.6.a. No Rebalancing/No Contributions or Withdrawals

In the simplest case where the client portfolio is not set for rebalancing and there are no contributions or withdrawals requested (see step 904), data pre-processor 124 computes the current allocations among the investment style managers associated with the account and locks them to these percentages (step 908). In one embodiment, data pre-processor 124 calculates the current market value of each investment style manager account and sums the resulting market values to obtain the total portfolio value. Each investment style manager's allocation is the market value of the corresponding account over total portfolio value. To lock these current allocations, data pre-processor 124 sets the minimum and maximum investment style manager allocations (which are the lower and upper bounds of each managers allocation in the optimization) to the respective current allocations.

A.6.b. No Rebalancing/Non-Targeted Contribution or Withdrawal

If the client portfolio is not set for rebalancing (step 902) and a non-targeted contribution or withdrawal has been requested for the portfolio (step 904), data pre-processor 124 calculates the resulting total portfolio value (step 910) and adjusts the minimum and maximum allocations corresponding to each investment style manager based on the amount of the contribution/withdrawal (step 912). In one form, data pre-processor 124 calculates the current market value of each investment style manager account and aggregates the resulting account market values, and the amount of the contribution(s) and withdrawal(s), to obtain the total portfolio value. Data pre-processor 124 then sets the minimum allocation for each investment style manager to the corresponding account value less the withdrawal amount (if any), divided by the total portfolio value. Data pre-processor 124 also sets the maximum allocation for each investment style manager to the corresponding account value plus the contribution amount (if any), divided by the total portfolio value.

A.6.c. No Rebalancing/Targeted Contribution or Withdrawal

If a requested contribution or withdrawal is targeted for a particular investment style manager (step 906), data pre-processor 124 calculates the current market value of each investment style manager account (step 913) and adds the contribution amount to and/or subtracts the withdrawal amount from the appropriate investment style manager account(s) (step 914). Data pre-processor 124 then aggregates all investment style manager accounts to calculate the total portfolio value (step 915). Data pre-processor 124 calculates the resulting investment style manager allocations (i.e., current manager account value (after step 914)/total portfolio value) and locks these allocations (step 916). As discussed above, data pre-processor 124 locks the allocations by setting the respective minimum and maximum manager allocations to the manager allocations resulting from step 916.

A.6.d. Rebalancing

If the client portfolio is set for rebalancing, data pre-processor 124 computes the values of parameters related to manager allocations and asset allocations used in the optimization to allow for rebalancing (FIG. 15A, step 903). Data pre-processor 124 also computes the next rebalancing period and stores it in client account database 164 (step 905). In one embodiment, data pre-processor 124 computes the next rebalancing period by incrementing the current date by a rebalancing interval (e.g. every quarter or year) associated with the portfolio in client account database 164.

Figure 15B:
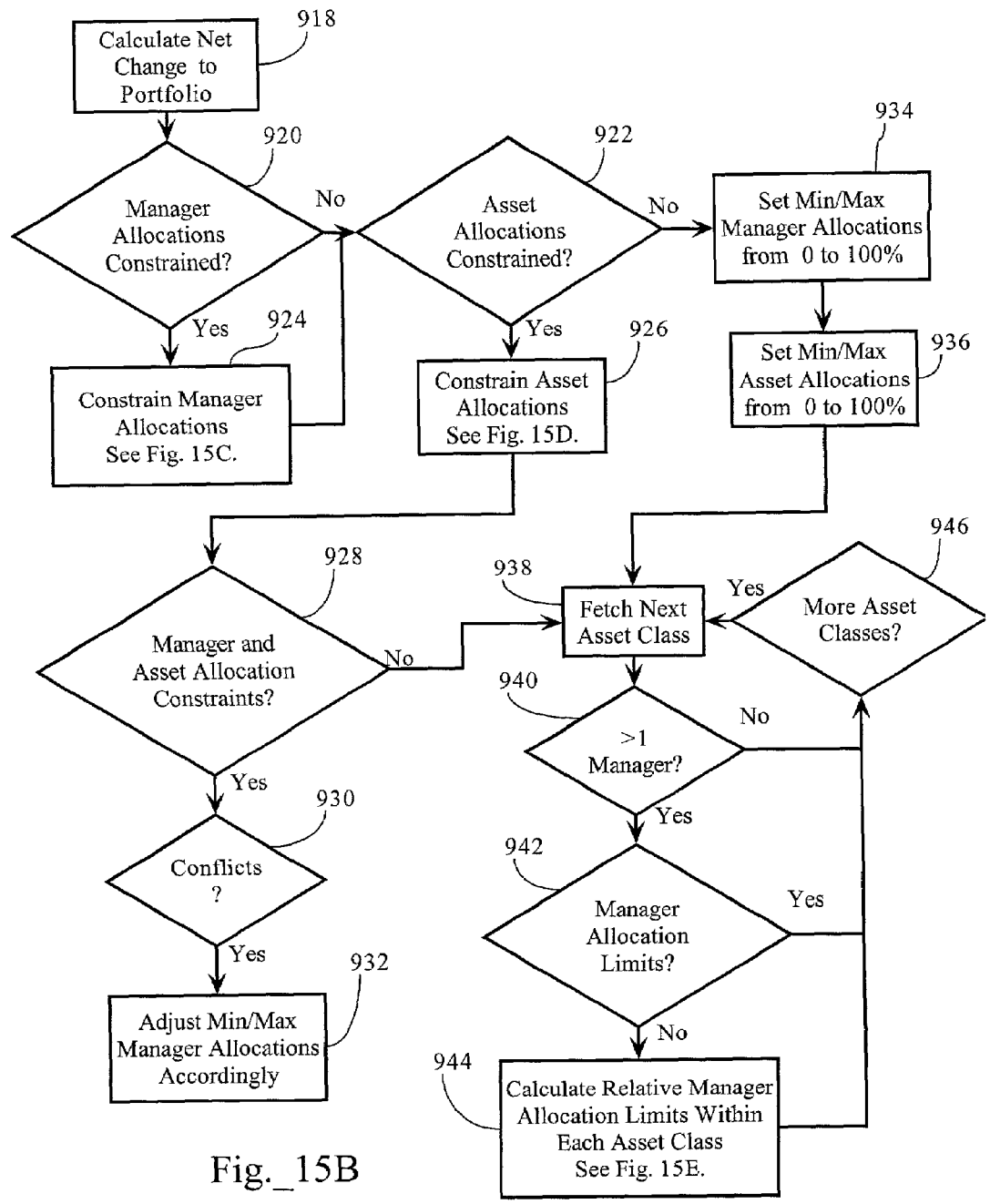

FIG. 15B sets forth the process flow involved in computing the manager and asset allocation variables for use in an optimization involving rebalancing. In one form, data pre-processor 124 calculates the total portfolio value resulting from the requested withdrawal or contribution (step 918). In one embodiment, this is accomplished by calculating the market value for each investment style manager account and aggregating the market values with the requested contribution or withdrawal. Data pre-processor 124 then determines whether the preferences and settings associated with the client portfolio include any manager allocation constraints (e.g., deviation and/or absolute limits) (step 920). If so, data pre-processor 124 operates to constrain the manager allocations (step 924) by calculating the minimum and maximum allocation parameters for each investment style manager. (See FIG. 15C and discussion below). Manager and asset allocation constraints, such as the maximum deviation from the current allocation and absolute allocation limits, are configurable parameters. In one embodiment, such constraint parameters are specified by an advisor, but may also be configured by other sources, including the entity associated with portfolio optimization platform 40 by default.

In addition, if the client portfolio includes asset allocation constraints (step 922), data pre-processor 124 operates to constrain the asset allocation parameters used in the optimization (step 926) (see FIG. 15D and discussion below). If the portfolio includes both manager and asset allocation constraints and there is more than one manager in at least one asset class (step 928), data pre-processor 124 checks the resulting minimum and maximum allocation parameters for each manager and each asset class for conflicts (step 930). If any conflicts exist, the asset allocation constraints control; data pre-processor 124 adjusts the minimum and maximum manager allocation constraints accordingly (step 932). To check for conflicts, data pre-processor 124 first sums, for each asset class, the minimum manager allocation parameters for managers associated with the asset class and compares it to the corresponding maximum asset allocation parameter. If the sum of the minimum manager allocations exceeds the maximum allocation for that asset class, data pre-processor 124 decreases each minimum manager allocation on a pro-rata basis to create a feasible solution. In addition, data pre-processor 124, for each asset class, sums the maximum manager allocations for managers associated with the asset class and compares this sum to the corresponding minimum asset allocation. If the sum of the maximum manager allocations does not exceed the minimum asset allocation for that asset class, data pre-processor 124 increments the maximum manager allocation constraints on a pro-rata basis such that they aggregate to at least the minimum asset allocation for that asset class. If there are no manager or asset allocation constraints, data pre-processor 124 sets the minimum and maximum manager allocations to 0 and 100%, respectively (step 934). Data pre-processor 124 also sets the minimum and maximum asset allocations to 0 and 100%, respectively (step 936).

However, if any asset class has more than one investment style manager associated therewith and no manager allocation constraints have been computed, data pre-processor 124 associates relative manager allocation constraints to each manager account within the asset class. Relative manager allocation constraints operate to control the ratio of the amount invested between each investment style manager account within an asset class and to ensure that one investment style manager is not eliminated entirely during the optimization. In one embodiment, data pre-processor 124 determines whether each asset class includes more than one investment style manager (see steps 938, 940 and 946). If an asset class includes more than one investment style manager and no manager allocation constraints have been computed (step 942), data pre-processor 124 calculates the relative manager allocation constraints within the asset class (step 944) (see also FIG. 15E and discussion below).

1) Constraining Manager Allocations

Figure 15C:
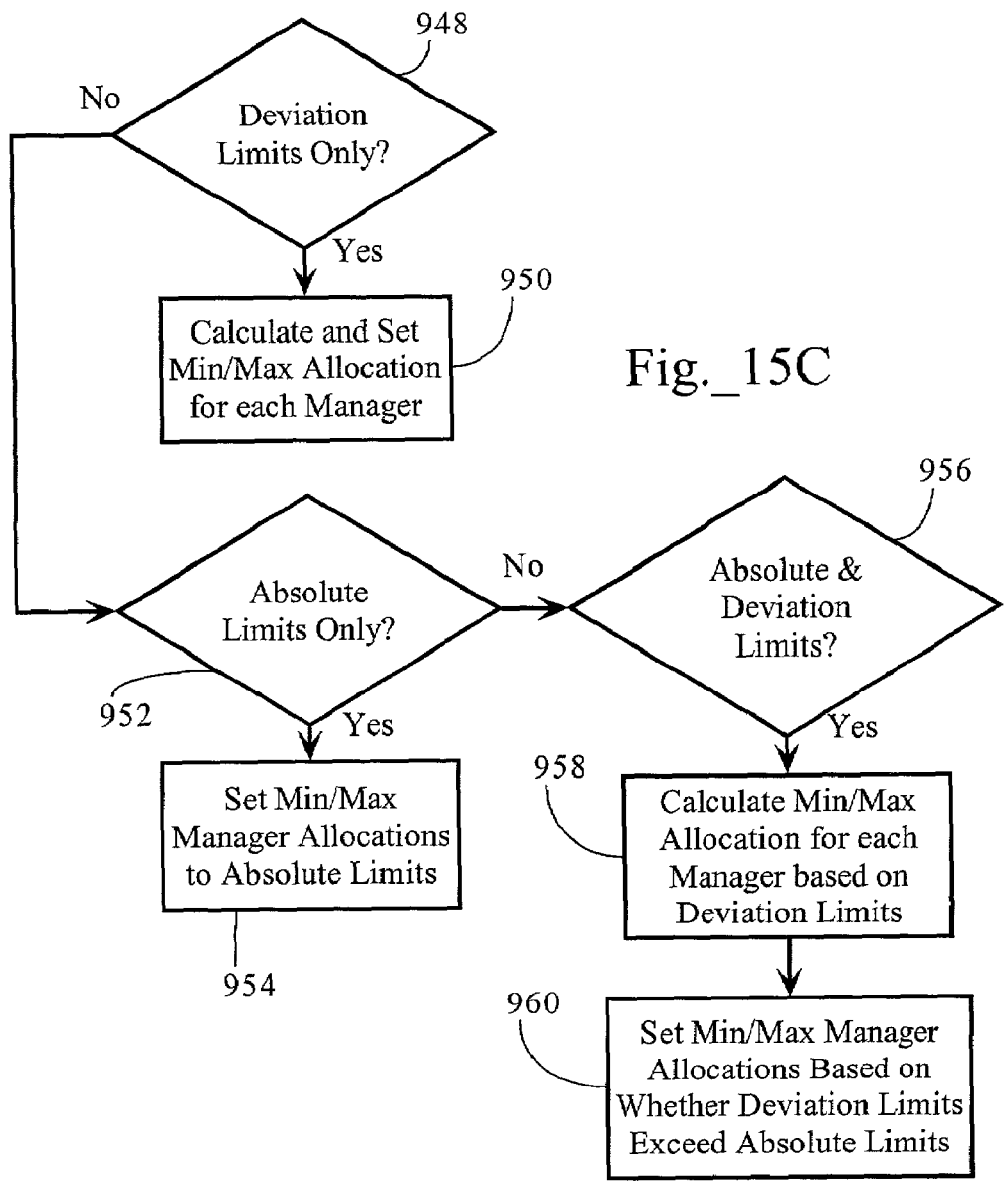

FIG. 15C illustrates a method allowing for the calculation of minimum and maximum manager allocations based on portfolio preferences or settings relating thereto. Data pre-processor 124 first determines the number and types of manager allocation constraints associated with the portfolio. If only a deviation limit is specified (i.e., a maximum deviation from current manager allocations) (step 948), data pre-processor 124 calculates and sets the minimum and maximum allocations for each manager (step 950). In one embodiment, data pre-processor 124, ignoring contributions and withdrawals, calculates each manager's current allocation as the current market value of the corresponding manager account over the sum of the current market values for all manager accounts. Data pre-processor 124 then multiplies the deviation limit by each current manager allocation to yield the deviation amount. To set the maximum manager allocation, data pre-processor 124 adds the resulting deviation amount for that manager to the manager's current allocation. Similarly, to set the minimum manager allocation, data pre-processor 124 subtracts the deviation amount from the manager's current allocation.

If only absolute limits are specified (step 952), data pre-processor 124 sets the minimum and maximum manager allocations to the absolute limits (step 954). Otherwise, if both deviation and absolute limits are specified (step 956), data pre-processor 124 calculates the minimum and maximum manager allocation values resulting from application of the deviation limits (step 958) (see above) and sets the minimum and maximum manager allocations values depending on whether the deviation limits exceed the absolute limits (step 960). That is, if the minimum or maximum allocation value calculated in step 958 exceeds the corresponding absolute limit, the corresponding absolute limit is chosen.

2) Constraining Asset Allocations

Figure 15D:
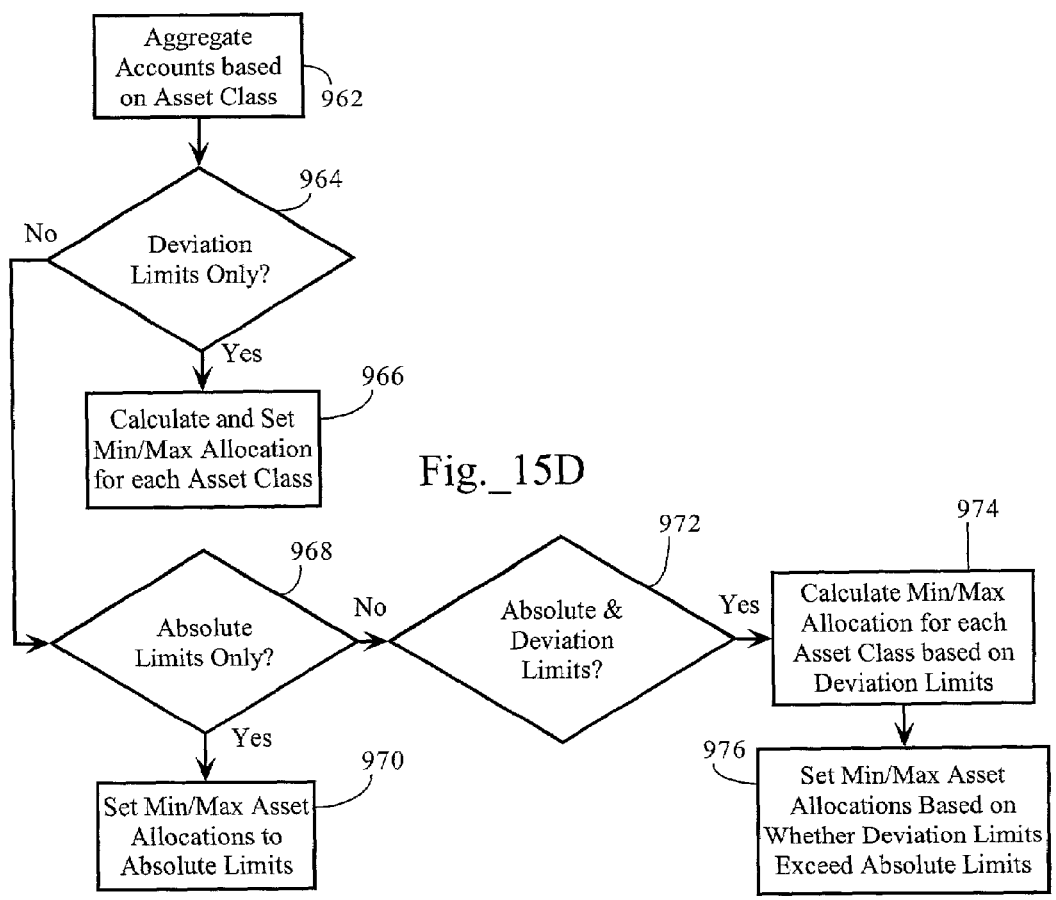

FIG. 15D sets forth a method allowing for calculation of minimum and maximum asset allocation parameters based on portfolio preferences associated with a client portfolio. Setting asset allocation constraints involves a similar process to calculating manager allocation constraints. If there is only one investment style manager per asset class, there is essentially no difference in this process than what is described in the preceding section. However, if any asset class includes more than one investment style manager, data pre-processor 124 aggregates manager accounts based on asset class (Manager Asset Class ID) (step 962).

As described above, if only a deviation limit is specified (i.e., a maximum deviation from current asset allocations) (step 964), data pre-processor 124 calculates and sets the minimum and maximum allocation values for each asset class (step 966). In one embodiment, data pre-processor 124, ignoring contributions and withdrawals, calculates the current asset allocation values for each asset class. Data pre-processor 124 then multiplies the deviation limit by each current asset allocation value to yield the deviation amount for each asset class. To set the maximum asset allocation, data pre-processor 124 adds the resulting deviation amount for that asset class to the current asset allocation value. Similarly, to set the minimum asset allocation, data pre-processor 124 subtracts the deviation amount from the current asset allocation value.

If only absolute limits are specified (step 968), data pre-processor 124 sets the minimum and maximum asset allocation values to the absolute limits (step 970). Otherwise, if both deviation and absolute limits are specified (step 972), data pre-processor 124 calculates the minimum and maximum asset allocation values resulting from application of the deviation limits (step 974) (see above) and sets the minimum and maximum asset allocation values depending on whether the deviation limits exceed the absolute limits (step 976). That is, if the minimum or maximum allocation value calculated in step 974 exceeds the corresponding absolute limit, the corresponding absolute limit is chosen.

3) Setting Relative Manager Allocation Constraints

Figure 15E:
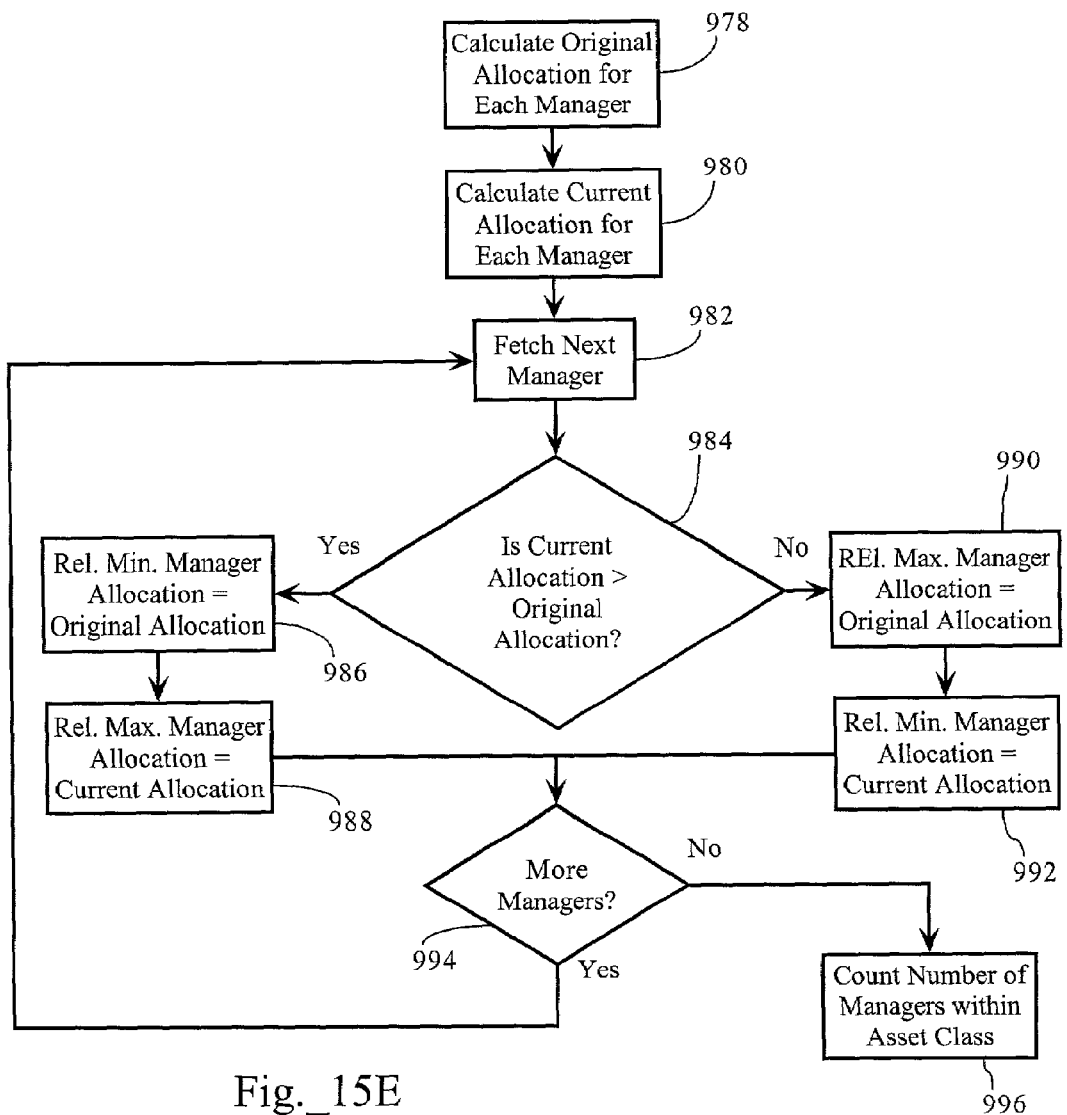

FIG. 15E provides a method allowing for calculation of relative manager allocation constraints within an asset class. In one embodiment, the relative manager allocations are bounded by the current allocation and the original allocation for each manager at inception of the portfolio. Specifically, data pre-processor 124, for each investment style manager account in the asset class, determines the original manager allocation (step 978) and the current manager allocation (step 980). For each manager in the asset class (see steps 982 and 994), data pre-processor 124 sets the relative minimum and maximum manager allocations depending on the relative values between the manager's current allocation and the original allocation (step 984). If the manager's current allocation is greater than the original allocation, data pre-processor 124 sets the corresponding relative minimum manager allocation parameter to the original allocation value (step 986) and the relative maximum manager allocation parameter to the current allocation value (step 988). Otherwise, if the manager's current allocation is less than the original allocation, data pre-processor 124 sets the corresponding relative maximum manager allocation parameter to the original allocation value (step 990) and the relative minimum manager allocation parameter to the current allocation value (step 992). Data pre-processor 124 also counts the number of managers within each asset class and sets a manager relative allocation count parameter to this value (step 996). As described more fully below, optimization problem builder 126 checks this count value to determine whether to include any relative manager allocation constraints in the optimization problem (see Section II.B.3.c.1.d infra).

A.7. Construction of Data Files and Arrays

In steps 323-326, file/array builder 122 constructs the security data file 332, omega data file 334, factor data file 336, tax lot detail data file 338, manager data file 340, client data file 342, asset class return data file 344, and asset class omega data file 346, used by problem builder 126 to construct the optimization problem (see FIGS. 5A and 5C).

A.7.a. Security File

In one embodiment, file/array builder 122 constructs a security file 332 comprising data fields for all securities (current holdings and new ideas) corresponding to each manager associated with the client portfolio (FIG. 5A, step 323). ManagerID is a variable the values of which identify a particular investment style manager. GVKEY is a variable the values of which identify a particular security. In one embodiment, the security file 332 comprises, for each investment style manager, a table of securities including the data fields set forth in FIG. 5C as described below:

1) Lower Bound (LB): LB is a parameter setting the lower bound on the security relative to the total client portfolio during an optimization. In one form, this is normally 0 but is set to the current weight of the security in the total client portfolio if the security is locked. See also Section B.3.A. & Table 5.

2) Upper Bound (UB): UB is a parameter setting the upper bound on the security relative to the total client portfolio during an optimization. In one form, this is determined by the maximum percentage of the model portfolio to invest in any one security (a portfolio construction parameter specified by the investment style manager) multiplied by the investment style manager's maximum allowable allocation of the portfolio.

3) Active Weight Lower Bound ($LB_{awi}$): Active weigh lower bound is a parameter indicating the lowest value for active weight a security can take on. See also Section B.3.A. & Table 5.

4) Residual Variance ($\sigma_{residual}^2$): This parameter is the annualized residual variance associated with the security.

5) Benchmark Weight: Benchmark weight depends on whether the tradeoffs between meeting the manager's portfolio and tax and other associated costs are explicitly or implicitly analyzed (see Section II.B.3.d, below). Under an explicit analysis, benchmark weight is the weight of the security in the benchmark portfolio the investment style manager manages against (see Section I.C.1.a.3., supra). Under an implicit analysis of the tradeoffs, benchmark weight is the weight of the security in the investment manager's model portfolio.

6) Capital Gains Alpha ($\alpha_c$): Capital gains alpha is the excess capital appreciation for the security forecasted by the particular manager.

7) Excess Yield Alpha ($\alpha_y$): Excess yield alpha is the excess yield for the security forecasted by the particular investment style manager.

8) Maximum Weight: Maximum weight is a parameter representing the maximum weight of the security relative to that portion of the portfolio allocated to the investment style manager. If the security is locked, file/array builder 122 sets maximum weight to the current weight of the security. If the current holding percentage for the security is less than the investment style manager's maximum security weight setting, file/array builder 122 sets the maximum weight parameter to the maximum security weight setting. If the security current holding percentage is greater than the maximum security weight setting, but lower than the trim level setting set by the manager, then file/array builder 122 sets the maximum weight to the trim level. Otherwise, if the current holding percentage is greater than the maximum security weight setting, file/array builder 122 sets the maximum weight parameter to the current holding percentage. Lastly, if the current holding percentage is greater than both the maximum security weight setting and the trim level setting, file/array builder 122 sets the maximum weight parameter to the trim level setting.

9) CMWS#—Cross Manager Wash Sale Number is the number assigned to the security, if any, during the screening process for cross manager wash sales (see Section II.A.4., supra).

10) Factor Exposures: Factor exposures are a series of values dependent on the risk model used by the investment style manager and the number of factors associated with that risk model. Factor exposure data can be supplied by the investment style manager, developed by portfolio optimization platform, or any other suitable source.

A.7.b. Tax Lot Detail File

File/array builder 122 then builds a tax lot detail data file 338 including parameters relating to the tax lot detail of all securities in the current holdings of the portfolio. Similar to security file 332, tax lot detail file 332 segregates tax lots by manager and security. TaxLotID is a variable the values of which are unique to and identify a particular tax lot. In one embodiment, for each manager, for each security corresponding to each manager and each tax lot corresponding to each security, file/array builder 122 builds a table comprising the following fields:

1) Transaction Cost to Buy: This parameter specifies the costs associated with purchasing the security.

2) Transaction Cost to Sell: This parameter specifies the non-tax related transactions costs associated with selling the tax lot.

3) Upper Bound of Buy (bi): Upper bound to buy is a parameter limiting the purchase of the security associated with the tax lot. In one embodiment, upper-bound-to-buy is the difference between UB (see above) and the current holdings of the security for that manager relative to the total portfolio.

4) Lower Bound of Sell (si): This reflects the least amount that must be sold of any given tax lot and is generally set to 0. See also Section II.B.3.A. & Table 5.

5) Upper Bound of Sell (si): This reflects the maximum amount permitted to sell of any given tax lot and is generally the current weight of tax lot in total client portfolio. See also Section II.B.3.A. & Table 5.

6) % Sale Taxable ($T_i$): $T_i$ is the percentage of the sale of the tax lot that would be taxable.

7) Tax Lot Status (STG, STL, LTG, LTL, ULTG, ULTL): This parameter specifies the status or category of the gain or loss if the tax lot were to be sold (e.g., short term gain, long term loss, etc.).

8) Current % ($c_i$): is the current percentage of the security across all tax lots of the security relative to the total portfolio.

9) CMWS#—Cross Manager Wash Sale Number is the number assigned to the security, if any, during the screening process for cross manager wash sales (see above).

A.7.c. Omega File

File/array builder 122 also retrieves the risk model associated with each model portfolio from market and risk model database 162 (step 326). In one embodiment, the same risk model is used across all investment style managers. In another embodiment, different risk models can be used to different investment style managers taking into consideration the particular investment style involved and/or other factors. The risk model comprises a variance-covariance matrix modeling risk in the market in relation to a set of factors. Any suitable risk model can be used, including risk models from outside sources, such as Wilshire, Barra, and Northfield. In one embodiment, during this step, file/array builder 122 places the residual volatility and factor exposures corresponding to each security in the security file 332.

A.7.d. Factor File

File/array builder 122 also retrieves the factor file 336 associated with each risk model and, as to each investment style manager, identifies the minimum and maximum factor exposures (see below). The factor file 336 contains an identification of the factors (e.g., size (log of market cap), earnings-to-price, book-to-price, net earnings revisions, etc.) included in the risk model associated with each model portfolio. In one embodiment, the factor file 336, as to each manager, contains a numbered list of the factors. As to each factor, the factor file 336 includes the following fields:

1) Factor Name: Factor name is a text variable indicating the name for the factor.

2) Factor Abbreviation: Factor Abbreviation is a text variable representing an abbreviated form of the factor name used to facilitate generation of reports and the like.

3) LB $F_j$: Minimum factor exposure is the smallest factor exposure value for that factor from the set of securities in security file 332 corresponding to the investment style manager.

4) UB $F_j$: Maximum factor exposure is the smallest factor exposure value for that factor from the set of securities in security file 332 corresponding to the investment style manager.

A.7.e. Asset Class Return Data

File/array builder 122 also retrieves a set of forecasts for the expected return of each asset class to which the client has exposure. In one embodiment, this forecast is developed by personnel managing the system. In another embodiment, the forecast is provided by the distributor of product enabled by the system. As to each asset class the file contains the following fields:

1) Asset Class Name: Name is a text variable that refers to the asset class such as All Cap Core.

2) Return (Asset Class): A forecast of the expected percent return of the asset class over a 1 year time horizon (such as 12%).

3) Lower Bound of Asset Class: Reflects the minimum amount post-optimization the asset class should represent of the total client portfolio.

4) Upper Bound of Asset Class: Reflects the maximum amount post-optimization the asset class should represent of the total client portfolio.

A.7.f. Asset Class Omega Data

File/array builder 122 also retrieves a variance/covariance matrix that describes the interrelationship among asset classes for which the client has exposure. In one embodiment, this variance/covariance matrix is developed by personnel managing the system. In another embodiment, variance/covariance matrix is provided by distributor of product(s) enabled by the system.

A.8. Manager and Client Files

File/array builder 122 then builds manager and client data files, in part, based on the results of the pre-processing steps discussed above, as well as settings and preferences stored in client account database 164 and investment style manager database 151.

A.8.a. Manager Files

File/array builder 122 also builds a manager data file 340 including data for each investment style manager associated with the client portfolio. In one form, manager data file 340, for each manager, includes the following fields:

1) ManagerID: ManagerID is a parameter identifying the particular investment style manager. A particular manager may be associated with more than one ManagerID value, in cases where the investment style manager manages more than one investment style.

2) Asset Class ID: Asset Class ID is a parameter identifying the particular asset class associated with the investment style manager.

3) Number of Factors in Risk Model (J): This parameter indicates the number of factors in the risk model associated with the investment style manager.

4) Number of New Ideas+Current Holdings (N): This parameter indicates the number of new ideas identified in pre-processing step 314 for each investment style manager plus the current holdings specified below.

5) Number of Current Holdings (X): This parameter provides the number of current holdings in that portion of the client portfolio allocated to the investment style manager.

6) Number of Tax Lots (TL): This parameter indicates the number of tax lots in that portion of the client portfolio allocated to the investment style manager.

7) LB Capital Gains Alpha ($\alpha_c$): This parameter is the minimum capital appreciation alpha among the securities associated with the investment style manager in the security file 332. This parameter, as well as Max $\alpha c$, Min $\alpha y$, and Max $\alpha y$, are used as upper and lower bounds in the optimization. See below.

8) UB Capital Gains Alpha ($\alpha_c$): This parameter is the maximum capital appreciation alpha among the securities associated with the investment style manager in the security file 332.

9) LB Yield Alpha ($\alpha_y$): This parameter is the minimum yield alpha among the securities associated with the investment style manager in the security file 332.

10) UB Yield Alpha ($\alpha_y$): This parameter is the maximum yield alpha among the securities associated with the investment style manager in the security file 332.

11) ($\lambda_S$): This parameter quantifies the client investor's tolerance level for systematic risk.

12) ($\lambda_U$): This parameter quantifies the client investor's tolerance level for unsystematic risk.

13) LB $M_k$: This parameter specifies the minimum allowable allocation of the client portfolio corresponding to the investment style manager. When optimization does not involve rebalancing, investment style manager allocations are locked; therefore, the minimum and maximum allocations (below) are set to the current allocation. In a rebalancing period, however, these parameters are loosened to allow for a range of allocations per investment style manager. If a contribution or withdrawal targeted at a specific investment style manager is indicated with no rebalancing, the current allocation percentages are adjusted accordingly and locked as above. (See Section II.A.7., supra).

14) UB $M_k$: This parameter specifies the maximum allowable allocation of the client portfolio corresponding to an investment style manager resulting from an optimization. As discussed above, this may be set to the current allocation. (See Section II.A.7., supra).

15) Relative Weight ID (RWID): RWID is a unique identifier for the manager, if there is more than one manager in the corresponding asset class.

16) Relative Weight Minimum: In the case where there is more than one manager in an asset class, this parameter sets the lower bound on the relative weight within the asset class for the manager.

17) Relative Weight Maximum: This parameter sets the upper bound on the relative weight for the manager within the asset class, if the asset class includes more than one manager.

A.8.b. Client File

File/array builder 122 also retrieves data from client account database 164 and builds client data file 342. Client data file 342 includes client-specific data (such as applicable tax rates), as well as the client's preferences and other settings influencing optimization of the user's portfolio. In one embodiment, client data file 342 includes the following fields:

1) Income Tax Rate: This field includes data relating to the income tax rates (federal and state) applicable to the client investor.

2) Capital Gains Tax Rate: This field includes data relating to the capital gains tax rates applicable to the client investor. Because this is not client-specific, such data could be pulled from general tax rate tables.

3) Lambda(O): Lambda(O) is an asset class tolerance parameter identifying the client's tolerance for asset class risk.

4) Lambda(T): This is a tax tolerance factor that takes into account the time value of money for tax dollars that don't have to be paid until some point in the future. The implementation of this factor reflects the percentage of the applicable tax rate that applies to compensate for this effect. In optimization, the tax tolerance factor is multiplied by the tax rate to come up with an effective tax rate.

5) Number of Asset Classes (A): This parameter indicates the number of unique asset classes associated with the client portfolio.

6) Number of Multi-Manager Asset Classes (Q): This parameter indicates the number of managers in asset classes having more than one manager.

7) Number of Managers (M): This is a parameter indicating the number of investment style managers associated with the client investor's portfolio.

8) Number of Cross Manager Wash Sale Restrictions (H): This is a parameter representing the number of cross-manager wash sale restrictions identified in a pre-processing step (see above).

9) Total Portfolio Value (TPV): Total Portfolio Value is a parameter indicating the total value of the client portfolio.

10) Tax Constraints: FIG. 5B illustrate the data fields associated with tax constraints. The data fields contains data relating to the client investor's tax preferences. Table 7 illustrates possible values for these data fields depending on client preferences related to taxes. For example, the client investor may prefer to avoid taking a net short term gain or net long term toss. Client investors may also specify preferences with respect to their respective net tax positions resulting from management of the portfolio. For example, if the client so chooses, he/she can set a maximum loss to take to prevent too many realized losses. Note, however, this may result in holding securities which would otherwise not be recommended, thereby creating a sub-optimal solution which could become significant if the market moved drastically downward and/or alphas changed drastically.

B. Optimization

As described more fully below, the optimization technology optimizes the expected return of a financial portfolio allocated to a plurality of investment style managers from the perspective of the client, as opposed to a single money manager utilizing an optimization platform for a portfolio (with or without respect to taxes) in isolation. A typical optimization product that can deal with tax lot level data is not designed to deal with the same security existing in multiple accounts, as may occur during operation of the present invention. First, this circumstance introduces the complexity of treating each portion of the client portfolio associated with a different investment style manager (accounts) separately while still considering the aggregate correlation amongst accounts. Second, the assumption of an optimizer in isolation is that the single portfolio is the single investment for a taxpayer. In reality, a taxpayer may have multiple accounts that should be considered to appropriately allocate assets and tax losses amongst the accounts. Third, the introduction of multiple managers means that what would otherwise be simple constraints for optimization, such as the maximum amount to invest in a given security become significantly more complex algebraically. For example, if a specific account for a client will not allow more than 5% to be invested in any single security, this translates to 2.5% if the manager's account comprised 50% of the total portfolio. Unfortunately, since the manager allocation may change during a rebalancing period (a shift of assets amongst asset classes and hence individual managers) as well as when a contribution or withdrawal is made, the manager's allocation of the total clients assets is not necessarily fixed. Therefore many constraints must be algebraically adjusted in relation to the respective allocations among investment style managers for each client portfolio (see below).

In one embodiment, upon completion of the required files and arrays (see above), process handler 120 passes execution to optimization problem builder 126 which operates to construct the optimization problem. An exemplary optimization problem is set forth below (see Section B.3., below). For didactic purposes, however, the following sets forth certain optimization concepts and the modifications required to implement the present invention.

B.1. Effects of Simultaneous Optimization involving Multiple Managers

One example of how investment style manager allocations affect the optimization process is when an account must have a factor weighting less than, greater than or equal to a specific amount. For example, if a specific account must have an average price-to-earnings ration (P/E) of less than 12. Software that deal with this constraint in isolation to the total portfolio would require that, for n securities in the account where each has a weight of $w_i$ and Price to Earnings of $(P/E)_i$, the account would have the following constraint.

$$\sum_{i=1}^{n} w_i \left(\frac{P}{E}\right)_i \leq 12 \qquad (1)$$

For didactic purposes, assume that this account is currently 50% of the client's total managed portfolio. One of two choices could be made in the formulation of such a problem, the weights ($w_i$) could sum to 100% for each account or the weights ($w_i$) could sum to 100% relative to the entire portfolio. If the weights sum to 100% for each account, the constraint expressed in equation 1 above would still hold. However, there would be no distinction between two accounts of differing allocations, thereby creating complications when trying to determine allocations amongst managers and when determining client portfolio level variables that are a function of individual tax lots within a manager (such as the net tax effect to the client). In order to deal with this, the optimization must therefore have the security weights across all accounts in the portfolio sum to 100. In this instance, an individual account's weights aggregate to less than 100%. Accordingly, for an account comprising 50% of the total portfolio, the constraint above set forth in equation (1) becomes $$\sum_{i=1}^{n} w_i \left(\frac{P}{E}\right)_i \leq 12 * 50\%. \qquad (2)$$

As mentioned above, however, the 50% allocation is not a fixed allocation to that manager. If the allocation corresponding to this account is the variable M, the correct representation of this account constraint then becomes:

$$\sum_{i=1}^{n} w_i \left(\frac{P}{E}\right)_i \leq 12 * M, \qquad (3)$$

where $$M = \sum_{i=1}^{n} w_i$$

for all securities under consideration or held by that account.

Since optimization is represented with all variables on one side of the equation, these equations are combined algebraically to correctly configure the optimization constraint for the account. For example, for didactic purposes, assume that there are three stocks under consideration by an investment style manager with weights of $x_1$, $x_2$, $x_3$ and another investment style manager involved in the optimization has two stocks with weights $x_4$ and $x_5$. It follows that the average P/E for stocks corresponding to the first manager (with P/Es of 10.5, 12.5 and 14.2) is:

$$\frac{(10.5x_1 + 12.5x_2 + 14.2x_3)}{(x_1 + x_2 + x_3)}. \quad (4)$$

Equation 4 must be simplified for use in the optimization problem solver. With the right hand side of the equation set to 12 (the average P/E desired among the securities), multiplying the left hand side of the equation through by the denominator yields:

$$10.5x_1 + 12.5x_2 + 14.2x_3 + 0x_4 + 0x_5 = 12(x_1 + x_2 + x_3). \quad (5)$$

However, in order to format equation 5 for a solver, all terms are brought back to the left hand side. This can be done by first multiplying through by 12, as shown below:

$$\frac{10.5x_1}{12} + \frac{12.5x_2}{12} + \frac{14.2x_3}{12} + 0x_4 + 0x_5 = (x_1 + x_2 + x_3). \quad (6)$$

Then, subtracting the terms from the right hand side from both sides of the equation:

$$\frac{10.5x_1}{12} - x_1 + \frac{12.5x_2}{12} - x_2 + \frac{14.2x_3}{12} - x_3 + 0x_4 + 0x_5 = 0. \quad (7)$$

Finally, combining the terms to collapse all calculations into single coefficients yields:

$$\left(\frac{10.5}{12} - 1\right)x_1 + \left(\frac{12.5}{12} - 1\right)x_2 + \left(\frac{14.2}{12} - 1\right)x_3 + 0x_4 + 0x_5 = 0. \quad (8)$$

So, in generalized form, the left hand side of the constraint in a partial factor loading is:

$$\left(\frac{f_1}{T} - 1\right)x_1 + \left(\frac{f_2}{T} - 1\right)x_2 + \left(\frac{f_3}{T} - 1\right)x_3 + 0x_4 + 0x_5 = 0. \quad (9)$$

Where $f_1$, $f_2$ and $f_3$ are the data elements for the particular factor (such as P/E) and T is the target value for the account. The term in front of each variable represents the deviation from the target value. In the case of an inequality constraint (the average of the three must be less than or equal to 12), the equals sign simply becomes:

$$\left(\frac{f_1}{T} - 1\right)x_1 + \left(\frac{f_2}{T} - 1\right)x_2 + \left(\frac{f_3}{T} - 1\right)x_3 + 0x_4 + 0x_5 \leq 0. \quad (10)$$

Equation 10 represents a constraint requiring that the weighted deviation for those three securities from the average of 12 must be less than 0, therefore the average must be less than 12.

Most constraints in the optimization can be generalized as either a factor loading constraint (the weighted average of a factor and the amount invested in each security within that account) or a summation constraint (the amount invested amongst a group of securities should be greater than, less than or equal to some amount). Therefore many of the constraints must be adjusted to reflect the allocation of the manager in a similar fashion.

B.2. Simultaneous Optimization

As discussed above, each investment style manager has an allocation of the overall client portfolio (also referred to as an account in the example above). The manager's portion of the total portfolio comprises an array of financial assets. Each manager, over time, will introduce new assets for consideration and sell other assets represented by changes in the model portfolio submitted to portfolio optimization platform 40. When this occurs, a tradeoff analysis needs to be conducted by analyzing what is the benefit of the trade versus the cost to achieve the trade. The optimization process, therefore, considers the tradeoff between the cost to trade (transaction costs), the difference in the return opportunity and the difference in the risk. Since trades may (in a taxable account) have a tax cost associated with them, the cost of the trade must be considered in terms of its taxes. This tax cost, however, is not unique to a given account but is a function of the activity in all of the accounts. It follows that, tax costs should be considered in the aggregate, as opposed to at the individual stock level. Additionally, most managers are attempting to outperform a benchmark and deal with the decision to buy and sell relative to some establish benchmark that they are trying to outperform. Therefore, while the manager's information helps to determine which trades to make within a manager account, it does not help to determine how best to allocate securities across accounts based on the clients overall tolerance for risk, return and tax costs. Therefore, a simultaneous optimization requires inputs at a "manager level" and at a "client portfolio level" that support making decisions within an account (what to buy and sell) and on behalf of a client (how to allocate resources and where to realize tax gains and losses). While there are two distinct levels of consideration they are interrelated; as explained earlier, the only way to affect the allocation amongst managers is by trading, which has implications for purposes of taxes.

B.2.a. Overview of Optimization Generally

For didactic purposes, a general overview of the processes associated with optimization is provided. Optimization generally involves the process of representing the tradeoffs described above mathematically and then using algorithms designed to minimize or maximize mathematical relationships. Optimization typically has four components that describe the optimization: 1) the objective function (i.e., the mathematical relationship of tradeoffs) to be maximized or minimized; 2) a list of variables, including the number and type (continuous, binary and integer); 3) the bounds on variables; and 4) constraints. As described earlier, in the impact of manager allocations on optimization calculations (see Section II.B.1., supra), many of the constraints require additional algebraic representation to handle the multiple-manager paradigm.

Optimization of linear, quadratic and integer variables can be accomplished via software products that specialize in implementation of algorithms for solving various mathematical problems. The following describes how the optimization of client portfolios translates to standard optimization software packages. Different algorithms are utilized by different software vendors based on the nature of the problem and the goal of the optimization (such as global optimization or to find a feasible solution). The inputs to optimization software products include settings on how to solve the optimization (number of iterations, selection of algorithm, etc.) and the problem itself. Any optimization problem comprises a set of variables. While algebraically, we may represent a problem with meaningful variable names and in a meaningful orientation within the equation, this is meaningless to the actual optimization software which merely refers to all variables as $x_1, x_2, x_3$, etc. Therefore, to specify a problem for solution, the inputs to the software include: 1) the total number of variables, 2) variable types (continuous, integer or binary), 3) the range of possible values for the variables (upper and lower bounds), 4) constraints (relationships to variables on the left hand side, an equality or inequality and right hand side values), and, 5) in the case of quadratic optimization, the quadratic relationship between any two variables. See FIG. 16.

B.2.b. Variables

In order to understand the optimization, one must first conceptualize the variables in the equation as inputs in a specific order. All other inputs must be aligned with the variables in a similar fashion. FIG. 16 provides an example of a subset of the variables involved in a typical optimization of the present invention in matrix representation. The variables referred to in formulas shown in FIG. 16 are listed for reference.

1) Variable Types

All variables in the problem can be either continuous, integer or binary (a special case of integer). In the present optimization, most variables are continuous, however, binary variables are utilized to constrain the optimization from wash sales, prevent simultaneous transactions (selling and immediately buying back) and to accurately model the US tax code. Note in this subset model, variables $o_1$ and $o_2$ are binary.

2) Variable Bounds

Each variable in the optimization can be bound to some range. For instance, for $w_2$, the maximum value under any circumstances that could be invested in security 2 (as a percentage of the client investor's portfolio) is 30% in this example.

B.2.c. Linear Objective

The objective function is the set of variables and relationships that are being maximized and/or minimized. Anything that is in the linear portion of the objective function appears in the objective array with a coefficient that represents the value that variable has in the problem. For example, in the simultaneous optimization, trades are determined for each manager/account that determine the optimal tradeoff between return, risk and transaction costs. The linear terms in the objective function are return and transaction costs. Note that the objective array, therefore, has transaction costs associated with the b and s variables (variables representing the buying or selling of a security, respectively) and that the variables having a return associated with them (e.g., $\alpha_c$, $\alpha_y$, and $f_j$) have coefficients that represent the amount of return attributed to a unit change in that variable. It is also important to note that the alpha variables ($\alpha_c$, $\alpha_y$) are linked via a constraint to the security weights (see constraints section).

B.2.d. Quadratic Objective

The quadratic objective is the portion of the objective function comprised of the relationship between two variables. In the invention, all risk variables are quadratic Since quadratic relationships occur between any two variables, the quadratic portion of the objective function is (for N variables) an N×N array of the coefficients that describe the relationship. As illustrated in FIG. 17, the relationship between factor exposures ($F_1$, $F_2$ and $F_3$) and the variance/covariance of factors (also referred to as Omega) is one element specifically shown in the didactic model. The objective function for a specific account's systematic risk is:

$$-\lambda_s \sigma_s^2, \tag{11}$$

where the variance components are represented by the following mathematical relationship:

$$\sigma_s^2 = \sum_{j=1}^{J} \sum_{k=1}^{J} F_i F_j \sigma_{j,k} \tag{12}$$

When the inputs are provided as shown above, the negative lambda term is distributed amongst the omega matrix to accomplish the objective function input from equation 11. As a specific example from equation 12 where j=1 and k=2, the objective function result is:

$$-\lambda_s F_1 F_2 \sigma_{F_1 F_2} \tag{13}$$

This is achieved by the shaded outlined box in the quadratic matrix as are all similar instances of j and k in equation 12 and all other quadratic terms.

B.2.e. Constraints

Constraints can be utilized for several functions in an optimization problem. The constraints shown in the sample problem above illustrate constraints that are utilized for three general purposes: 1) creating a variable that is a function of several other variables (composite variable constraint); 2) enforcing a logical condition that must be met (binary logic constraint); and 3) constraining a set of variables in aggregate from exceeding some bound (summation constraints). While these three examples cover many of the constraints used in portfolio optimization, constraints can create/enforce any mathematical/logical relationship between variables. Each of the three examples is discussed in greater detail in the following sections.

1) Composite Variable Constraint

Composite variable constraints are used to express factor loading variables. In the example above, the factor loading variables ($f_1$, $f_2$, $f_3$) are the weighted average factor exposures for a portfolio account. In mathematical terms, a factor loading would be represented as:

$$f_j = \sum_{i=1}^{n} (f_{i,j}) w_i \tag{14}$$

In the example provided by FIG. 16, equation 14 can also be represented, for n=5 securities weights, as:

$$f_j = f_{j,1} w_1 + f_{j,2} w_2 + f_{j,3} w_3 + f_{j,4} w_4 + f_{j,5} w_5 \tag{15}$$

With all non-constant terms to the left hand side, equation 15 becomes:

$$f_{j,1} w_1 + f_{j,2} w_2 + f_{j,3} w_3 + f_{j,4} w_4 + f_{j,5} w_5 - f_1 = 0 \tag{16}$$

Turning to FIG. 16, multiplying the first constraint coefficients (first row of constraints section) and the variables with which they are aligned, yields equation 16 above. In the didactic optimization problem set forth herein, $f_1$ only changes as $w_1$-$w_5$ change and only according to the mathematical relationship set forth in equations 14, 15 and 16.

2) Binary Logic Constraint

Another type of constraint utilized in the example above is a binary logic constraint. Integer variables can be utilized for a multitude of purposes in financial optimization such as ensuring that the weight of a variable equates to a trade in increments of 100 shares (round lot constraints), limiting the number of securities in the portfolio to a certain number (cardinality constraints) and limiting a new security entry unless they are of some minimum size (buy-in constraints). Binary constraints are a special case use of integer values where the value is either 1 or 0. Binary constraints support the last two purposes described above and can also serve to enforce some logical condition.

The use of binary constraints for purposes of logic allow the creation of either/or and if conditions. In one form, binary constraints create "buy-or-sell-only" constraints used to prevent wash sales. In the example of FIG. 16, examples of binary logic are the last two constraints. In the example set forth in FIG. 16, the last two constraints force either the purchase of additional shares of a security already owned or the sale of some or all of the security already owned. Mathematically, a "buy-or-sell-only" constraint for a particular security can be represented as, $$b_1 - 10000 o_1 \leq 0 \qquad (17, 18)$$

$$s_{1,1} + s_{1,2} + 10000 o_1 \leq 10000$$

where $b_i$ represents a purchase of additional amounts of security i, $s_{i,x}$ represents the sale of some or all of tax lot x of security i and $o_i$ represents a binary logic variable. It should be noted that, if the resulting value of $b_1$ is any amount other than zero (the optimization recommends buying more of a specific security), then, in order to make equation 17 true, $o_1$ must be equal to 1 (the lower bounds on b and s are zero). In addition, if $o_1$ equals 1, both s variables in equation 18 must be equal to zero to keep the second equation true. Similarly, where either or both s variables are greater than 0 (representing the sale of one or both tax lots), equation 17 requires that $b_1$ must therefore be equal to zero. The combination of these two constraints, therefore, forces only one of two logical conditions to exist.

3) Summation Constraints

Summation constraints can impose a limit on a given combination of variables. A good example of this type of constraint is a sector weighting constraint. A summation constraint is a more specific case of a factor loading constraints where all factor values are equal to one. The equation for a factor loading as described in the previous section was:

$$f_j = \sum_{i=1}^{n} (f_{i,j}) w_i$$

The translation to left hand and right hand side elements is identical for a summation constraint and the only differences is that instead of data elements $f_{i,j}$, no value for the coefficients (equivalent to 1) is used. Therefore the equation for a summation constraint becomes:

$$S = \sum_{i=1}^{n} w_i$$

In the case of the sum of some group of variables, only the variables that meet some condition (such as in a sector, in a manager's sub-account, etc.) receive a coefficient of 1. All other variables in the entire optimization problem will have a coefficient of 0 (the equivalent of dropping them from the mathematical relationship).

B.3. Exemplary Optimization Problem

The following sets forth an exemplary optimization problem according to an embodiment of the present invention. The following sets forth variables, types, and bounds, as well as an objective function and various optimization constraints.

B.3.a. Variables, Types and Bounds

1) Manager Specific Variables

Table 4 sets forth manager-specific variables and variable types according to one embodiment of the invention. The values of the variables are specific to each investment style manager.

TABLE 4

| | | |
|---|---|---|
| $w_i$ | Continuous | Weight of each security i as a % of total portfolio value |
| $aw_i$ | Continuous | Active weight of each security from benchmark (custom or index) |
| $F_i$ | Continuous | Active factor exposure from benchmark (custom or index) |
| $b_i$ | Continuous | % To buy for current holdings as a percentage of total portfolio |
| $s_i$ | Continuous | % To sell of each tax lot as a percentage of total portfolio value |
| $o_i$ | Binary | Buy or Sell Only binary variable |
| $\alpha_c$ | Continuous | Expected excess return attributable to capital appreciation |
| $\alpha_y$ | Continuous | Expected excess return attributable to dividend yield |

Variable List

Manager Specific Variables

In addition, in one embodiment, the optimization includes the following variable bounds for the manager specific variables identified above.

$LB_{w_i} \leq w_i \leq UB_{w_i}$
$LB_{aw_i} \leq aw_i \leq UB_{w_i}$
$LB_{F_j} \leq F_j \leq UB_{F_j}$
$0 \leq b_i \leq UB_{b_i}$
$LB_{s_i} \leq s_i \leq UB_{s_i}$
$0 \leq o_i \leq 1$
$LB_{\alpha_c} \leq \alpha_c \leq UB_{\alpha_c}$
$LB_{\alpha_y} \leq \alpha_y \leq UB_{\alpha_y}$ Pre-Processing Calculations (Manager Specific Variables)

As discussed above, in the pre-processing step, data pre-processor 124 and file/array builder 122 construct the files and arrays containing the data, including the upper and lower bounds on variables, required to construct the optimization problem. Table 5 sets forth the upper and lower bounds for certain manager-specific variables. Note: MPS represents maximum position size, a parameter indicating the maximum weight of the security as if the manager's sub-account was the only account being optimized. This maximum size is directly tied to the model portfolio weight of the client specific model. For example, a manager's model portfolio has a weight for a security of 2%. The maximum position size would therefore be a function of 2%, such as 2×2% of 4%. Generally, the maximum position size is set to a multiple of the model portfolio weight.

TABLE 5

| | | |
|---|---|---|
| $LB_{w_i}$ | Locked: | Current Percentage of security in total client portfolio |
| | Normal: | 0 |
| $UB_{w_i}$ | Locked: | Current Percentage of security in total client portfolio |
| | <MPS, Buy More Allowed: | MPS times Maximum Manager Allocation |
| | <MPS, Buy More Not Allowed: | Current Percentage of security in total client portfolio |
| | >MPS, Below | Current Percentage of security in total |

TABLE 5-continued

| | Trim Level: Above Trim Level: | client portfolio Trim to Level times Manager Maximum Allocation |
|---|---|---|
| $LB_{aw_j}$ | Normal: | Negative Benchmark Weight of security |
| $LB_{Fj}$ | Normal: | Minimum Factor Exposure Value from Security File for this Manager |
| $UB_{Fj}$ | Normal: | Maximum Factor Exposure Value from Security File for this Manager |
| $UB_{b_l}$ | Normal: | Max (O, $UB_{w_j}$ - current percentage of security in total client portfolio) |
| $LB_{s_l}$ | Forced Sell: | Weight of current lot in total client portfolio |
| | Normal: | 0 |
| $UB_{s_l}$ | Locked: | 0 |
| | Normal: | Weight of current lot in total client portfolio |
| $LB_{\alpha_C}$ | Normal: | Minimum $\alpha_c$ Value from Security File for this Manager |
| $UB_{\alpha_C}$ | Normal: | Maximum $\alpha_c$ Value from Security File for this Manager |
| $LB_{\alpha_\gamma}$ | Normal: | Minimum $\alpha_\gamma$ Value from Security File for this Manager |
| $UB_{\alpha_\gamma}$ | Normal: | Maximum $\alpha_\gamma$ Value from Security File for this Manager |

2) Client-Specific Variables

Table 6 sets forth client-specific variables and variable types according to one embodiment of the invention.

TABLE 6

| $h_c$ | Binary | Cross Manager Wash Sale Variables |
|---|---|---|
| STL | Continuous | Short Term Losses as a percentage of total portfolio |
| STG | Continuous | Short Term Gains as a percentage of total portfolio |
| LTL | Continuous | Long Term Losses as a percentage of total portfolio |
| LTG | Continuous | Long Term Gains as a percentage of total portfolio |
| NST | Continuous | Net Short Term as a percentage of total portfolio value |
| NLT | Continuous | Net Long Term as a percentage of total portfolio value |
| NG | Continuous | Net Gain or Loss as a percentage of total portfolio value |
| $B_{1-5}$ | Binary | Binary Logic Variables to Aid in Calculation of Taxes |
| $Tax_{1-3}$ | Continuous | Taxable Gains as a Percentage of Total Portfolio Value for Certain Tax Situations |
| $M_k$ | Continuous | Manager Allocation Variables |
| $A_l$ | Continuous | Asset Allocation Variables |

Variable List

Client Level

In one embodiment, the bounds on the client-specific variables above include:

$0 \leq h_c \leq 1$
$LB_{STL} \leq STL \leq UB_{STL}$
$LB_{STG} \leq STG \leq UB_{STG}$
$LB_{LTL} \leq LTL \leq UB_{LTL}$
$LB_{LTG} \leq LTG \leq UB_{LTG}$
$0 \leq B_{1-5} \leq 1$
$0 \leq Tax_p \leq UB_{Tax_p}$
$LB_{NST} \leq NST \leq UB_{NST}$
$LB_{NLT} \leq NLT \leq UB_{NLT}$
$LB_{NG} \leq NG \leq UB_{NG}$
$LB_{M_k} \leq M_k \leq UB_{M_k}$
$LB_{A_l} \leq A_l \leq UB_{A_l}$ Pre-Processing Calculations (Client Variables)

Table 7 illustrates the potential lower bounds (LB) and upper bounds (UB) values for client specific variables in one embodiment of the invention. As table 7 shows, the upper and lower bounds values may be influenced by client-specific inputs or preferences concerning taxes, such as a preference for avoiding aggregate short term gains, avoiding short term gains absolutely, etc.

TABLE 7

| $LB_{STL}$ | Normal: | 0 |
|---|---|---|
| $UB_{STL}$ | Normal: | 1 + (External ST Losses/Total Portfolio Value) |
| | Disallow Any ST Losses: | (External ST Losses + Forced Sell ST Losses)/Total Portfolio Value |
| $LB_{STG}$ | Normal: | 0 |
| $UB_{STG}$ | Normal: | 1 + (External ST Gains/Total Portfolio Value) |
| | Disallow Any ST Gains: | (External ST Gains+ Forced Sell ST Gains)/Total Portfolio Value |
| $LB_{LTL}$ | Normal: | 0 |
| $UB_{LTL}$ | Normal: | 1 + (External LT Losses/Total Portfolio Value) |
| | Disallow Any LT Losses: | (External LT Losses + Forced Sell LT Losses)/Total Portfolio Value |
| $LB_{LTG}$ | Normal: | 0 |
| $UB_{LTG}$ | Normal: | 1 + (External LT Gains/Total Portfolio Value) |
| | Disallow Any LT Gains: | (External Long Term Gains + Forced Sell Long Term Gains)/Total Portfolio Value |
| $UB_{Tax_p}$ | Normal: | 1 + (Sum External Gains and Losses/Total Portfolio Value) |
| | No Taxes: | Max [((Sum External + Sum Forced − Sum All Potential Losses)/Total Portfolio Value), 0] |
| $LB_{NST}$ | Normal: | 0 |
| $UB_{NST}$ | Normal: | 1 + (Sum of External ST Gains and Losses/Total Portfolio Value) |
| | No Aggregate ST Gains: | Max [((Sum External ST + Sum Forced ST − Sum All Potential ST)/Total Portfolio Value), 0] |
| $LB_{NLT}$ | Normal: | 0 |
| $UB_{NLT}$ | Normal: | 1 + (Sum of External LT/Total Portfolio Value) |
| | No Aggregate LT Gains: | Max [((Sum External LT + Sum Forced LT − Sum All Potential LT)/Total Portfolio Value), 0] |
| $LB_{M_k}$ | Normal: | Minimum Manager Allocation From Contribution, Withdrawal and Rebalancing |
| $UB_{M_k}$ | Normal | Maximum Manager Allocation From Contribution, Withdrawal and Rebalancing |
| $LB_{A_l}$ | Normal: | Minimum Asset Class Allocation From Contribution, Withdrawal and Rebalancing |
| $UB_{A_l}$ | Normal: | Maximum Asset Class Allocation From Contribution, Withdrawal and Rebalancing |

B.3.b. The Objective Function

The goal of the optimization is to maximize the investor's utility where utility is represented as a relationship among the preferences for return, risk and taxes across one or more accounts that make up the client investor's portfolio. In one embodiment, utility is mathematically represented by the objective function set forth below. The objective function can be split into the linear and quadratic portions as represented below:

Linear Objective Terms $$\sum_{m=1}^{M} \left( \alpha_{c_m} + (1 - r_{lT})\alpha_{y_m} - \sum_{i=1}^{n} b_{i,m} tc_i - \sum_{X=1}^{x} S_{X,m} tc_i \right) +$$

-continued $$\sum_{l=1}^{A} R_l A_l - r_1 Tax_1 - r_2 Tax_2 - r_2 Tax_3$$

Quadratic Objective Terms $$\sum_{m=1}^{M} \left( -\lambda_{s,m} \sum_{j=1}^{J} \sum_{k=1}^{J} F_{i,m} F_{j,m} \sigma_{j,k,m} - \lambda_{u,m} \sum_{i=1}^{n} a w_{i,m} \sigma_{i,m}^2 \right) - \lambda_o \sum_{a=1}^{B} \sum_{b=1}^{B} A_a A_b \sigma_{a,b}$$

where

| | |
|---|---|
| $r_{IT}$ | Client's Marginal Income Tax Rate |
| $r_1$ | Client's Marginal Capital Gains Tax Rate |
| r2 | $r_{IT} - r_1$ |
| $tc_i$ | Transaction costs associated with a unit percent change of security I<br>Note: $\alpha_c$ adjusted for transaction cost for securities not in current holdings |
| $R_l$ | Asset Class Expected Return |
| $-\lambda_{s,m}$ | Systematic Risk Tolerance Parameter for Manager m |
| $-\lambda_{u,m}$ | Stock Specific Risk Tolerance Parameter for Manager m |
| $\sigma_{j,k,m}$ | Variance/Covariance Term for Systematic Risk |
| $\sigma^2_{i,m}$ | Residual Variance Term for Security i, Manager m |
| $-\lambda_o$ | Overall Risk Tolerance Parameter for Asset Allocation |
| $\sigma_{a,b}$ | Variance/Covariance Terms for Asset Class Risk |

B.3.c. Constraints

Constraints can be broken down into both client and manager level (although some client level are linked to the manager level) and further broken down into the purpose for the constraint. The following sets forth exemplary constraints as well as the pre-processing steps required for each constraint.

1) Client Level Constraints a) Tax Variable Constraints

The tax variable constraints are a series of four constraints [c1, c2, c3, c4] that sum the total taxable events in each tax status category for each tax lot where there are Z total tax lots in the entire client portfolio. $T_i$ reflects the taxable portion of any sale of a unit of a tax lot.

$$STL = \frac{ExternalShortTermLoss}{TotalPortfolioValue} + \sum_{i=1}^{Z} T_i s_i \Leftrightarrow LotTaxStatus = 0 \quad (c1)$$

$$STG = \frac{ExternalShortTermGain}{TotalPortfolioValue} + \sum_{i=1}^{Z} T_i s_i \Leftrightarrow LotTaxStatus = 1 \quad (c2)$$

$$LTL = \frac{ExternalLongTermLoss}{TotalPortfolioValue} + \sum_{i=1}^{Z} T_i s_i \Leftrightarrow LotTaxStatus = 2 \quad (c3)$$

$$LTG = \frac{ExternalLongTermGain}{TotalPortfolioValue} + \sum_{i=1}^{Z} T_i s_i \Leftrightarrow LotTaxStatus = 3 \quad (c4)$$

Pre-Processing Data Requirement

For each tax lot, data pre-processor 124 calculates $T_i$ per the following conditions/formulas:

Short Term or Long Term Gain:

$$T_i = 1 - \frac{C}{V}$$

Short Term or Long Term Loss:

$$T_i = 1 - \frac{V}{C}$$

Where C=the cost basis of the security, and V is the market price of the security.

In addition, for each tax tot, data pre-processor 124 identifies its tax status and code as follows:
  Short Term Loss→LotTaxStatus=0
  Short Term Gain→LotTaxStatus=1
  Long Term Loss→LotTaxStatus=2
  Long Term Gain→LotTaxStatus=3

Furthermore, data pre-processor 124, calculates external taxable gains and losses as a percentage of the total portfolio value as described in the pre-processing step 320 (see Section II.A.5., supra).

b) Tax Logic Constraints

The tax logic constraints are a series of constraints that accurately model the then-applicable US Tax Code. These constraints (set forth below) result in one of four potential states:

1) Tax all gains at Short Term Capital Gains tax rate (i.e. $Tax_1 > 0$, $Tax_2 > 0$, $Tax_3 = 0$);
2) Tax Long Term Gains at Long Term Capital Gains Tax Rate and Short Term Gains at Short Term Capital Gains Rate (i.e. $Tax_1 > 0$, $Tax_2 = 0$, $Tax_3 > 0$);
3) Tax all gains at Long Term Capital Gains tax rate (i.e. $Tax_1 > 0$, $Tax_{2,3} = 0$); and
4) Net Taxable Gains and Losses less than zero (therefore no taxable event).

Tax Logic Constraints:
  NST=STG−STL
  NLT=LTG−LTL
  NG=NST+NLT
  NG−$B_1 \leq 0$
  $B_1$−NG$\leq 1$
  NST−$B_2 \leq 0$
  $B_2$−NST$\leq 1$
  NLT−$B_3 \leq 0$
  $B_3$−NLT$\leq 1$
  $B_4 = B_2 + B_3 - B_1$
  $B_5 = 1 - B_3$
  $Tax_1$−NG−$10B_1 \geq -10$
  $Tax_1$−NG+$10B_1 \leq 10$
  $Tax_1$−$10B_1 \leq 0$
  $Tax_2$−NG−$10B_1$−$10B_5 \geq -20$
  $Tax_2$−NG+$10B_1$+$10B_5 \leq 20$
  $Tax_2$−$10B_1 \leq 0$
  $Tax_3$−NST−$10B_1$−$10B_4 \geq -20$
  $Tax_3$−NST+$10B_1$+$10B_4 \leq 20$
  $Tax_3$−$10B_1 \leq 0$ c) Manager Allocation Constraints Manager allocation constraints constrain the total amount invested in a given manager account as a percentage of the total client portfolio. The number of managers is reflected in k variables, one for each manager. The constraint is calculated per manager for securities in the managers sub-account per the following formula:

$$M_k = \sum_{i=1}^{n} w_i$$

Pre-Processing Data Requirement

All securities are sorted in the security file by manager. The Manager file contains a count of all securities in the file. During the building of the problem, the securities for each manager are processed and a unique constraint is built in the client constraints section (i.e., on a unique row) that is linked to the $M_k$ variable in the client variable section.

d) Manager Relative Allocation Constraint

The manager relative allocation constraint ensures that the ratio of assets among managers within an asset class is bounded by some range. For each manager in the same asset class, two (minimum relative, maximum relative) constraints are created per the following formulas:

$$(1 - T_i)M_i - \sum_{k=1, k \neq i}^{n} M_k T_i \geq 0$$

Where:

$T_i$=Relative Minimum Ratio for Manager i $M_i$=Weight of manager associated with Target $T_i$ $M_k$=Weight of other managers in asset class Note: To calculate the relative maximum constraint the $\geq$ changes to $\leq$.

Pre-Processing Data Requirement

Data pre-processor 124 generates a count (Q) of the total number of managers that require manager relative allocation constraint (see Section II.B.7., supra). For each manager that requires relative asset class allocations, the minimum and maximum should be calculated. In one embodiment, managers are bounded between their original allocation at account funding and their current allocation. These calculations are performed in the Contribution, Rebalancing and Withdrawal calculations process (see Section A.6., supra).

d) Asset Allocation Constraint

For each asset class (L) and all managers (m) within the same asset class ID (L), optimization problem builder 126 builds one constraint per asset class to reflect the total client assets as a percentage of the total client portfolio invested in each asset class. There should be L total constraints.

$$A_l = \sum_{k=1}^{m} M_{k,l}$$

Note: During pre-processing, an asset class ID was placed in the manager file for each manager associated with the current client portfolio.

e) Fully Invested Constraint

The fully-invested constraint ensures that the clients assets in the managed portfolio are fully invested among the potential asset classes. One constraint is built for the client to ensure that the investment into all (L) asset classes totals the total client portfolio value 1.

$$\sum_{l=1}^{L} A_l = 1$$

f) Cross Manager Wash Sale Constraints

Cross manager wash sale constraints ensure that, during any optimization involving more than one manager, no two managers effectively generate a wash sale. The most likely time this would ever occur is when two managers within the same asset class have a different opinion on any single security. If one manager removes the security from his model portfolio and another adds the security to his respective model portfolio, depending on the state of the gain or loss, a potential wash sale could occur. This series of constraints ensures that the most beneficial trade is achieved. The other manager either postpones the trade and/or purchases an alternate security. In order to require this constraint, at least one manager must hold a tax lot at a loss and any other manager may hold or consider buying this security. Both current holdings (denoted by $b_i$ and $s_i$ variables) and potential holdings (denoted by $w_i$ variables where the current percent held of security i [denoted by $c_i$] equals zero).

$$\left[\sum_{m=1}^{M}\sum_{i=1}^{n}(w_i \Leftrightarrow CMWS \cdot (c_i = 0)) + \sum_{m=1}^{M}\sum_{x=1}^{X}(b_i \Leftrightarrow CMWS)\right] - h_c \leq 0$$

$$\left[\sum_{m=1}^{M}\sum_{x=1}^{N}(s_i \Leftrightarrow CMWS)\right] - h_c \leq 1$$

Where, $c_i$=current percentage invested in security i,

CMWS=a logical condition set to true if a security has been flagged as a potential cross manager wash sale;

X=count of all tax lots within any manager;

M=total number of managers; and

N=total securities held or being considered within a manager's sub-account.

Pre-Processing Data Requirement

As discussed above, as a pre-processing step, data pre-processor 124 identifies cross manager wash sales process. Each security is screened for this potential condition and all securities that qualify are labeled with an associated cross manager wash sale ID. When a security does not qualify as a potential cross manager wash sale the ID is set to zero. In addition, the client file includes a count of the total number of cross manager wash sale potentials within the entire optimization.

2) Manager Level Constraints a) Active Security Weight Constraints

Active security weights calculate the portion of an investment in a given security that represents active risk. Active risk is deviation from a specified benchmark (either an index or a private portfolio such as a manager's model). For a discussion on what benchmark is used see the implementation section below. Since the benchmark weight is represented as if the client has invested 100% of their assets in the benchmark, the formula must be adjusted to reflect the percentage allocated to the manager account. A constraint is created for each security under consideration or currently held by a manager per the following formula:

$$aw_i = (1 - bw_i)w_i - \sum_{k=1, k \neq i}^{n} bw_i w_k$$

Where $bw_i$=the benchmark weight for the specific security.

Pre-Processing Data Requirement

During pre-processing, the client specific model portfolio must be constructed. In the case of implicit analysis (to be discussed later) the client specific model portfolio is the benchmark and in the case of explicit analysis, an asset class passive benchmark is the established benchmark. Each securities benchmark weight must be appropriately identified and stored in the security file.

b) Individual Security Weight Constraints

The individual security weight constraint ensures that no more than a specified amount is invested in any given security. In most instances, there are not many occasions where this constraint is forced to be implemented since the client will more than likely deviate substantially from a benchmark weight and/or model portfolio weight and thus the position will be trimmed versus exceeding some max weight limit. Nonetheless, the system supports setting some maximum weight on a case-by-case basis for each security/manager/distributor/client. Since maximum weights are typically referred to relative to a single manager account (i.e., a manager trims any security that exceeds 8% of the portfolio back to 4%), they must be adjusted for the current allocation the manager account has in the total client portfolio. The constraint can be represented mathematically for each security as:

$$w_i \leq \sum_{k=1}^{n} wm_i w_k$$

Where,
$wm_i$=the maximum weight to invest in security i;
$w_i$=the weight as a percentage of total portfolio of security i; and
$w_k$=the weights of all other securities under consideration for that manager.

Pre-Processing Data Requirement

Max weights are calculated during the building of the security file per the following conditions table:

| $mw_i$ | Locked: | Current Percentage of security in total client portfolio/Current Manager Allocation |
|---|---|---|
| | <MPS, Buy More Allowed: | MPS (i.e. the maximum position size for the security) |
| | <MPS, Buy More Not Allowed: | Current Percentage of security in total client portfolio/Current Manager Allocation |
| | >MPS, Below Trim Level: | Current Percentage of security in total client portfolio/Current Manager Allocation |
| | Above Trim Level: | Trim to Level/Current Manager Allocation | c) Return Vector Constraints

The return vector constraints collapse the forecasted return/excess return for each manager into two variables attributed to capital appreciation and yield. Those skilled in the art might recognize that it would be possible to include these alphas in the objective function for each security weight ($w_i$), however, the security alphas would have to be adjusted for the client's specific income tax rate. Additionally, the output of the optimization in this fashion gives an explicit output of the expected return/excess return attributed to capital gains and yield.

$$\alpha_c = \sum_{i=1}^{n} w_i \alpha_{c_i}$$

$$\alpha_y = \sum_{i=1}^{n} w_i \alpha_{y_i}$$

Pre-Processing Data Requirement

As discussed above, alphas and other model portfolio data are received from investment style managers on a periodic basis and stored in investment style database 150 and processed by investment style data processor 154 (see Section I.C.1.a., supra). These calculations convert the input to a normalized alpha forecast in excess of the benchmark return. The normalized alphas are further broken down into excess return attributable to capital appreciation versus yield. In order to achieve this breakdown, the yield of the security is subtracted from the expected yield of a benchmark to determine the yield alpha. The yield alpha is subtracted from the total alpha to determine the alpha attributable to capital appreciation. It is feasible based on these calculations to have a negative yield alpha and/or a negative capital appreciation alpha. When a specific client account is run, the alphas are pulled from investment style database 150 and stored in the security file. In one embodiment, for securities not in the current holdings, the expected transaction costs as a percentage of the security price is subtracted from the capital appreciation alpha.

d) Active Factor Loadings Constraints

Active factor loadings reflect the amount of active systematic risk from a specified benchmark. In the case of the present invention, the factor exposure data is calculated and stored in the security file during pre-processing and one constraint per each (J) factor exposures is created for each manager/sub-account.

$$F_j = \sum_{i=1}^{n} (fe_{i,j} - BF_j) w_i$$

Where:
N=total securities held or under consideration by manager;
$BF_j$=the benchmark exposure to factor j; and
$fe_{i,j}$=security i's factor exposure to factor j.

Pre-Processing Data Requirement

In the pre-processing phase, data pre-processor 124 calculates the difference between the benchmark factor exposure and the stock specific factor exposure and stores this in the securities file for each security within each manager.

e) Current Holdings Constraints

This constraint links the tax lot detail for each specific security to the total weight invested in the security. The total weight includes how much is held before the start of the optimization ($c_i$), how much is purchased ($b_i$) and how much is sold of each tax lot ($s_{i,m}$ where there are y specific lots for any security i).

$$w_i = c_i + b_i - \sum_{m=1}^{y} S_{i,m}$$

Pre-Processing Data Requirement

For this constraint, no pre-processing is required. It is critical that all securities are labeled properly such that the security and tax lot files correctly identify the same security so that this constraint can be built correctly.

f) Buy or Sell Only Binary Constraints

This constraint ensures that for the specific tax lots currently held in any specific sub-account that either more is purchased or specific lots are sold, but not both. This eliminates the opportunity to create a wash sale during the optimization. If the manager has a relatively high alpha forecast compared to the marginal risk of this security in the total portfolio then it would be beneficial to buy more. If the optimization were left unconstrained then the optimization would allow selling all lots at a loss and reinvesting all proceeds back into the same securities thus giving an unrealistic picture of the tax state for this investor as this would result in a wash sale. Note that wash sales based on previous transactions (either purchases within the last 30 days and a sale at a loss OR a sale within the last 30 days and a purchase during the optimization) are constrained by locking specific tax lots and security weights in pre-processing. The mathematical relationship for each security i is as follows:

$$2o_i + \sum_{z=1}^{y} S_{i,z} \leq 2$$

$$b_i - 2o_i \leq 0$$

Pre-Processing Data Requirement

For this constraint, no pre-processing is required. It is critical that all securities are labeled properly such that the security and tax lot files correctly identify the same security so that this constraint can be built correctly.

B.3.d. Configuration of Optimization

As described in Section I.C., supra, there are two methods for making the tradeoff analysis in a manager's portion of the portfolio, explicit and implicit analysis. In the case of explicit analysis, the manager provides a model portfolio including explicit rankings of the securities within the model portfolio. Investment style data processor 154 converts the explicit rankings into capital appreciation and yield alpha values for each security. The benchmark is an index (e.g., Russell 1000 Growth) against which the investment style manager manages. $\lambda_s$ and $\lambda_u$ reflect the tradeoff between tracking error and alpha. Transaction costs ($tc_i$) are a function of the bid/ask spread for the security and any estimated market impact (current assumption is 0). The factor exposures, factor variances, factor correlations and residual variance forecasts can be from any commercially available risk model provider.

In the case of implicit analysis, all capital appreciation and yield alphas are set to zero. The benchmark is the manager's model portfolio. $\lambda_s$ and $\lambda_u$ reflect the tolerance for deviating from the model for purposes of taxes. $tc_i$ is a function of the bid/ask spread for the security and any estimated market impact (current assumption is 0). The factor exposures, factor variances, factor correlations and residual variance forecasts can be from any commercially available risk model provider. In addition, as discussed above, the problem is constructed and solved to yield a set of recommended trades to achieve the results of the optimization. (See Section II, supra).

Lastly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus allowing for tax-optimized, managed investment portfolios, comprising:
    a database server storing an investor account database comprising account data for a plurality of financial portfolios wherein the assets of each financial portfolio have been previously allocated to according to at least one investment style;
    a processing server having stored thereon computer-executable data pre-processor software configured to receive (i) historical transactions associated with each financial portfolio, and (ii) proposed trades comprising adjustments to a plurality of existing positions held in each financial portfolio based on the at least one investment style; and
    a computer-executable portfolio optimizer module stored and operating on the server configured to optimize after-tax returns for each financial portfolio aggregated across all assets in each portfolio, factoring in risk, return, short term capital gains, short term capital losses, long term capital gains and long term capital losses associated with execution of each of the plurality of possible trades, the investment styles associated with each asset, and the historical transactions associated with each financial portfolio.

2. The apparatus of claim 1 wherein the investment style represents a model portfolio.

3. The apparatus of claim 2 wherein the model portfolio data comprises a plurality of securities and their respective weights.

4. The apparatus of claim 2 wherein the portfolio optimizer is further configured to minimize tracking error from the model portfolios of the at least one investment style associated with the financial portfolio, balancing tracking error, tax costs, and transaction costs.

5. The apparatus of claim 1 wherein the investment style allows for creation of a model portfolio.

6. The apparatus of claim 1 wherein the portfolio optimizer is further configured to model a tax code applicable to the client associated with each financial portfolio.

7. The apparatus of claim 6 wherein the portfolio optimizer is further configured to provide incremental tax costs resulting from the proposed trades.

8. The apparatus of claim 1 wherein the portfolio optimizer is further configured to optimize allocations of the proposed trades within each financial portfolio by constructing and solving a mathematical representation of an objective function bound by constraints, wherein the constraints represent the account data associated with each investment portfolio.

9. The apparatus of claim 1 wherein the portfolio optimizer is further configured to modify the proposed trades based on the optimized allocations.

10. An apparatus allowing for tax-optimized, managed investment portfolios, the apparatus comprising:

an investor account database storing account data for a plurality of financial portfolios on a database server wherein the assets of each financial portfolio have been previously allocated between at least two asset classes and wherein each asset class has associated therewith at least one investment style, each investment style representing a model portfolio;

a processor, configured to execute software implementations of:

a data pre-processor module for receiving (i) historical transactions associated with each financial portfolio, and (ii) proposed trades comprising possible adjustments to a plurality of existing positions held in each financial portfolio generated to mirror the model portfolios; and a portfolio optimizer module configured to optimize a financial portfolio aggregated across the at least two asset classes for after-tax returns, factoring in risk, return, short term capital gains, short term capital losses, long term capital gains and long term capital losses, based on each of the plurality of possible trades, the investment styles associated with each asset class, and the historical transactions associated with each financial portfolio.

11. The apparatus of claim 10 wherein the portfolio optimizer is further configured to minimize tracking error from the model portfolios of the investment styles associated with the financial portfolio, balancing tracking error, tax costs, and costs associated with the proposed trades.

12. The apparatus of claim 10 wherein the portfolio optimizer is further configured to minimize tracking error from the model portfolios of the investment styles associated with the financial portfolio, balancing tracking error, tax costs and tax preferences corresponding to the financial portfolio.

13. The apparatus of claim 10 wherein the model portfolio data comprises a plurality of securities and their respective weights.

14. The apparatus of claim 10 wherein the investor account database further stores portfolio optimization settings in association with corresponding financial portfolios, and wherein the portfolio optimizer further considers the portfolio optimization settings when optimizing the financial portfolio.

15. The apparatus of claim 10 wherein the investor account database further stores client preference data in association with corresponding financial portfolios, and wherein the portfolio optimizer is further considers the client preference data when optimizing the financial portfolio.

16. The apparatus of claim 10 wherein the portfolio optimizer is further configured to receive data relating to financial events external to the financial portfolio, and wherein the portfolio optimizer integrates the external transactions data into the optimization of the financial portfolio.

17. The apparatus of claim 10 further comprising an integration server to transmit calculated adjustments for a financial portfolio to an accounting system for trade execution.

18. The apparatus of claim 10 wherein the portfolio optimizer is further configured to optimize allocations of the proposed trades within each financial portfolio by constructing and solving a mathematical representation of an objective function bound by constraints, wherein the constraints represent account data associated with each investment portfolio.

19. A method for managing tax-optimized, managed investment portfolios, the method comprising:

storing, on an investor account database, account data for a plurality of financial portfolios on a database server wherein the assets of each financial portfolio have been previously allocated between at least two asset classes and wherein each asset class has associated therewith at least one investment style;

receiving at a data pre-processor (i) historical transactions associated with each financial portfolio, and (ii) proposed trades comprising possible adjustments to a plurality of existing positions held in each financial portfolio generated; and on a processor, optimizing a financial portfolio aggregated across the at least two asset classes for after-tax returns, factoring in risk, return, short term capital gains, short term capital losses, long term capital gains and long term capital losses, based on each of the plurality of possible trades, the investment styles associated with each asset class, and the historical transactions associated with each financial portfolio.

20. The method of claim 19 wherein the investment style for each asset class represents a model portfolio.

21. The method of claim 20 wherein the optimizing step further comprises minimizing a tracking error from the model portfolios of the investment styles associated with the financial portfolio.

22. The method of claim 19 further comprising the step of before the optimizing step, processing the investment style and account data to screen for restricted securities.

23. The method of claim 22 further comprising the step of selecting an alternate security for any restricted security associated with a model portfolio found in the processing step.

24. The method of claim 23 wherein the alternate security is a security similar to the restricted security in relation to tracking error relative to the model portfolio and excess return associated with the restricted security.

25. The method of claim 19 further comprising the step of processing the investment style and account data to screen for potential wash sales.

26. The method of claim 25 further comprising the step of applying a constraint mechanism to any security associated with a potential wash sale to eliminate the potential for a wash sale.

27. The method of claim 19 further comprising incorporating data relating to financial events outside the financial portfolio when calculating the net tax position of the client associated with the financial portfolio.

* * * * *